US012802044B2

(12) United States Patent
Yamamura

(10) Patent No.: US 12,802,044 B2
(45) Date of Patent: Nov. 17, 2026

(54) MAINTENANCE MANAGEMENT SYSTEM, MAINTENANCE SCHEDULE DISPLAY METHOD, INFORMATION PROCESSING SYSTEM, AND NON-TRANSITORY COMPUTER-EXECUTABLE MEDIUM

(71) Applicant: Hiroki Yamamura, Tokyo (JP)

(72) Inventor: Hiroki Yamamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 260 days.

(21) Appl. No.: 18/357,468

(22) Filed: Jul. 24, 2023

(65) Prior Publication Data

US 2024/0037512 A1 Feb. 1, 2024

(30) Foreign Application Priority Data

Aug. 1, 2022 (JP) ................................ 2022-122832
Mar. 27, 2023 (JP) ................................ 2023-050516
Jun. 23, 2023 (JP) ................................ 2023-103440

(51) Int. Cl.
*G06Q 10/20* (2023.01)
*G06Q 10/109* (2023.01)

(52) U.S. Cl.
CPC ......... *G06Q 10/20* (2013.01); *G06Q 10/1097* (2013.01)

(58) Field of Classification Search
CPC .............................. G06F 3/1229; G06Q 10/20
See application file for complete search history.

(56) References Cited

U.S. PATENT DOCUMENTS

2009/0037206 A1* 2/2009 Byrne .................... G06Q 10/20 705/28
2012/0005107 A1* 1/2012 Lowden ................. G06Q 10/06 705/305
2015/0343819 A1* 12/2015 Groenen .............. B41J 2/16517 347/5

(Continued)

FOREIGN PATENT DOCUMENTS

JP 2005-165467 A 6/2005
JP 2017-049940 A 3/2017

(Continued)

OTHER PUBLICATIONS

Rommert Dekker, Integrating optimisation, priority setting, planning and combining of maintenance activities, European Journal of Operational Research, vol. 82, Issue 2,Apr. 20, 1995 (Year: 1995).*

(Continued)

*Primary Examiner* — Johnna R Loftis
(74) *Attorney, Agent, or Firm* — IPUSA, PLLC

(57) ABSTRACT

A maintenance management system includes circuitry. The circuitry, in a case that, in addition to a first maintenance, a second maintenance is to be performed, the second maintenance being a maintenance that is extraordinarily added differently from the first maintenance, sets a recommended time period for executing the second maintenance to be longer than a time required for the second maintenance, and displays a maintenance schedule including a recommended time period for executing the first maintenance and the recommended time period for executing the second maintenance.

12 Claims, 37 Drawing Sheets

(56) References Cited

U.S. PATENT DOCUMENTS

| | | | | |
|---|---|---|---|---|
| 2016/0140868 | A1* | 5/2016 | Lovett | G09B 19/0053 434/118 |
| 2017/0277609 | A1* | 9/2017 | Slik | G06F 11/2094 |
| 2018/0181924 | A1* | 6/2018 | Yokochi | G06Q 10/20 |
| 2019/0012126 | A1* | 1/2019 | Butala | B41J 2/165 |
| 2019/0385128 | A1* | 12/2019 | Cummings | G06Q 10/20 |
| 2020/0236231 | A1* | 7/2020 | Oyasato | H04N 1/00344 |
| 2021/0103897 | A1* | 4/2021 | Lee | G06Q 10/063118 |
| 2021/0166199 | A1* | 6/2021 | Shiraishi | G06Q 10/025 |
| 2022/0076214 | A1* | 3/2022 | Shiraishi | H04N 1/00427 |
| 2023/0064640 | A1* | 3/2023 | Nakatsuka | G06F 3/1208 |
| 2023/0185494 | A1* | 6/2023 | Brock | G06F 3/121 358/1.14 |

FOREIGN PATENT DOCUMENTS

| | | | |
|---|---|---|---|
| JP | 2018055323 A | * | 4/2018 |
| JP | 2023-066222 A | | 5/2023 |

OTHER PUBLICATIONS

Emil Gustavsson, Michael Patriksson, Ann-Brith Strömberg, Adam Wojciechowski, Magnus Önnheim, Preventive maintenance scheduling of multi-component systems with interval costs, Computers & Industrial Engineering, vol. 76, Mar. 4, 2014 (Year: 2014).*

J. Alhilman, F. T. D. Atmaji and N. Athari, "Software application for maintenance system: A combination of maintenance methods in printing industry," 2017 5th International Conference on Information and Communication Technology (ICoIC7), Melaka, Malaysia, 2017, pp. 1-6 (Year: 2017).*

Maintenance Preventive Scheduling of Critical Components in Offset Printing Machine (Case Study : PT. XYZ). (2021). Tibuana : Journal of Applied Industrial Engineering, 4(02), 110-119. (Year: 2021).*

Extended European Search Report for 23187629.3 mailed on Jan. 3, 2024.

* cited by examiner

FIG. 8

DEVICE STATUS INFORMATION

| DEVICE ID: PP10001 | | | | |
|---|---|---|---|---|
| ACQUISITION DATE | SENSOR A MEASURED VALUE | SENSOR B MEASURED VALUE | COUNTER VALUE | ... |
| 2022/2/10 20:30 | ... | ... | ... | ... |
| 2022/2/11 20:30 | ... | ... | ... | ... |
| 2022/2/12 20:30 | ... | ... | ... | ... |
| ... | ... | ... | ... | ... |

FIG. 9

DEVICE MANAGEMENT INFORMATION

| DEVICE ID | IP ADDRESS | E-MAIL ADDRESS |
|---|---|---|
| PP10001 | 1.2.3.4 | pp10001@sampleA.com |
| PP10002 | 1.2.3.5 | pp10002@sampleB.com |
| PP10003 | 1.2.3.6 | pp10003@sampleC.com |
| ... | ... | ... |

FIG. 10

USAGE AMOUNT INFORMATION
DEVICE ID: PP10001

| DATE | USAGE AMOUNT |
|---|---|
| 20XX/04/15 Mon | 100 PAGES |
| 20XX/04/16 Tue | 110 PAGES |
| 20XX/04/17 Wed | 123 PAGES |
| 20XX/04/18 Thu | 530 PAGES |
| 20XX/04/19 Fri | 450 PAGES |
| 20XX/04/20 Sat | 25 PAGES |
| 20XX/04/21 Sun | 0 PAGE |
| 20XX/04/22 Mon | 210 PAGES |
| ... | ... |

FIG. 11A

FAILURE MAINTENANCE INFORMATION

| FAILURE TYPE | ADDITIONAL MAINTENANCE | MAINTENANCE DEADLINE | OPERATOR | WORK TIME |
|---|---|---|---|---|
| FAILURE A | ADDITIONAL MAINTENANCE A | 1 WEEK | LEVEL 2 OR HIGHER | 2h |
| FAILURE B | ADDITIONAL MAINTENANCE B | 2 WEEKS | SERVICE ENGINEER | 3h |
| FAILURE C | ADDITIONAL MAINTENANCE C, D | 1 WEEK | LEVEL 1 OR HIGHER | 1h |
| ... | ... | ... | ... | ... |

FIG. 11B

| PRINTING JOB | SCHEDULED EXECUTION DATE AND TIME | JOB OWNER | JOB FILE |
|---|---|---|---|
| A | February 27th 10:00-13:00 | USER A | ABC.pdf |
| B | February 27th 13:00-18:00 | USER B | DEF.pdf |
| C | February 28th 09:00-13:00 | USER C | GHI.pdf |
| D | February 28th 14:00-17:00 | USER D | JKL.pdf |
| E | February 28th 17:00-19:00 | USER E | MNO.pdf |
| ... | ... | ... | ... |

FIG. 12A

| MAINTENANCE NAME | DIAGNOSIS DATE | SCHEDULED DATE | OPERATOR | WORK TIME |
|---|---|---|---|---|
| REGULAR MAINTENANCE R | 2022/2/28 | 2022/3/10 | OPERATOR OF LV. 1 OR HIGHER | 1h |
| REGULAR MAINTENANCE Q | 2022/2/28 | 2022/4/1 | OPERATOR OF LV. 2 OR HIGHER | 1h |
| ... | ... | ... | ... | ... |

FIG. 12B

| MAINTENANCE NAME | DIAGNOSIS DATE | START OF REC-OMMENDED EXECUTION TIME PERIOD | END OF RECOM-MENDED EXECU-TION TIME PERIOD | OPERATOR | WORK TIME |
|---|---|---|---|---|---|
| ADDITIONAL MAINTENANCE A | 2022/3/4 | 2022/3/8 | 2022/3/14 | OPERATOR OF LV. 2 OR HIGHER | 2h |
| ADDITIONAL MAINTENANCE B | 2022/3/4 | 2022/3/8 | 2022/3/21 | SERVICE ENGINEER | 3h |
| ... | ... | ... | ... | ... | ... |

FIG. 12C

FAILURE MAINTENANCE INFORMATION

| MAINTENANCE NAME | DIAGNOSIS DATE | START DATE | END DATE | OPERATOR | WORK TIME | RECOMMENDED DATE | EXECUTION DATE |
|---|---|---|---|---|---|---|---|
| ADDITIONAL MAINTENANCE A | 2022/3/7 | 2022/3/8 | 2022/3/14 | OPERATOR OF LV. 2 OR HIGHER | 2h | 3/10,11 | 2022/3/10 |
| ADDITIONAL MAINTENANCE B | 2022/3/7 | 2022/3/8 | 2022/3/21 | SERVICE ENGINEER | 3h | | 2022/3/14 |
| REGULAR MAINTENANCE R | 2022/2/28 | 2022/3/10 | 2022/3/10 | OPERATOR OF LV. 1 OR HIGHER | 1h | | 2022/3/10 |
| REGULAR MAINTENANCE Q | 2022/2/28 | 2022/4/1 | 2022/4/1 | OPERATOR OF LV. 2 OR HIGHER | 1h | | 2022/4/1 |
| ... | ... | ... | ... | ... | ... | | ... |

AFTER EXECUTION

BEFORE EXECUTION

BEFORE EXECUTION

AFTER EXECUTION

AFTER EXECUTION

BEFORE EXECUTION

| | Print schedule (including order) | Available time |
|---|---|---|
| 8th | Scheduled | 1 hour |
| 9th | Scheduled | 2 hours |
| 10th | Scheduled | No schedule |
| 11th | Scheduled | No schedule |
| 12th | – | – |
| 13th | – | – |
| 14th | No schedule | 8 hours |

MAINTENANCE MANAGEMENT SYSTEM, MAINTENANCE SCHEDULE DISPLAY METHOD, INFORMATION PROCESSING SYSTEM, AND NON-TRANSITORY COMPUTER-EXECUTABLE MEDIUM

CROSS-REFERENCE TO RELATED APPLICATIONS

This patent application is based on and claims priority pursuant to 35 U.S.C. § 119(a) to Japanese Patent Application Nos. 2022-122832, filed on Aug. 1, 2022, 2023-050516, filed on Mar. 27, 2023, and 2023-103440 filed on Jun. 23, 2023, in the Japan Patent Office, the entire disclosure of which is hereby incorporated by reference herein.

BACKGROUND

Technical Field

Embodiments of the present disclosure relate to a maintenance management system, a maintenance schedule display method, an information processing system, and a non-transitory computer-executable medium.

Related Art

In devices such as image forming apparatuses, for example, motors or clutches perform mechanical operations to print with color materials. Accordingly, various types of maintenance such as cleaning and parts replacement are sometimes to be performed. For example, various maintenance works are performed in a case where the device is a large-sized image forming apparatus such as a commercial printer. For example, the maintenance is performed manually by, for example, a user on the image forming apparatuses. In another example, an administrator changes setting values of the image forming apparatuses from a terminal apparatus, for example.

Some technologies that can implement efficient maintenance are known in the art. For example, a system is known that updates a maintenance schedule when a sign of failure of a device is detected so that maintenance is performed more efficiently than when temporary maintenance is performed immediately.

SUMMARY

An embodiment of the present disclosure includes a maintenance management system including circuitry. In a case that, in addition to a first maintenance, a second maintenance is to be performed, the second maintenance being a maintenance that is extraordinarily added differently from the first maintenance, the circuitry sets a recommended time period for executing the second maintenance to be longer than a time required for the second maintenance, and displays a maintenance schedule including a recommended time period for executing the first maintenance and the recommended time period for executing the second maintenance.

An embodiment of the present disclosure includes a maintenance schedule display method. The method includes determining to perform, in addition to a first maintenance, a second maintenance that is extraordinarily added differently from the first maintenance. The method includes setting a recommended time period for executing the second maintenance to be longer than a time required for the second maintenance. The method includes controlling a display to display a maintenance schedule including a recommended time period for executing the first maintenance and the recommended time period for executing the second maintenance.

An embodiment of the present disclosure includes an information processing system including circuitry. In a case that, in addition to a first maintenance, a second maintenance is to be performed, the second maintenance being a maintenance that is extraordinarily added differently from the first maintenance, the circuitry sets a recommended time period for executing the second maintenance to be longer than a time required for the second maintenance, and transmits, to a device, data indicating a maintenance schedule including the recommended time period for executing the first maintenance and the recommended time period for executing the second maintenance.

An embodiment of the present disclosure includes a non-transitory computer-executable medium storing a plurality of instructions, which, when executed by a processor of an information processing apparatus, causes the processor to perform a method. The method includes, in a case that, in addition to a first maintenance, a second maintenance is to be performed, the second maintenance being a maintenance that is extraordinarily added differently from the first maintenance, setting a recommended time period for executing the second maintenance to be longer than a time required for the second maintenance, and transmitting, to a device, data indicating a maintenance schedule including the recommended time period for executing the first maintenance and the recommended time period for executing the second maintenance.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 8 is a table of device status information stored in a device status information storage unit, according to an embodiment of the present disclosure;

FIG. 9 is a table of device management information stored in the device management information storage unit, according to an embodiment of the present disclosure;

FIG. 10 is a table of usage amount information stored in a usage amount information storage unit, according to an embodiment of the present disclosure;

FIG. 11A is a table of failure maintenance information stored in a failure maintenance information storage unit, according to an embodiment of the present disclosure;

FIG. 11B is a table of printing job information stored in a printing job information storage unit, according to an embodiment of the present disclosure;

FIG. 12A is a table of regular maintenance information, according to an embodiment of the present disclosure: FIG. 12B is a table of additional maintenance information, according to an embodiment of the present disclosure; FIG. 12C is a table of maintenance information, according to an embodiment of the present disclosure;

Figure 1:
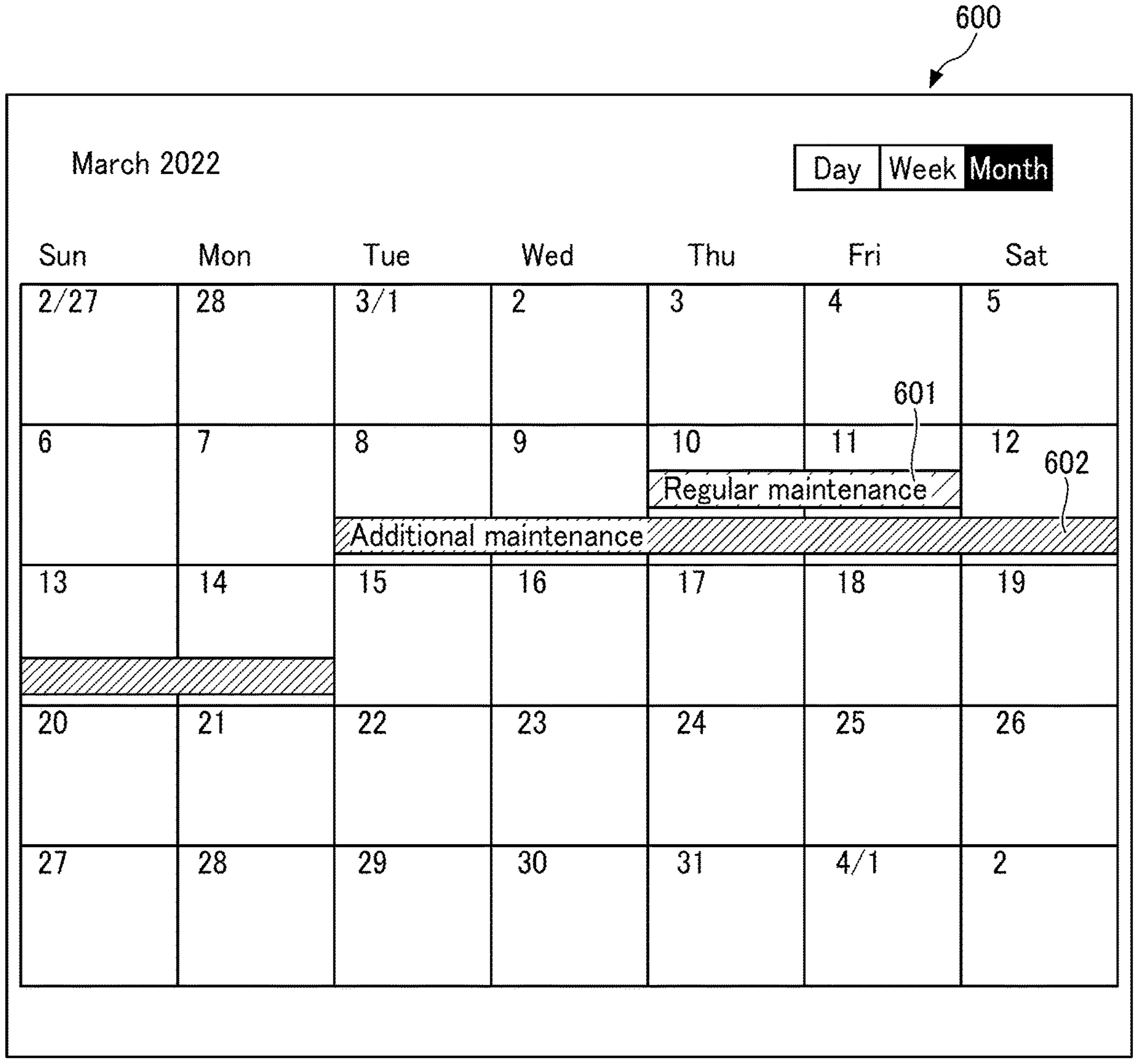
FIG. 1 is a diagram illustrating a maintenance schedule screen displayed by an image forming apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A maintenance management system and a method for displaying maintenance schedule performed by the maintenance management system according to embodiments of the present disclosure are described below.

Overview of Display of Additional Maintenance

Maintenance of an image forming apparatus is diverse including simple maintenance such as cleaning of a scan face of a scanner and professional maintenance such as voltage adjustment of a charging device. As known in the art, a customer engineer typically visits a customer to perform maintenance. On the other hand, there is an attempt to keep a device in a good condition without interfering with a printing work on site by allowing a user (who may be an end user or an administrator) on the customer side to perform maintenance having a light work load.

Accordingly, the user has to perform regular maintenance in addition to daily work of producing printed matter. The regular maintenance according to embodiments of the present disclosure serves as a first maintenance. Further, a server apparatus described below can detect a sign of failure in advance by applying device status information transmitted from the image forming apparatus to a prediction model. Accordingly, extra additional maintenance is to be performed. The additional maintenance according to embodiments of the present disclosure serves as a second maintenance. For this reason, it is desired that a user performs the regular maintenance and the additional maintenance efficiently while preventing the production of printed matter from being hindered. However, it has been difficult for the user to schedule the additional maintenance, in addition to the regular maintenance, efficiently, while preventing the production of printed matter from being hindered. In view of this, in one or more embodiments, the system proposes a schedule for the additional maintenance, so that maintenance is performed efficiently.

FIG. 1 illustrates a maintenance schedule screen 600 displayed by an image forming apparatus, according to embodiments of the present disclosure.

Since the maintenance schedule screen 600 of FIG. 1 is displayed on a monthly basis, a calendar is displayed. On the calendar, a recommended execution time period 601 for regular maintenance and a recommended execution time period 602 for additional maintenance are displayed.

The regular maintenance is maintenance scheduled by the image forming apparatus according to a counter value. Since the regular maintenance is performed according to the counter value, it cannot be said that the regular maintenance is performed at regular intervals. Nonetheless, a schedule is registered every time the counter value increases by a certain number. The recommended execution time period for regular maintenance may be manually set by an administrator.

The additional maintenance is maintenance that is extraordinarily added to the image forming apparatus by the server apparatus in order to deal with a sign of failure when the server apparatus detects the sign of failure on the basis of device status information acquired from the image forming apparatus. More specifically, the expression "maintenance that is extraordinarily added" refers to the maintenance that is added based on an unexpected event detected at a device subjected to maintenance, such as detected sign of failure, which is different from the maintenance to be regularly performed.

The recommended execution time period 602 for additional maintenance displayed on the calendar is longer than a time period required for the additional maintenance. For example, when it is predicted that maintenance that ends in half a day is to be performed, the recommended execution time period 602 for additional maintenance is longer than half a day. Further, the recommended execution time period 602 for additional maintenance is preferably longer than the recommended execution time period 601 for regular maintenance. As a result, the recommended execution time period 602 for additional maintenance is likely to overlap with the recommended execution time period 601 for regular maintenance. Accordingly, the user can perform the additional maintenance before or after the regular maintenance.

Alternatively, when the regular maintenance is already registered, the server apparatus may extend the recommended execution time period 602 for additional maintenance so that the recommended execution time period 602 for additional maintenance overlaps the earliest recommended execution time period 601 for regular maintenance. For example, in a case where regular maintenance is set on 10th and 11th as illustrated in FIG. 1, the server apparatus sets an entire time period from 8th, which is earlier than 10th, to 14th as the recommended execution time period 602 for additional maintenance.

As described, a time period during which the additional maintenance that is added when the sign of failure is detected is longer than at least one of a time period required for the additional maintenance and the recommended execution time period 601 for regular maintenance. As a result, a point in time when the user performs maintenance is determined so that production work using the device does not hinder.

Terms

The term "maintenance" refers to maintenance, management, repair, or work required for maintenance, management, or repair, which are performed so that the device can continuously perform expected functions. The maintenance is not necessarily limited only to prevention of failures.

The device may be any machine or structure on which maintenance is to be performed. In the description of the present embodiment, an image forming apparatus according to the present embodiment serves as the device. For example, the image forming apparatus prints on a sheet of paper. Alternatively, the image forming apparatus is a three-dimensional (3D) printer or a printer for apparel products.

The time period required for maintenance is an approximate time period required from when the user starts the maintenance to when the user ends the maintenance. The time period required for maintenance is determined in advance according to types of maintenance.

The recommended execution time period for maintenance is a preferable time period during which the maintenance is to be executed before the occurrence of a problem such as a failure.

The term "maintenance schedule" refers to information in which a schedule of maintenance is registered in, for example, a calendar or a timetable.

The sign of failure is a symptom or a harbinger indicating that a failure is about to occur. A failure may have already occurred at the time when the sign of failure is detected.

The term "user" refers to a person who uses an image forming apparatus 103 to cause the image forming apparatus 103 to execute printing or performs maintenance on the image forming apparatus 103. The user may be an administrator in a company or may be a general user, who regularly works in the company such as an employee. On the other hand, a service engineer and a customer engineer are external persons viewed from the user. Specifically, the external person is any person, who does not regularly work in the company.

System Configuration

Figure 2:
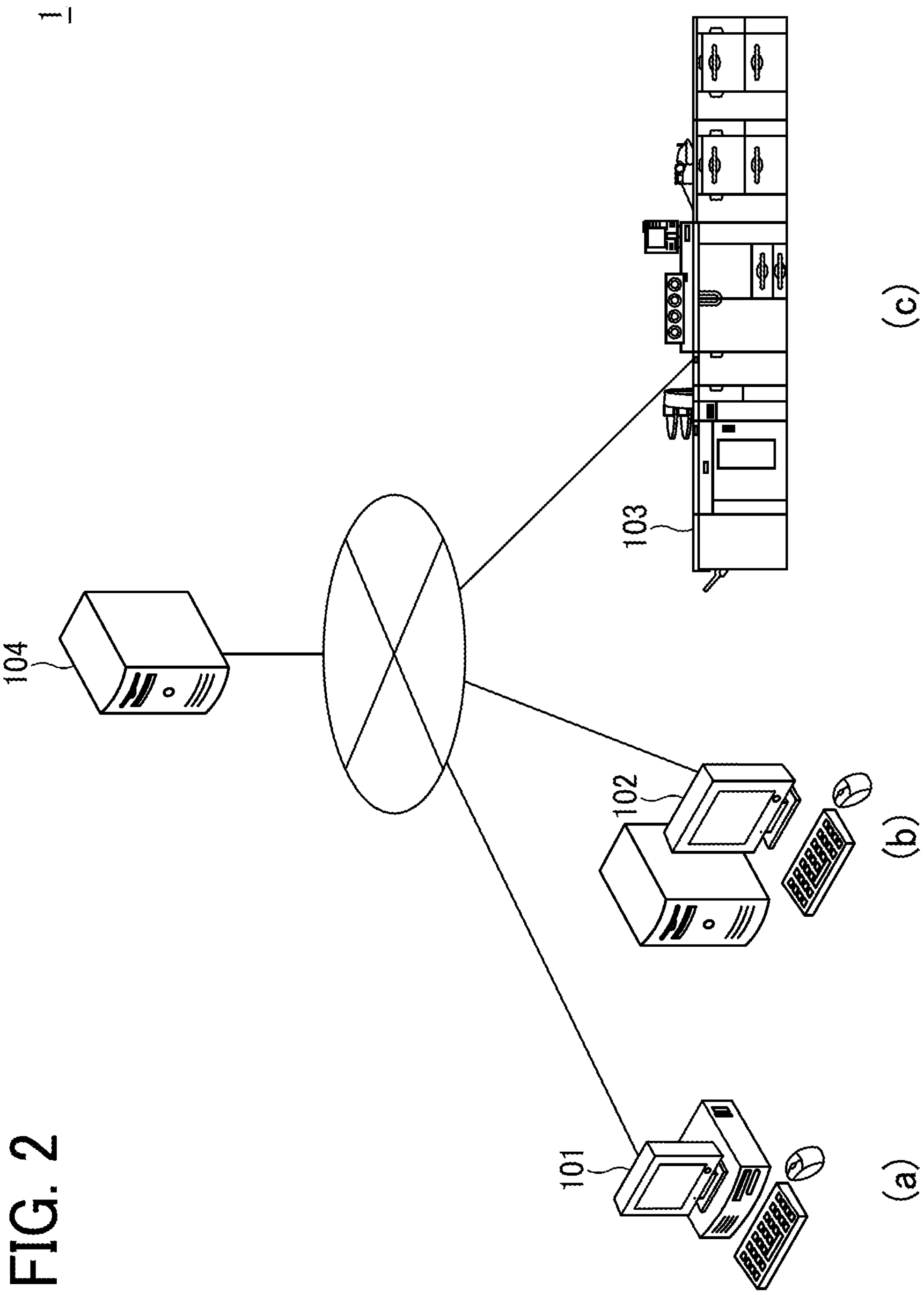
FIG. 2 is a schematic diagram illustrating a system configuration of a maintenance management system, according to an embodiment of the present disclosure.

FIG. 2 is a schematic diagram illustrating a system configuration of a maintenance management system 1 according to the present embodiment. The maintenance management system 1 includes a server apparatus 104, a digital front end (DFE) 102, and an image forming apparatus 103. The maintenance management system 1 may include a terminal apparatus 101. Alternatively, the terminal apparatus 101 may be omitted.

The terminal apparatus 101 and the DFE 102 can communicate with each other through a network N. The network includes, for example, a local area network (LAN) in a facility in which the image forming apparatus 103 is provided. The network further includes the Internet when the DFE 102 is provided on the Internet. For example, the DFE 102 and the image forming apparatuses 103 are connected on a one-to-one basis through a dedicated network. In an alternative example, the DFE 102 and the image forming apparatus 103 are connected through a network. For example, the DFE 102 and the image forming apparatus 103 are configured as a single entity. Alternatively, the DFE 102 and the image forming apparatus 103 are attachable to each other and detachable from each other.

A web browser operates in the terminal apparatus 101. The web browser accesses a server that the DFE 102 includes to display input operation screens for task creation, schedule registration, and task execution. The terminal apparatus 101 receives operations such as task creation, schedule registration, and task execution on the input screens from the administrator and requests the received operations to the DFE 102.

In order to log in to the DFE 102, the administrator inputs a user identifier (ID) and a password to the terminal apparatus 101. The terminal apparatus 101 transmits the user ID and the password to the DFE 102. When authentication by the DFE 102 is successful, whether a general user or the administrator is identified.

A screen to be displayed or items to be input may vary between the general user or the administrator. Alternatively, an authentication server may perform the authentication of the administrator.

When the authentication is successful and the administrator logs in, access rights to task creation, schedule registration, and task execution are assigned. For the general user, an access right to task execution is assigned.

The terminal apparatus 101 is, for example, a personal computer (PC), a smartphone, a tablet computer, a personal digital assistant (PDA), or a wearable PC such as smart glasses and a smart watch. Further, the terminal apparatus 101 may be any suitable device, terminal, or apparatus, provided that the device, terminal, or apparatus includes a communication capability and a web browser or application software dedicated to the DFE 102 operates on the device, terminal, or apparatus. For example, the terminal apparatus 101 may be, for example, a car navigation system, a game console, or a television receiver.

When a web browser also operates on the image forming apparatus 103, the administrator can operate the image forming apparatus to request the DFE 102 to perform task creation, schedule registration, and task execution.

Alternatively, the DFE 102 can display an input operation screen on a display for a console and receive processing of task creation, schedule registration, and task execution from a keyboard. In this case, the terminal apparatus 101 can be omitted from the maintenance management system 1.

The DFE 102 is a controller that performs, for example, reception of a printing job to be executed by the image forming apparatus 103, image processing (Raster Inage Processor or RIP), progress management during the execution, and abnormality monitoring. The DFE 102 receives processing of task creation, schedule registration, and task execution from the terminal apparatus 101. In other words, the DFE 102 provides the administrator with a user interface (input operation screen) for operating the image forming apparatus 103. The DFE 102 includes one or more information processing apparatuses.

The DFE 102 generates screen information of a screen displayed by the web browser. The screen information is a program written in a HyperText Markup Language (HTML), an Extensible Markup Language (XML), a script language, and a cascading style sheet (CSS). Typically, the HTML defines the structure of a web page. The script language defines the operation of the web page. The CSS defines the style of the web page. Further, an application program implemented by cooperation of the screen information on the client side and an application program or a database on the server side is referred to as a web application program. In the present embodiment, the terminal apparatus 101 and the DFE 102 cooperate with each other to execute the web application program.

In response to a request from the terminal apparatus 101 or the image forming apparatus 103, the DFE 102 performs processing of registering a task or a task schedule in a database and processing of executing a task on the image forming apparatus, such as changing device settings and requesting an operation.

The image forming apparatus 103 executes a printing job in response to a request received by the DFE 102. The image forming apparatus 103 has a function of printing an image on a sheet. The image is formed by a printing method such as laser printing, inkjet printing, thermal printing, screen printing, or intaglio printing. Further, the image forming apparatus 103 may have a function of a multifunction peripheral (multifunction printer) or a multi-function peripheral/product/printer (MFP). The image forming apparatus 103 may be referred to as, for example, a printer or a printing apparatus. Alternatively, the image forming apparatus 103 may be, for example, a 3D printer or a direct to garment (DTG) printer.

The image forming apparatus 103 according to the present embodiment may be a commercial printer. The commercial printer is not a device for printing a printed material for internal use by an employee in a company, but a device for commercial printing in which a printed material is a commercial product. In the commercial printing, the image forming apparatus 103 outputs a printed material used for business activities of general companies and organizations. For example, in the commercial printing, the image forming apparatus 103 may output leaflets, brochures, posters, catalogs, company brochures, and manuals. An image forming apparatus for office use and an image forming apparatus for commercial use are different from each other typically in a printing speed, image quality, or a type or size of a sheet of paper that supports printing, for example.

The configuration and functions of the present embodiment are applicable to apparatuses other than the image forming apparatus 103. The apparatuses other than the image forming apparatus 103 include, for example, a projector (PJ), an electronic whiteboard, a videoconference terminal, a digital signage, a head-up display (HUD) device, an industrial machine, an imaging device, a sound collecting device, a medical device, a networked home appliance, and a game console.

The server apparatus 104 is one or more information processing apparatuses that execute processing relating to maintenance. A system including multiple information processing apparatuses is referred to as an information processing system. In other words, the server apparatus 104 receives the device status information from the image forming apparatus 103, determines whether there is a sign of failure, and determines the recommended execution time period for additional maintenance.

The server apparatus 104 resides, for example, either in a cloud environment or an on-premises environment. The "cloud" refers to a usage pattern of information processing in which resources on a network are used or accessed without identifying specific hardware resources. The "on-premises" typically refers to operating a system such as a server or software installed in the premises of a facility that can be managed by a person in charge on a user side.

For example, the server apparatus 104 is independent as illustrated in FIG. 2. In an alternative example, the server apparatus 104 is configured as a single entity integrated with the DFE 102. Alternatively, the image forming apparatus 103 may have a function of the server apparatus 104.

Hardware Configuration

Hardware configurations of the DFE 102, the image forming apparatus 103, and the server apparatus 104 are described with reference to FIG. 3 to FIG. 6.

DFE

Figure 3:
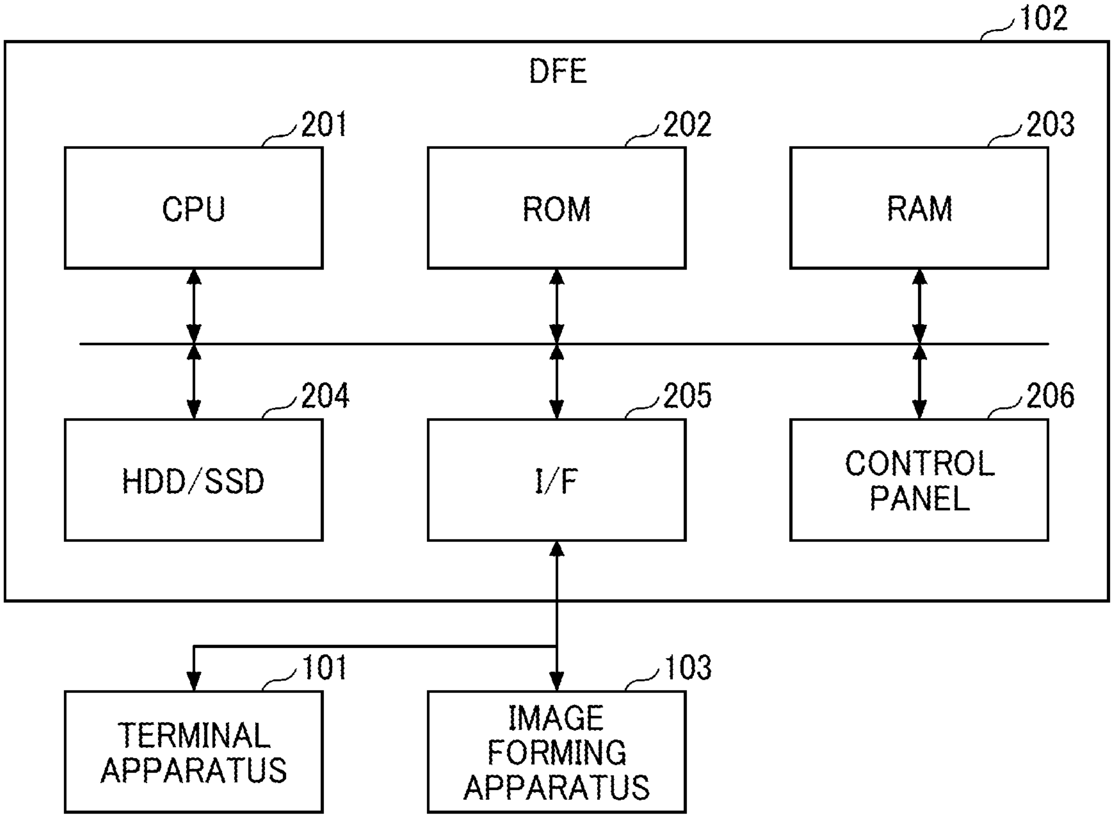
FIG. 3 is a block diagram illustrating a hardware configuration of a digital front end (DFE), according to an embodiment of the present disclosure.

FIG. 3 is a block diagram illustrating a hardware configuration of the DFE 102 according to the present embodiment. The DFE 102 has the same or substantially the same configuration as a configuration of a computer. The DFE 102 includes a central processing unit (CPU) 201, a read only memory (ROM) 202, a random access memory (RAM) 203, a hard disk drive (HDD)/solid state drive (SSD) 204, an interface (I/F) 205, and a control panel 206.

The CPU 201 uses the RAM 203 as a work area to execute a program stored in the ROM 202.

The HDD/SSD 204 is used as a storage unit and stores information on a task and a schedule. The information stored in the HDD/SSD 204 may be used by the CPU 201 when executing a read program.

The I/F 205 is an interface via which the DFE 102 can communicate with the image forming apparatus 103 and the terminal apparatus 101.

The control panel 206 includes a touch panel and displays, for example, a status of the image forming apparatus, a task schedule, and a task content on a screen. Further, the control panel 206 receives an input from a user (an administrator or a general user) who executes a task or an administrator who creates a task or registers a schedule.

Image Forming Apparatus

Figure 4:
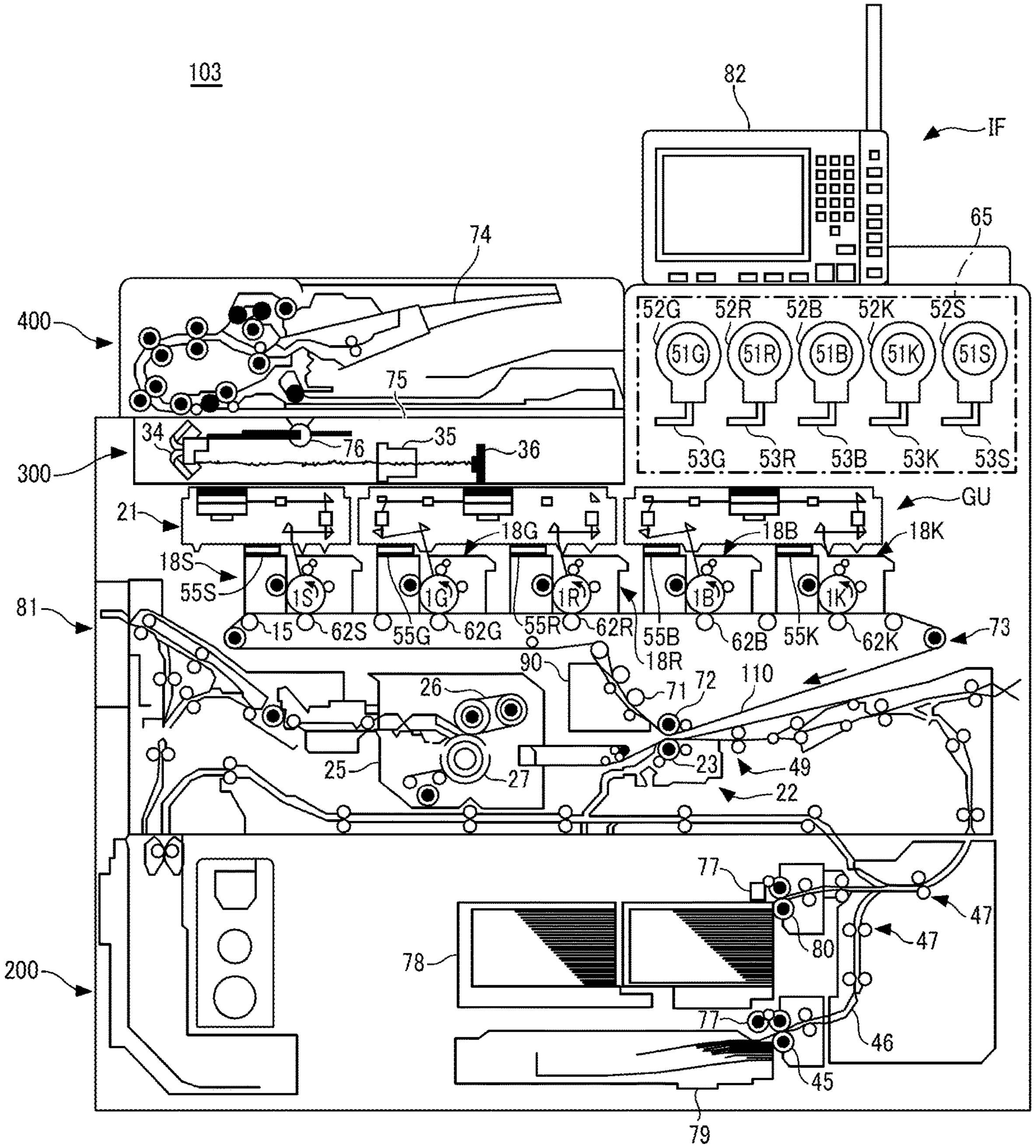
FIG. 4 is a schematic diagram illustrating a configuration of an image forming apparatus, according to an embodiment of the present disclosure.

FIG. 4 is a schematic diagram illustrating a configuration of the image forming apparatus 103 according to the present embodiment. The image forming apparatus 103 is an electrophotographic image forming apparatus. The image forming apparatus 103 includes, for example, a printer 81, a feeder 200, a scanner 300, and an automatic document feeder 400. The image forming apparatus 103 according to embodiments of the present disclosure can be any suitable printing apparatus including a part of the printer 81, the feeder 200, the scanner 300, and the automatic document feeder 400, provided that the image forming apparatus has a printing capability, and is not limited by the name.

The printer 81 includes an image forming unit GU including five developing stations 18S, 18G, 18R, 18B, and 18K that respectively form images of colors of special color (S), invisible green (G), invisible red (R), invisible blue (B), and black (K). Suffixes S, Y, M, C, and K are assigned to reference numerals (18) of components that are used to form the special color, invisible green, invisible red, invisible blue, and black toner images, respectively. The same applies to other reference numerals used in the following description. Further, in the following description, the letters S, G, R, B. and K may indicate a special color, invisible green, invisible red, invisible blue, and black, respectively. The special color is a general term of colors different from any of invisible green, invisible red, invisible blue, and black.

The invisible green color refers to a green color which can be visually recognized under invisible light but is hardly visually recognized under visible light. The invisible red color refers to a red color which can be visually recognized under invisible light but is hardly visually recognized under visible light. The invisible blue color refers to a blue color which can be visually recognized under invisible light but is hardly visually recognized under visible light. The printer 81 superimposes invisible green, invisible red, and invisible blue to express a desired invisible color (a color that can be visually recognized under invisible light but is hardly recognized under visible light). The black color refers to a black color that can be visually recognized under visible light. The special color refers to a special (spot) color that can be visually recognized under visible light.

Visible light is electromagnetic radiation having a wavelength that is perceived as light by humans. Invisible light is electromagnetic radiation having a wavelength other than the wavelength of visible light. In the present embodiment, the invisible light is long-wavelength ultraviolet light emitted by, for example, a black light. Further, in the present embodiment, the invisible color is transparent under visible light such as light emitted by a fluorescent lamp and sunlight, and can be visibly recognized under invisible light such as ultraviolet light emitted by a black light.

Specifically, an image of the invisible green color is implemented by invisible green toner. In the following description, invisible green toner is referred to as "G toner." An image of the invisible red color is implemented by invisible red toner. In the following description, invisible red toner is referred to as "R toner." An image of the invisible blue color is implemented by invisible blue toner. In the following description, invisible blue toner is referred to as "B toner." An image of an invisible color other than the invisible green color, the invisible red color, and the invisible blue color is implemented by superimposing at least two invisible color toners of the G toner, the R toner, and the B toner. Invisible black color that is a black color visible under invisible light is implemented by causing none of the G toner, the R toner, and the B toner to adhere. An image of the special color that is visible under visible light is implemented by special color toner. In the following description, special color toner is referred to as "S toner." An image of the black color that is visible under visible light is implemented by black toner. In the following description, black toner is referred to as "K toner."

In the present embodiment, the invisible color toner is produced by combining transparent toner (clear toner) and a transparent phosphor. In other words, the invisible color toner is typically produced using clear toner as a base. The transparent phosphor is, for example, a transparent fluorescent pigment or a transparent fluorescent dye. Further, in the present embodiment, the invisible color toner is pulverization toner having a fixing temperature higher than the fixing temperature of the polymerization toner. Alternatively, the invisible color toner may be polymerization toner.

In a housing of the printer 81, for example, an optical writing device 21, an intermediate transfer device 73, a secondary transfer device 22, a registration roller pair 49, and a fixing device 25 employing a belt fixing system are arranged, in addition to the developing stations 18S, 18G, 18R, 18B, and 18K.

The optical writing device 21 includes, for example, a light source, a polygon mirror, an f-θ lens, and a reflection mirror. The optical writing device 21 irradiates the faces of photoconductors 1S, 1G, 1R, 1B, and 1K with laser light according to image data.

The developing stations 18S, 18G, 18R, 18B, and 18K includes, for example, a charging roller (charging means), a developing device (developing means), a drum cleaning device, and a discharge lamp (electric-charge removing means), in addition to the photoconductors 1S, 1G, 1R, 1B, or. 1K that are drum-shaped.

The surface of the photoconductor 1S in the developing station 18S for S (special color) are uniformly charged by the charging roller as charging means. The optical writing device 21 irradiates the charged surface of the photoconductor 1S with a laser beam, which is modulated and deflected. As a result, the potential of an irradiated portion (exposed portion) decays. Due to the decay, an electrostatic latent image for S is formed on the surface of the photoconductor 1S. The formed electrostatic latent image for S is developed by the developing device as the developing means into a S toner image.

The S toner image formed on the photoconductor 1S for S is primarily transferred onto an intermediate transfer belt 110. The drum cleaning device removes the primarily-transfer residual toner from the surface of the photoconductor 1S.

In the developing station 18S for S, the photoconductor 1S cleaned by the drum cleaning device is discharged by a discharging device. Further, the photoconductor 1S is uniformly charged by a charging device and thus initialized. The above-described sequence of processes is performed in the same or substantially same manner on the developing stations 18G, 18R, 18B, and 18K for the other colors (G, R, B, K).

The intermediate transfer device 73 includes, for example, the intermediate transfer belt 110 that has an endless loop and a belt cleaner 90. The intermediate transfer device 73 further includes, for example, a drive roller 71, a secondary transfer backup roller 72, and five primary transfer bias rollers 62S, 62G, 62R, 62B, and 62K.

The intermediate transfer belt 110 having an endless loop is stretched over multiple tension rollers such as the drive roller 71 disposed inside the loop. The intermediate transfer belt 110 is endlessly moved in the clockwise direction in FIG. 4 by rotation of the drive roller 71 driven by a belt drive motor.

The primary transfer bias rollers 62S, 62G, 62R, 62B, and 62K for S, G, R, B, and K are disposed in contact with the back face (inner circumferential face) of the intermediate transfer belt 110. Primary transfer bias output from a power source is applied to the primary transfer bias rollers 62S, 62G, 62R, 62B, and 62K. Further, the primary transfer bias rollers 62S, 62G, 62R, 62B and 62K press the intermediate transfer belt 110 against the photoconductors 1S, 1G, 1R, 1B and 1K from the back face of the intermediate transfer belt 110. As a result, primary transfer nips for S, G, R, B, and K are formed at the contact portions between the photoconductors 1S, 1G, 1R, 1B, and 1K and the surface (outer circumferential surface) of the intermediate transfer belt 110. Primary transfer electric fields are formed between the photoconductors 1S, 1G, 1R, 1B, and 1K and the primary transfer bias rollers 62S, 62G, 62R, 62B, and 62K with the effects of primary transfer biases at the primary transfer nips.

The S toner image formed on the photoconductor 1S for S is transferred onto the intermediate transfer belt 110 with the effects of the primary transfer electric field and the nip pressure. The G toner image, the R toner image, the B toner image, and the K toner image formed on the photoconductors 1G, 1R, 1B, and 1K for G, R, B, and K are primarily transferred and sequentially superimposed on the S toner image. A multicolor toner image is formed on the intermediate transfer belt 110 by superimposition in this primary transfer process.

The multicolor toner image formed on the intermediate transfer belt 110 is secondarily transferred on to a recording sheet at a secondary transfer nip described below. The belt cleaner 90 opposed to the drive roller 71 via a belt removes residual toner remaining on the surface of the intermediate transfer belt 110 that has passed through the secondary transfer nip.

In the secondary transfer device 22 disposed below the intermediate transfer device 73, the secondary transfer roller 23 contacts a portion of the intermediate transfer belt 110 wound around the secondary transfer backup roller 72 to form the secondary transfer nip. The secondary transfer backup roller 72 is applied with a secondary transfer bias having the same polarity as the polarity of toner. By contrast, the secondary transfer roller 23 is grounded. Accordingly, a secondary transfer electric field is formed at the secondary transfer nip to electrostatically move a multicolor toner image on the intermediate transfer belt 110 from the belt toward the secondary transfer roller 23. Timed to coincide with the multi-color toner image on the intermediate transfer belt 110, the registration roller pair 49 forwards the recording sheet to the secondary transfer nip, and the multi-color toner image is secondarily transferred on the recording sheet.

The feeder 200 provided below a housing of the printer 81 includes a feeding cassette 79 and a paper bank 78. The feeding cassette 79 accommodates a stack of multiple recording sheets piled one on another. The feeding cassette 79 and the paper bank 78 press a feeding roller 77 against the uppermost recording sheet of the sheet stack. As the feeding roller 77 rotates, the feeder 200 conveys the uppermost recording sheet to a feeding path 46.

The feeding path 46 that receives a recording sheet fed from the feeding cassette 79 or the paper bank 78 includes a plurality of conveyance roller pairs 47 and the registration roller pair 49 disposed at an end of the feeding path 46. The conveyance roller pairs 47 convey a recording sheet toward the registration roller pair 49. The recording sheet conveyed toward the registration roller pair 49 is nipped between the rollers of the registration roller pair 49. On the other hand, in the intermediate transfer device 73, the multicolor toner image formed on the intermediate transfer belt 110 is conveyed to the secondary transfer nip as the belt rotates.

The registration roller pair 49 forwards the recording sheet nipped therebetween at a point in time when the recording sheet is brought into close contact with the multicolor toner image at the secondary transfer nip. As a result, at the secondary transfer nip, the multicolor toner image on the intermediate transfer belt 110 is brought into close contact with the recording sheet. The multicolor toner image is secondarily transferred onto the recording sheet, and thus becomes a full-color image on a white recording sheet. The recording sheet on which the full-color image has been formed in this way exits the secondary transfer nip as the secondary transfer roller 23 is driven to rotate, and is then sent to the fixing device 25 via a sheet conveyance unit including a conveyance belt.

The fixing device 25 includes a belt unit that rotates a fixing belt 26 looped around two rollers and a pressure roller 27 pressed against one of the two rollers of the belt unit. The fixing belt 26 and the pressure roller 27 are in contact with each other, and thus forms a fixing nip therebetween. The recording sheet conveyed by the sheet conveyance unit is nipped in the fixing nip. Of the two rollers in the belt unit, the fixing roller pressed by the pressure roller 27 has an internal heat source (heater), and heats the fixing belt 26 by heat generated by the heat source. The heated fixing belt 26 heats the recording sheet nipped in the fixing nip. With the heat and the nip pressure, the full-color toner image is fixed on the recording sheet.

The recording sheet on which the fixing process is performed by the fixing device 25 is stacked on a stacking portion protruding from a left side plate of a housing of the image forming apparatus 103 or conveyed again to the secondary transfer nip for duplex printing.

To make copies of a bundle of documents, for example, the bundle of documents is placed on a document table 74 of the automatic document feeder 400. When the bundle of documents is bound like a book on one side (side-stitched documents), the bundle is placed on an exposure glass 75. Before the above-described placing of the bundle of documents, the automatic document feeder 400 is opened relative to the main unit of the image forming apparatus 103 to cause the exposure glass 75 of the scanner 300 to be exposed. Subsequently, the side-stitched documents are hold by lowering the automatic document feeder 400.

After the documents are placed, the scanner 300 starts a document reading operation in response to pressing of a copy start key. However, when a sheet document is placed on the automatic document feeder 400, the automatic document feeder 400 automatically conveys the sheet document to the exposure glass 75 before an operation of reading the document.

In the operation of reading the document, a first carrier 76 and a second carrier 34 start traveling, and light is emitted from a light source of the first carrier 76. The light is reflected from the surface of the document, and is further reflected by the mirror disposed inside the second carrier 34 to the imaging forming lens 35. After passing through the imaging forming lens 35, the light enters a reading sensor 36 as incident light. The reading sensor 36 establishes image data according to the incident light.

In parallel with such a document reading operation, components of the developing stations (18S, 18G, 18R, 18B, 18K), the intermediate transfer device 73, the secondary transfer device 22, and the fixing device 25 starts operating. According to the image data obtained by the reading sensor 36, the optical writing device 21 is driven, and the S, G, R, B, and K toner images are formed on the photoconductors 1S, 1G, 1R, 1B, and 1K. These toner images are superimposed and transferred onto the intermediate transfer belt 110 to form a multicolor toner image.

Almost simultaneously with the start of the document reading operation, feeding operation is started in the feeder 200. In the feeding operation, one of the feeding rollers 77 is selectively rotated to feed a recording sheet from the paper bank 78 or the feeding cassette 79. The recording sheets are separated one by one by a separation roller 80, and fed to a reverse feeding path, after which the conveyance roller pairs 47 convey the recording sheet to the secondary transfer nip.

A controller including, for example, a CPU is disposed in a housing of the printer 81 for controlling the devices. Further, a control panel 82 including, for example, a liquid crystal display and various keys or buttons is disposed on the upper surface of the housing. An operator inputs a command on the control panel 82 to transmit the command to the controller. By doing so, the operator can select, for example, a single-sided print mode for forming an image on only one side of the recording sheet or a double-sided print mode for forming images on both sides of the recording sheet. Further, the image forming apparatus 103 displays, for example, a maintenance schedule on the control panel 82.

Figure 5:
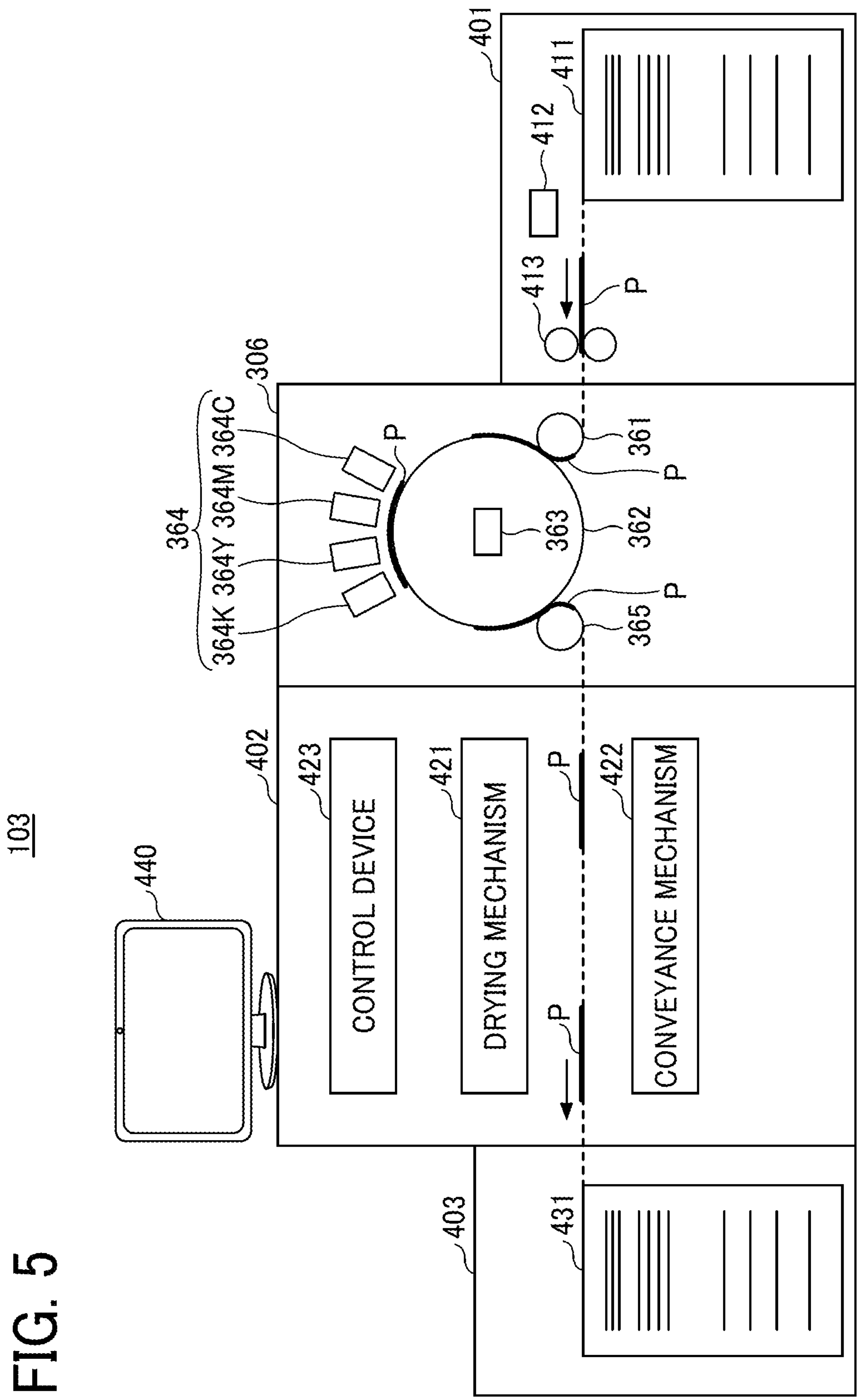
FIG. 5 is a schematic diagram illustrating a modification of the configuration of the image forming apparatus, according to an embodiment of the present disclosure.

FIG. 5 is a diagram illustrating a modification of the image forming apparatus 103. The image forming apparatus 103 of FIG. 5 is an inkjet image forming apparatus. The image forming apparatus 103 includes a sheet feeding unit 401, an image forming unit 306, a drying unit 402, a sheet ejection unit 403, and a controller 423. In the image forming apparatus 103, the image forming unit 306 forms an image on a sheet P with ink. The sheet P serves as a recording medium as a sheet material fed from the sheet feeding unit 401, according to embodiments of the present disclosure. Ink serves as liquid for image formation according to embodiments of the present disclosure. The image forming apparatus 103 dries the ink adhering to the sheet P in the drying unit 402, and thereafter ejects the sheet P from the sheet ejection unit 403.

The sheet feeding unit 401 includes a sheet feeding tray 411 on which a plurality of sheets P are stacked, a feeding device 412 that separates and feeds the sheets P one by one from the sheet feeding tray 411, and a registration roller pair 413 that feeds the sheets P to the image forming unit 306. The feeding device 412 may be any feeding device such as a device using a roller(s) and a device using air suction. After the leading edge of the sheet P fed from the sheet feeding tray 411 by the feeding device 412 reaches the registration roller pair 413, the registration roller pair 413 is driven at a predetermined point in time to feed the sheet to the image forming unit 306. In the present embodiment, the configuration of the sheet feeding unit 401 is not limited to any particular configuration as long as the sheet feeding unit 401 can feed the sheet P to the image forming unit 306.

The image forming unit 306 includes a sheet receiving cylinder 361 and a sheet conveyor drum 362. The sheet receiving cylinder 361 receives the fed sheet P. The sheet conveyor drum 362 conveys the sheet P fed from the sheet receiving cylinder 361 while carrying the sheet P on the outer circumferential surface of the sheet conveyor drum 362. The image forming unit 306 further includes an ink discharge unit 364 and a sheet transfer cylinder 365. The ink discharge unit 364 discharges ink toward the sheet P on the sheet conveyor drum 362. The sheet transfer cylinder 365 transfers the sheet P conveyed from the sheet conveyor drum 362 to the drying unit 402. The leading end of the sheet P conveyed from the sheet feeding unit 401 to the image forming unit 306 is gripped by a sheet gripper disposed on the surface of the sheet receiving cylinder 361. The sheet P is conveyed along with the movement of the surface of the sheet receiving cylinder 361. The sheet P conveyed by the sheet receiving cylinder 361 is delivered to the sheet conveyor drum 362 at a position facing the sheet conveyor drum 362.

A sheet gripper is also disposed on the surface of the sheet conveyor drum 362, and the leading end of the sheet is gripped by the sheet gripper. Multiple suction holes are dispersedly formed on the surface of the sheet conveyor drum 362. A suction device 363 generates a suction airflow toward the inside of the sheet conveyor drum 362 in suction holes. The leading end of the sheet P forwarded from the sheet receiving cylinder 361 to the sheet conveyor drum 362 is gripped by the sheet gripper. The sheet P is attracted to the surface of the sheet conveyor drum 362 by the sucking-in airflow and is conveyed as the sheet conveyor drum 362 rotates.

The ink discharge unit 364 of the present embodiment discharges four color inks of cyan (C), magenta (M), yellow (Y), and black (K), to form an image. The ink discharge unit 364 includes individual liquid discharge heads 364C, 364M, 364Y, and 364K for inks. The configuration of the liquid discharge heads 364C, 364M, 364Y, and 364K is not limited to any particular configuration and may be any configuration that can discharge liquid. The image forming apparatus 103 may include a liquid discharge head that discharges a special ink such as white, gold, or silver as needed. Further, the image forming apparatus 103 may include a liquid discharge head that discharges a liquid that does not contribute to image formation, such as a surface coating liquid.

Discharge operations of the liquid discharge heads 364C, 364M, 364Y, and 364K of the ink discharge unit 364 are controlled by driving signals corresponding to image information. When the sheet P carried on the sheet conveyor drum 362 passes through an area facing the ink discharge unit 364, color inks are discharged from the liquid discharge heads 364C, 364M, 364Y, and 364K to form an image corresponding to the image information. In the present embodiment, the configuration of the image forming unit 306 is not limited to any particular configuration as long as an image is formed by applying liquid onto the sheet P.

The drying unit 402 includes a drying mechanism 421 and a conveying mechanism 422. The drying mechanism 421 dries ink adhering to the sheet P in the image forming unit 306. The conveying mechanism 422 conveys a sheet P conveyed from the image forming unit 306. The sheet P conveyed from the image forming unit 306 is received by the conveying mechanism 422, then conveyed so as to pass through the drying mechanism 421, and delivered to the sheet ejection unit 403. When the sheet P passes through the drying mechanism 421, ink on the sheet P is subjected to a drying process. Accordingly, liquid components such as moisture in the ink are evaporated, the ink adheres on the sheet P, and curling of the sheet P is prevented.

The sheet ejection unit 403 includes a sheet ejection tray 431 on which a plurality of sheets P are stacked. The sheet P conveyed from the drying unit 402 is sequentially stacked and held on the sheet ejection tray 431. In the present embodiment, the configuration of the sheet ejection unit 403 is not limited to any particular configuration and may be any configuration that can eject the sheet P.

The controller 423 is an information processing device that controls the image forming apparatus 103. The controller 423 includes, for example, a CPU, a RAM, a ROM, an SSD (HDD), and a communication device. The controller 423 communicates with the DFE 102 to receive setting values and operation requests according to execution of a task.

The image forming apparatus 103 includes a display 440 that is built in the image forming apparatus. Alternatively, the display 440 as an external device is attached to the image forming apparatus 103. The image forming apparatus 103 displays, for example, a maintenance schedule on the display 440. The terminal apparatus 101 or the DFE 102 can also display the maintenance schedule.

Server Apparatus

Figure 6:
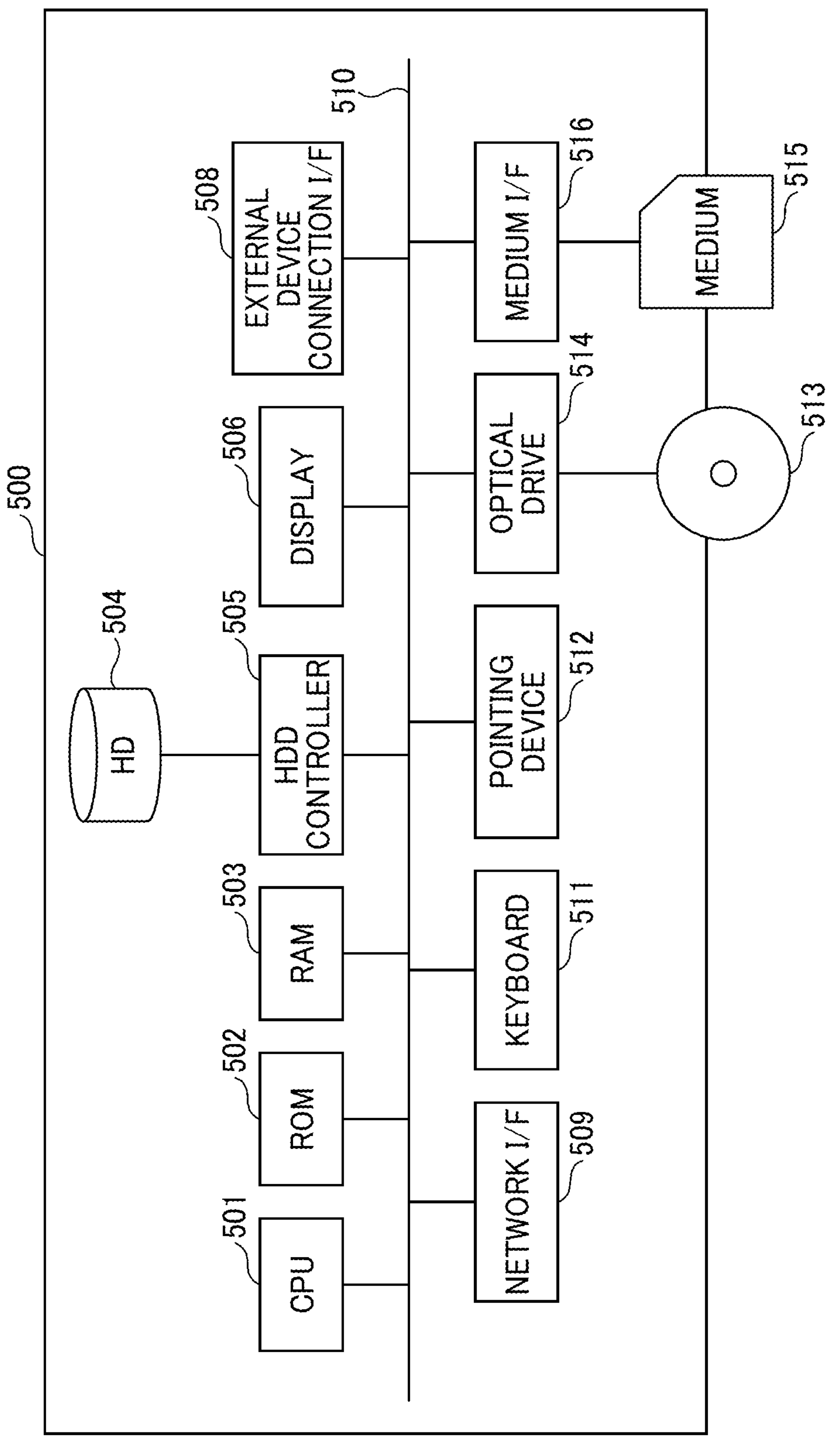
FIG. 6 is a block diagram illustrating a hardware configuration of a computer, according to an embodiment of the present disclosure.

As illustrated in FIG. 6, the server apparatus 104 has a configuration as a computer 500. FIG. 6 is a block diagram illustrating a hardware configuration of the computer 500. As illustrated in FIG. 6, the computer 500 is implemented by a computer. As illustrated in FIG. 6, the computer 500 includes a CPU 501, a ROM 502, a RAM 503, a hard disk (HD) 504, an HDD controller 505, a display 506, an external device connection I/F 508, a network I/F 509, a bus line 510, a keyboard 511, a pointing device 512, an optical drive 514, and a medium I/F 516.

The CPU 501 controls overall operation of the computer 500. The ROM 502 stores a program such as an initial program loader (IPL) to boot the CPU 501. The RAM 503 is used as a work area for the CPU 501. The HD 504 stores various data such as a program. The HDD controller 505 controls reading and writing of various data from and to the HD 504 under control of the CPU 501. The display 506 displays various kinds of information such as a cursor, a menu, a window, a character, or an image. The external device connection I/F 508 is an interface that connects the computer 500 to various external devices. Examples of the external devices include, but are not limited to, a universal serial bus (USB) memory and various printers. The network I/F 509 is an interface that controls communication of data with an external device through a communication network. The bus line 510 is, for example, an address bus or a data bus, which electrically connects the components such as the CPU 501 illustrated in FIG. 6.

Further, the keyboard 511 serves as an input means including a plurality of keys to be used for inputting, for example, characters, numerical values, and various instructions according to embodiments of the present disclosure. The pointing device 512 serves as an input means to be used for, for example, selecting or executing various kinds of instructions, selecting a target for processing, or moving a cursor being displayed according to embodiments of the present disclosure. The optical drive 514 controls reading or writing of various data from or to an optical storage medium 513, which serves as a removable storage medium according to embodiments of the present disclosure. Examples of the optical storage medium 513 include, but are not limited to, a compact disc (CD), a digital versatile disc (DVD), and a Blu-ray® disc. The medium I/F 516 controls reading or writing (storing) of data from or to a storage medium 515 such as a flash memory.

Functions

Figure 7:
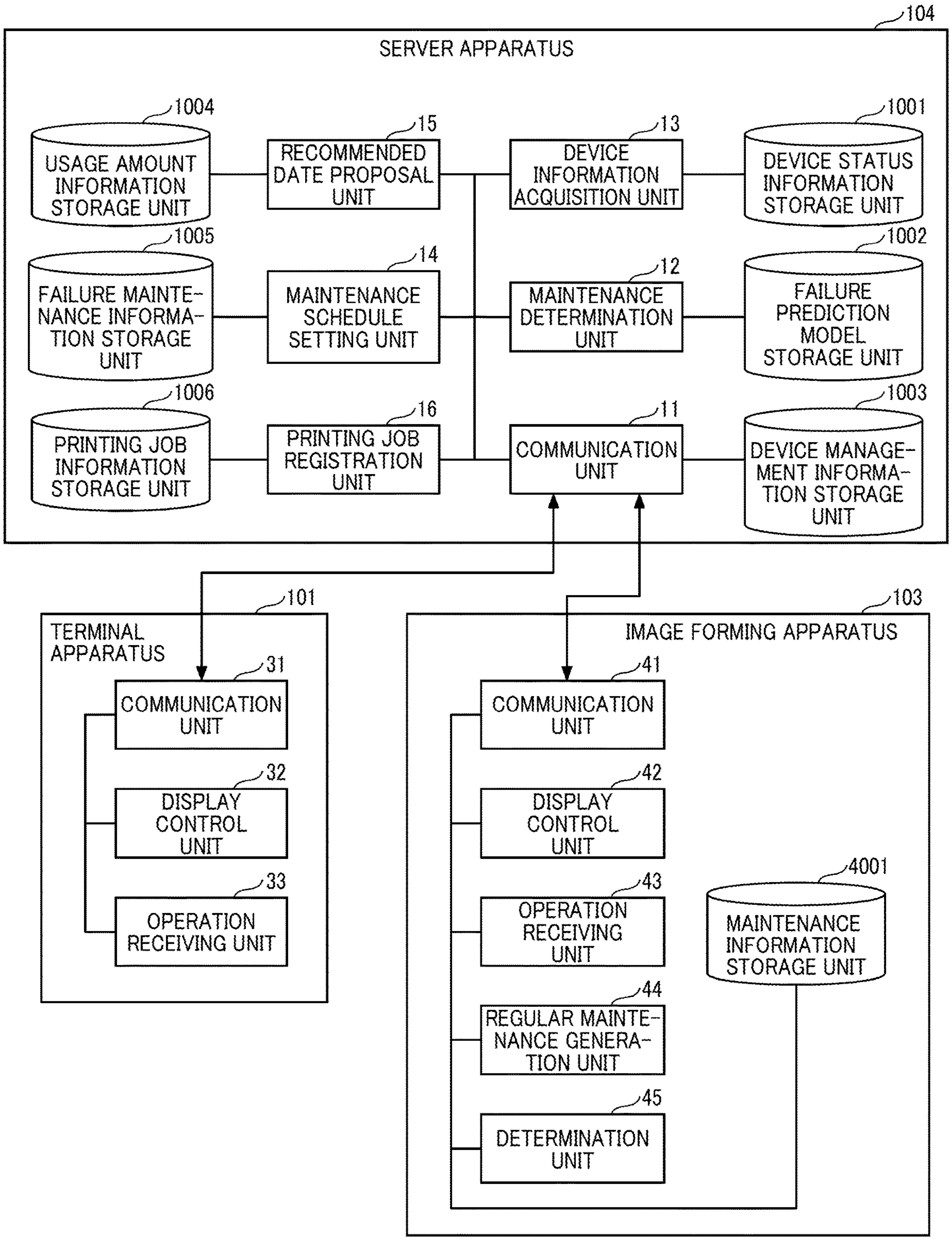
FIG. 7 is a block diagram illustrating functional configurations of a server apparatus, a terminal apparatus, and the image forming apparatus, according to an embodiment of the present disclosure.

Functions of the apparatuses that the maintenance management system 1 includes are described with reference to, for example, FIG. 7. FIG. 7 is a block diagram illustrating functional configurations of the server apparatus 104, the terminal apparatus 101, and the image forming apparatus 103 that the maintenance management system 1 includes.

Server Apparatus

The server apparatus 104 includes a communication unit 11, a maintenance determination unit 12, a device information acquisition unit 13, a maintenance schedule setting unit 14, a recommended date proposal unit 15, and a printing job registration unit 16. The functions of the server apparatus 104 are functions or means implemented as the CPU 501 illustrated in FIG. 6 executes instructions included in one or more programs installed on the server apparatus 104.

The server apparatus 104 further includes a device status information storage unit 1001, a failure prediction model storage unit 1002, a device management information storage unit 1003, a usage amount information storage unit 1004, a failure maintenance information storage unit 1005, and a printing job information storage unit 1006. Each of the above-mentioned storage units is implementable by, for example, the HD 504 or the RAM 503 illustrated in FIG. 6.

The communication unit 11 receives device status information from the image forming apparatus 103. When the maintenance determination unit 12 detects a sign of failure, the communication unit 11 transmits a recommended execution time period for additional maintenance to the image forming apparatus 103. Further, the communication unit 11 refers to device management information stored in the device management information storage unit 1003, and sends a notification to the contact of an operator in charge of maintenance of the image forming apparatus 103 in which predictive failure has occurred.

The device information acquisition unit 13 acquires the device status information from the image forming apparatus 103 via the communication unit 11, and stores the device status information in the device status information storage unit 1001. The device status information indicates an in-use condition of the image forming apparatus 103. The device status information is information including a measurement value obtained by measuring, for example, current, voltage, or temperature of the components of the image forming apparatus 103 with various sensors and a counter value indicating the number of times print data is printed on a sheet by the image forming apparatus 103.

The maintenance determination unit 12 detects a sign of failure occurring in the image forming apparatus 103 on the basis of the device status information acquired by the device information acquisition unit 13 and a failure prediction model stored in the failure prediction model storage unit 1002 described below. The sign of the failure indicates what kind of failure (type of failure) is expected to occur in the image forming apparatus 103. The sign of failure may further include, for example, a probability of occurrence of failure, a time period until occurrence of failure, and severity of failure that is expected to occur.

The maintenance schedule setting unit 14 determines a recommended execution time period for additional maintenance on the basis of the sign of failure detected by the maintenance determination unit 12, and transmits the determined recommended execution time period for additional maintenance to the image forming apparatus 103 via the communication unit 11. As described above, it is preferable that the recommended execution time period for additional maintenance is longer than at least one of a time period required for the additional maintenance and the recommended execution time period for regular maintenance and overlaps with the recommended execution time period for regular maintenance.

The recommended date proposal unit 15 proposes a recommended date on which the additional maintenance is to be performed within the recommended execution time period for the additional maintenance, on the basis of the usage amount for every day of the week stored in the usage amount information storage unit 1004.

The printing job registration unit 16 performs a process relating to registration of a printing job in a print sharing platform, for example. The printing job registration unit 16 determines whether the earliest available time among available times in which no printing job is scheduled to be executed is a scheduled date of the regular maintenance or within the recommended execution time period for additional maintenance. The printing job registration unit 16 determines in which available time a printing job is to be registered, for example, according to a user's operation.

In FIG. 7, the server apparatus 104 does not perform processing of a screen to be displayed on the display 440 by the image forming apparatus 103. This is because the image forming apparatus 103 generates a screen in the present embodiment. Alternatively, the server apparatus 104 may generate screen information of a screen to be displayed by the image forming apparatus 103. In this case, the server apparatus 104 generates screen information such as a maintenance schedule using, for example, hypertext markup language (HTML), extended markup language (XML), JavaScript®, and a cascade style sheet (CSS), and transmits the generated screen information to the image forming apparatus 103. A web browser of the image forming apparatus 103 receives the screen information and analyzes the received screen information, to display the maintenance schedule screen 600. As mentioned above, the maintenance schedule screen 600 may be displayed by a web application in which a server function of the server apparatus 104 and the web browser executed by the image forming apparatus 103 cooperate with each other. In this case, for example, the terminal apparatus 101 can display the maintenance schedule screen 600 in a simple manner, provided that the terminal apparatus includes a web browser.

Device Status Information Storage Unit 1001

FIG. 8 is a table of device status information stored in the device status information storage unit 1001, according to an embodiment of the present disclosure. As illustrated in FIG. 8, the device status information storage unit 1001 stores, for example, an acquisition date and time, a sensor A measured value, a sensor B measured value, and a counter value in association with a device ID that uniquely identifies the image forming apparatus 103. In addition to the device status information of the device ID "PP10001" illustrated in the figure, the device status information of other devices is also stored in the device status information storage unit 1001. The device status information indicates a record of measured values and counter values in the image forming apparatus 103 for predetermined times.

The acquisition date and time indicates a date and time when the image forming apparatus 103 transmits the device status information to the server apparatus 104. In the present embodiment described with reference to FIG. 8, the device status information is transmitted every day at 20:30. However, such a time of transmission is merely given by way of example. In an alternative embodiment of the present disclosure, the device status information may be transmitted at irregular intervals or multiple times a day.

The sensor A measured value and the sensor B measured value are measured values obtained by measuring, for example, currents, voltages, and temperatures of components of the image forming apparatus 103 by various sensors. Three or more sensor measured values are often obtained.

The counter value indicates an accumulated value of the number of pages printed by the image forming apparatus 103.

The maintenance determination unit 12 predicts the occurrence of a failure in the image forming apparatus 103 on the basis of the device status information and the failure prediction model stored in the failure prediction model storage unit 1002.

Failure Prediction Model Storage Unit 1002

The failure prediction model is data obtained by modeling conditions of the measured values or the counter values when a failure occurs. Multiple failure prediction models exist for multiple types of failure (failure types) respectively. Multiple failure prediction models may be further prepared for multiple device types, respectively.

For example, the failure prediction model storage unit 1002 stores a failure prediction model A for predicting the occurrence of failure A, a failure prediction model B for predicting the occurrence of failure B, and a failure prediction model C for predicting the occurrence of a failure C. The failure prediction model is info-nation that associates the device status information with, for example, a probability of occurrence of a failure, a time period until a failure occurs, and severity of a failure that is expected to occur. Such information may be manually created in advance by, for example, the administrator on the basis of past findings. Alternatively, such information may be created by machine learning.

Machine learning is a technique for causing a computer to acquire human-like learning capability, and refers to a technique in which a computer autonomously generates an algorithm required for e.g., determination of data identification from learning data acquired in advance, and applies the algorithm to new data to perform prediction. Any suitable learning method is applied for machine learning, for example, any one of supervised learning, unsupervised learning, semi-supervised learning, reinforcement learning, and deep learning, or a combination of two or more those learning. Machine learning methods include, for example, perceptron, deep learning, support-vector machine, logistic regression, naive Bayes, decision tree, and random forests, and are not limited the techniques described in the present embodiment.

For example, in a failure prediction model using deep learning as one of machine learning, the administrator prepares a set of e.g., device status information, a failure that has occurred, a time until the failure occurs, and severity as training data. A given information processing apparatus learns how to deal with the failure, with e.g., inputs of the device status information, the failure that has occurred, the time until the failure occurrence, and the severity as training data. Alternatively, in a failure prediction model using multiple regression as one of machine learning, a person in charge associates the device status information as an explanatory variable with the failure that has occurred as an objective variable using a polynomial. In substantially the same manner, the administrator associates the device status information with the time until the failure occurs using a polynomial, and associates the device status information with the severity using a polynomial. The coefficients of the polynomial are determined so that the difference between the objective variables and the values output by the polynomial is minimized (multiple regression analysis).

The prediction of failure is described with reference to the device status information of FIG. 8. For example, when the device status information of the device ID "PP10001" is acquired, the maintenance determination unit 12 predicts an occurrence of the failure A (detects a sign) on the basis of the device status information and the failure prediction model A for predicting the occurrence of the failure A. In substantially the same manner, the maintenance determination unit 12 predicts an occurrence of the failure B (detects a sign) on the basis of the device status information and the failure prediction model B for predicting the occurrence of the failure B. Other failures are predicted (signs are detect) in substantially the same manner. As described, the maintenance determination unit 12 predicts the occurrence of e.g., the failures A to C corresponding to the failure prediction models for the failures A to C stored in the failure prediction model storage unit 1002.

Device Management Information Storage Unit 1003

FIG. 9 is a table of device management information stored in the device management information storage unit 1003, according to an embodiment of the present disclosure. As illustrated in FIG. 9, items of a device ID, an internet protocol (IP) address, and an e-mail address are registered in the device management information storage unit 1003.

The item "device ID" is identification information for identifying the image forming apparatus 103.

The item "IP address" is an IP address of the image forming apparatus 103. The server apparatus 104 can transmit, for example, a recommended execution time period for additional maintenance to the IP address as a destination.

The e-mail address is an e-mail address of, for example, the administrator of the image forming apparatus 103. The server apparatus 104 can transmit, for example, a notification indicating that additional maintenance is set and a notification indicating that the recommended execution time period for additional maintenance is about to end, to the e-mail address as a destination.

Usage Amount Information Storage Unit 1004

FIG. 10 is a table of usage amount information stored in the usage amount information storage unit 1004 according to an embodiment of the present disclosure. As illustrated in FIG. 10, in the usage amount information storage unit 1004, usage amounts are registered in association with dates.

The "date" is a date on which the corresponding usage amount for one day is accounted for. For example, the day of the week is registered as illustrated in FIG. 10. In another example, the day of the week may be obtained from a calendar that server apparatus 104 has. The usage amount is accounted for per half a day, instead of per day. In this case, the recommended date proposal unit 15 can propose a recommended date on a half-day basis.

The "usage amount" is the total number of pages printed daily. Alternatively, the usage amount may be, for example, an operating time of the image forming apparatus 103 or a usage amount of toner or ink.

Failure Maintenance Information Storage Unit 1005

FIG. 11A is a table of failure maintenance information stored in the failure maintenance information storage unit 1005 according to an embodiment of the present disclosure. As illustrated in FIG. 11A, in the failure maintenance information storage unit 1005, items such as additional maintenance, a maintenance deadline, an operator, and a work time are registered in association with a failure type. The failure maintenance information may be different for device models or may be common to device models.

The item "failure type" indicates what kind of sign of failure is detected by the maintenance determination unit 12.

The item "additional maintenance" is a content of additional maintenance required for maintenance for the failure for which the sign is detected.

The item "maintenance deadline" indicates by when the additional maintenance is to be performed. The maintenance deadline is determined on the basis of a time period in which it is estimated that no failure will occur until the maintenance deadline according to the failure type, with the business day next to the diagnosis date by the maintenance determination unit 12 as a start time. It is not that the failure occurs immediately after the expiration of the maintenance deadline. There is a risk that the possibility of the failure gradually increases after the expiration of the maintenance deadline. Further, the maintenance deadline is set longer than a time period required for the additional maintenance. When the maintenance schedule setting unit 14 determines a time period corresponding to the maintenance deadline as the recommended execution time period for additional maintenance, the recommended execution time period for additional maintenance that is longer than a time period required for the additional maintenance can be determined. Further, the maintenance deadline is set longer than the recommended execution time period for regular maintenance.

The item "operator" defines a preferred operator who should perform additional maintenance and a skill of the operator. For example, an operator who deals with the failure A may be a user, but a skill of level 2 is required for the user to deal with the failure A. An operator who deals with the failure C may be a user, but a skill of level 1 is required for the user to deal with the failure C. The operator who deals with the failure B should be a service engineer (customer engineer).

The item "work time" is a typical time period required for the corresponding maintenance work, and is calculated by, for example, performing statistical processing on the actual work time in the past.

Printing Job Information Storage Unit 1006

FIG. 11B is a table of printing job information stored in the printing job information storage unit 1006 according to an embodiment of the present disclosure. As illustrated in FIG. 11B, items such as a scheduled execution date and time, a job owner, and a job file are registered in association with each printing job in the printing job information storage unit 1006.

In the item "printing job," identification information of the printing job is set. The printing job registration unit 16 assigns multiple pieces of identification information to the printing jobs in a manner that the multiple pieces of identification information do not overlap with each other.

In the item "scheduled execution date and time," a time period during which the corresponding printing job is scheduled to be executed is set. The scheduled execution date and time is the closest available time of the image forming apparatus 103 at the time of registration of the printing job or an available time designated by the user. The time period required to complete the printing job is predicted from print conditions such as color/monochrome, single-sided/double-sided, and a print sheet size, the number of pages, the number of copies, and the capability of the image forming apparatus.

In the item "job owner," for example, identification information or a name of a user who registered the corresponding printing job is set.

In the item "job file," a document file to be printed according to the corresponding printing job is set. The job file may include print settings such as color/monochrome, single-sided/double-sided, a print sheet size, the number of pages, and the number of copies.

Terminal Apparatus

Referring again to FIG. 7, a functional configuration of the terminal apparatus 101 is described. The terminal apparatus 101 includes a communication unit 31, a display control unit 32, and an operation receiving unit 33. The functions of the terminal apparatus 101 are functions or means implemented by a web browser executing JavaScript® included in screen information and cooperating with the web application of the server apparatus 104.

The communication unit 31 typically communicates with the server apparatus 104, receives screen information of the maintenance schedule screen 600 from the server apparatus 104, and transmits information entered by the administrator to, for example, the maintenance schedule screen 600 to the server apparatus 104.

The display control unit 32 analyzes the screen information transmitted from the server apparatus 104 and displays, for example, the maintenance schedule screen 600 described below on the display 440.

The operation receiving unit 33 receives an operation and an input to the maintenance schedule screen 600 by the administrator or a general user.

Image Forming Apparatus

A functional configuration of the image forming apparatus 103 is described below. The image forming apparatus 103 includes a communication unit 41, a display control unit 42, an operation receiving unit 43, a regular maintenance generation unit 44, and a determination unit 45. The functionals of the image forming apparatus 103 are functions or means implemented as a CPU of the control panel 82 or the CPU of the controller 423 executes instructions included in one or more programs installed on the image forming apparatus 103.

The image forming apparatus 103 further includes a maintenance information storage unit 4001. The storage unit can be implemented by, for example, the HDD or the SSD of the control panel 82 illustrated in FIG. 4 or an HDD or an SSD of the controller 423 illustrated in FIG. 5.

The communication unit 41 communicates with the communication unit 11 of the server apparatus 104. The communication unit 41 is implemented by, for example, a communication interface that performs communication using transmission control protocol/internet protocol (TCP/IP), such as a network card, or a communication program that controls communication with a USB cable. The communication unit 41 transmits the device status information and the usage amount information to the server apparatus 104, receives the recommended execution time period for additional maintenance, and stores the received recommended execution time period for additional maintenance in the maintenance information storage unit 4001.

The display control unit 42 displays, for example, the recommended execution time period for regular maintenance and the recommended execution time period for additional maintenance stored in the maintenance information storage unit 4001 on the maintenance schedule screen 600. The display control unit 42 further displays, for example, a recommended date of the recommended execution time period for additional maintenance.

The operation receiving unit 43 receives an operation and an input to the maintenance schedule screen 600 by a user.

The regular maintenance generation unit 44 determines whether regular maintenance is to be performed. When the determination result indicates that regular maintenance is to be performed, the regular maintenance generation unit 44 stores a recommended execution time period for regular maintenance in the maintenance information storage unit 4001. The regular maintenance generation unit 44 determines that regular maintenance is to be performed, for example, for each counter value of a certain number of sheets, on the basis of the counter value. The regular maintenance generation unit 44 determines to perform regular maintenance determined according to the counter value. Since the workload and the work time of regular maintenance are small, the regular maintenance generation unit 44 allocates several hours or one day in the case of a day unit to the recommended execution time period for regular maintenance.

When the operator performs a predetermined operation on the image forming apparatus 103, the determination unit 45 determines whether the current date is within the recommended execution time period for additional maintenance. When the current date is within the recommended execution time period for additional maintenance, the display control unit 42 displays that the current day is the recommended execution time period for additional maintenance on the display 440 of the image forming apparatus 103.

Maintenance Information Storage Unit 4001

Maintenance information is described below with reference to FIG. 12. The maintenance information stored in the image forming apparatus 103 includes additional maintenance information transmitted from the server apparatus 104 and regular maintenance information generated by the image forming apparatus 103. The regular maintenance information and the additional maintenance information are described.

FIG. 12A is a table of the regular maintenance information generated by the regular maintenance generation unit 44 according to an embodiment of the present disclosure. As illustrated in FIG. 12A, a schedule of regular maintenance generated by the image forming apparatus 103 is registered in a chronological order. The regular maintenance information includes items of a maintenance name, a diagnosis date, a scheduled date, an operator, and a work time.

The item "maintenance name" is a name of regular maintenance determined by the regular maintenance generation unit 44 according to the counter value.

The item "diagnosis date" is a date on which the regular maintenance generation unit 44 determines that regular maintenance is to be performed. The diagnosis date may be a fixed point in time, for example, every other week or every other Monday. The above is merely one example of the frequency of diagnosis, and the diagnosis can be performed at any suitable intervals. Further, the frequency of diagnosis may vary depending on the type of maintenance, or parts, portions, or components to be diagnosed.

The item "scheduled date" indicates a deadline of a date determined by the regular maintenance generation unit 44 on which the regular maintenance is to be performed. The date on which the regular maintenance is to be performed is, for example, a date on which the counter value is expected to reach a certain value.

The item "operator" indicates a skill required to perform the corresponding regular maintenance. The operator is automatically determined according to the type of regular maintenance.

The item "work time" is a time period required for a work of the corresponding regular maintenance. For regular maintenance, the work time is automatically determined by a content of the maintenance.

FIG. 12B is a table of additional maintenance information relating to additional maintenance transmitted by the server apparatus 104. The additional maintenance information includes the items of the maintenance name, the operator, and the work time, which are the same or substantially the same as those of the regular maintenance information illustrated in FIG. 12B.

The "diagnosis date" is a date on which the maintenance determination unit 12 detects a sign of failure.

The "start of recommended execution time period" is a start time of the recommended execution time period for additional maintenance. The start of recommended execution time period may be, for example, the business day next to the diagnosis date. The start of recommended execution time period is transmitted from the server apparatus 104.

The "end of recommended execution time period" is an end time of the recommended execution time period for additional maintenance. The end of recommended execution time period is, for example, a date obtained by adding the maintenance deadline of FIG. 11A to the start of the recommended execution period. The end of recommended execution time period is transmitted from the server apparatus 104.

Accordingly, the maintenance information storage unit 4001 of the image forming apparatus 103 stores the maintenance information obtained by integrating the regular maintenance information of FIG. 12A and the additional maintenance information of FIG. 12B. FIG. 12C is a table of maintenance information stored in the maintenance information storage unit 4001 according to an embodiment of the present disclosure. The items of the maintenance name, the diagnosis date, the start date, the end date, the operator, and the work time correspond to the items in FIG. 12A or 12B. In other words, the items of the maintenance name and the diagnosis date are the same as the maintenance name and the diagnosis date in FIG. 12A or FIG. 12B. The start date corresponds to the start of recommended execution time period in FIG. 12B. The end date corresponds to the end of recommended execution time period in FIG. 1$^2$B. The item "operator" and the item "work time" are the same as the operator and the work time in FIG. 12A or FIG. 12B.

The item "recommended date" is set in a case where the recommended date proposal unit 15 proposes a recommended date.

In the item "execution date," a date (or a date and time) when a user performs the corresponding maintenance and touches an "Executed" button.

Figure 13:
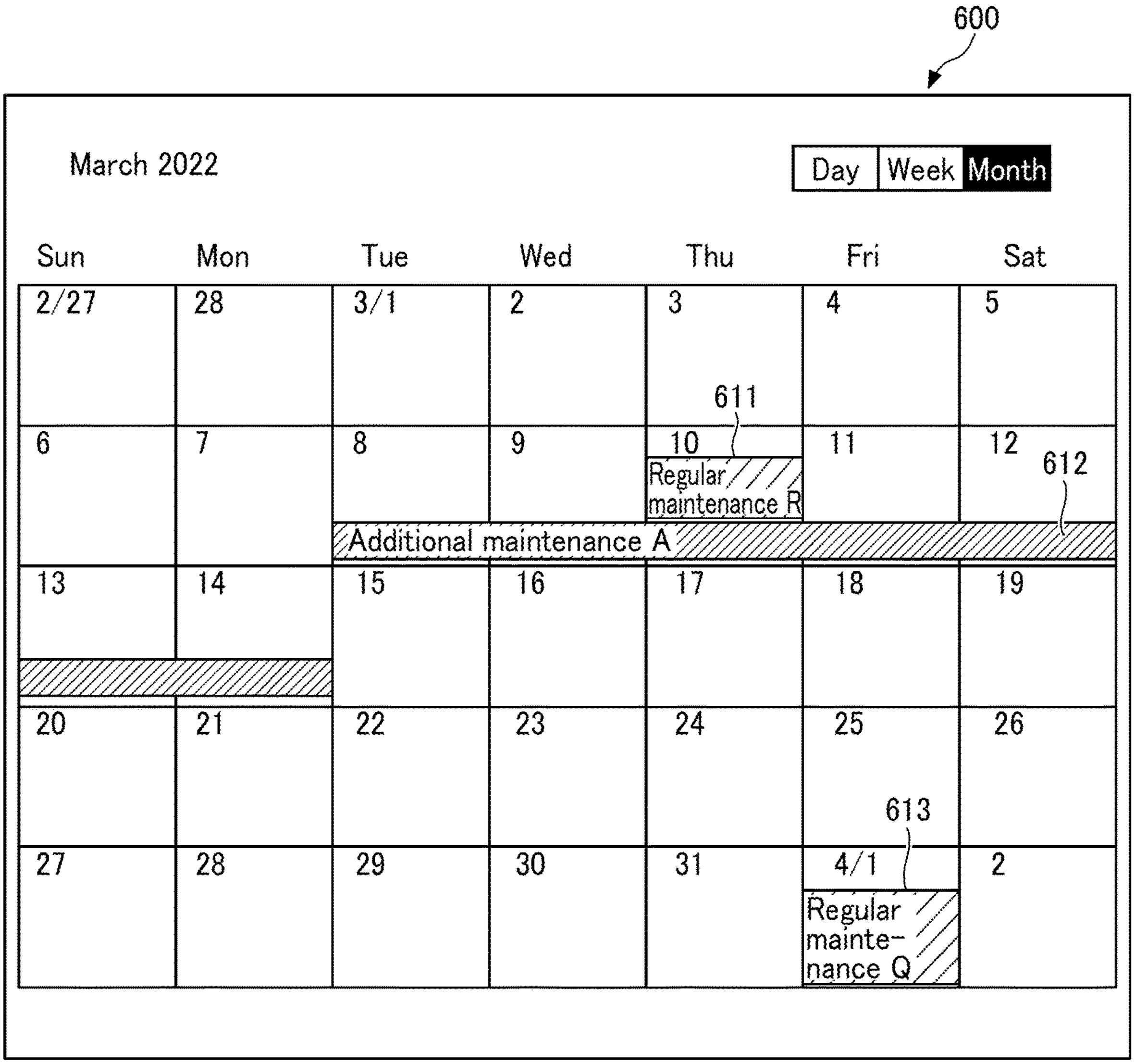
FIG. 13 is a diagram illustrating the maintenance schedule screen based on the maintenance information stored in a maintenance information storage unit, according to an embodiment of the present disclosure.

FIG. 13 illustrates the maintenance schedule screen 600 based on the maintenance information illustrated in FIG. 12C stored in the maintenance information storage unit 4001. In the figure, the recommended date is omitted. On the basis of the additional maintenance A in FIG. 12C, a recommended execution time period 612 for additional maintenance is displayed. On the basis of the regular maintenance R in FIG. 12C, a recommended execution time period 611 for regular maintenance is displayed. On the basis of the regular maintenance Q in FIG. 12C, a recommended execution time period 613 for regular maintenance is displayed.

The reason why the recommended execution time period 612 for additional maintenance based on the additional maintenance B in FIG. 12C is not displayed is that the operator is a service engineer (typically a person belonging to a service provider affiliated with a sales destination of the image forming apparatus 103 and an external person viewed from the user.

In other words, on the maintenance schedule screen 600, only the recommended execution time period for maintenance to be executed by the user is displayed. This makes it easy for the user to judge maintenance to be executed. However, when the user performs a predetermined operation, additional maintenance for which the operator is a service engineer may be displayed. In this case, it is preferable that a notification indicating that the operator is a service engineer is displayed. The service engineer may be referred to as a customer engineer.

Examples of Screen

Display examples of a maintenance schedule are described with reference to FIG. 14 to FIG. 17. Maintenance schedules described below are different from the maintenance schedule illustrated in FIG. 12C.

Figure 14:
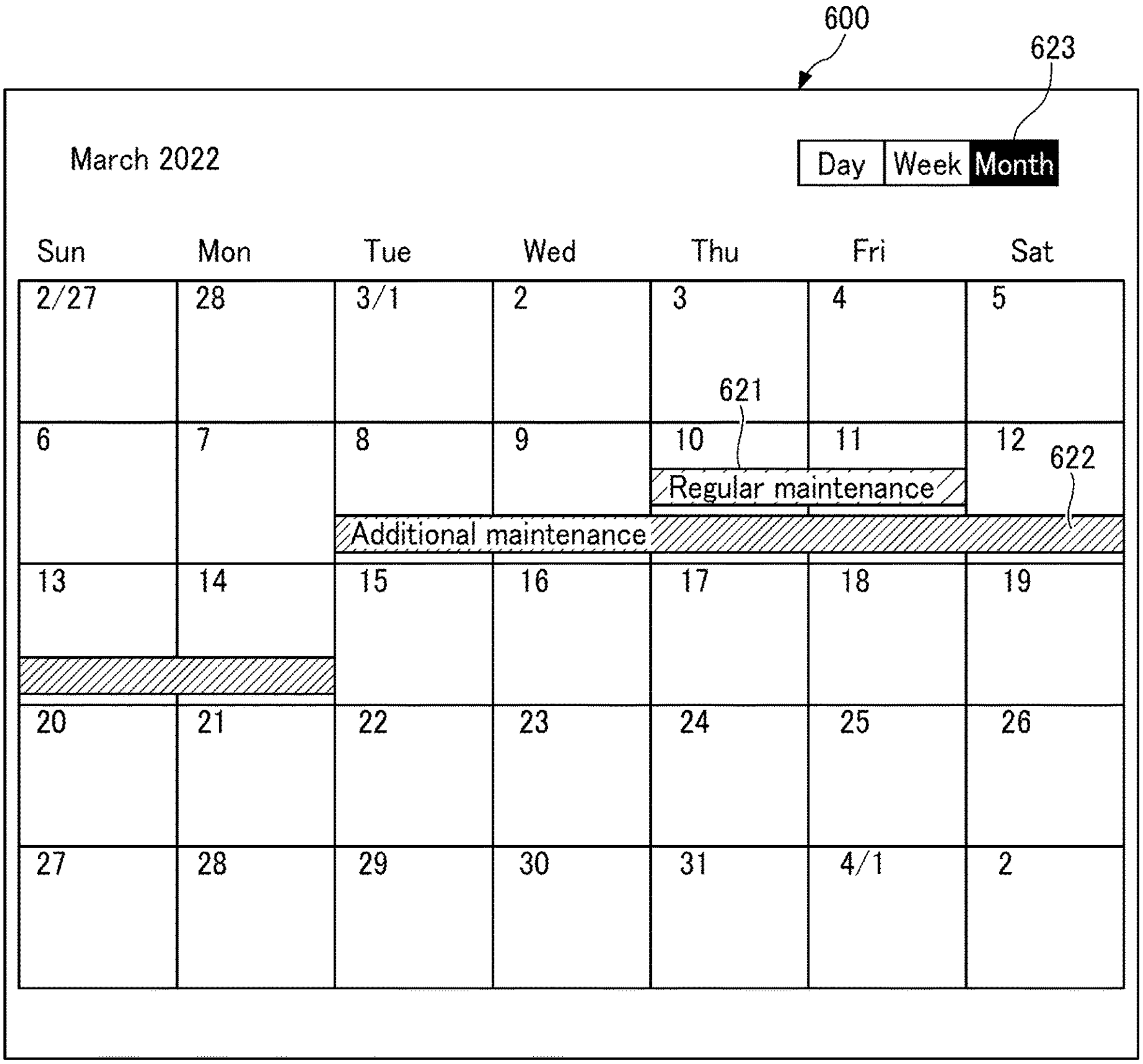
FIG. 14 is a diagram illustrating a maintenance schedule displayed by the image forming apparatus, according to an embodiment of the present disclosure.

FIG. 14 illustrates a maintenance schedule displayed by the image forming apparatus 103 according to an embodiment of the present disclosure. The maintenance schedule illustrated in FIG. 14 is monthly and displayed on a calendar. A switching button 623 is used to switch a display mode of the maintenance schedule among monthly, weekly, and daily.

On the calendar, a recommended execution time period 621 for regular maintenance and a recommended execution time period 622 for additional maintenance are displayed. While the recommended execution time period 621 for regular maintenance is two days, the recommended execution time period 622 for additional maintenance is seven days. The display of the recommended execution time period 622 for additional maintenance on the calendar does not indicate that additional maintenance is performed for all of the seven days or every day. Rather, the display of the recommended execution time period 622 for additional maintenance indicates a time period during which a user has to perform additional maintenance (may be multiple).

The recommended execution time period 622 for additional maintenance displayed on the calendar is longer than a time period required for additional maintenance. For example, when it is predicted that additional maintenance that ends in one day is to be performed, the recommended execution time period 622 for additional maintenance is longer than one day. In other words, the recommended execution time period 622 for additional maintenance may be one day and half a day, several days, or even several weeks in some cases. When it is predicted that maintenance that ends in half a day is to be performed, the recommended execution time period 622 for additional maintenance is longer than half a day. When it is predicted that maintenance that ends in one hour is to be performed, the recommended execution time period 622 for additional maintenance is longer than one hour. In other words, the maintenance schedule setting unit 14 sets, for additional maintenance that completes in one hour, the recommended execution time period 622 for additional maintenance to two hours or sets the recommended execution time period 622 for additional maintenance to several days.

Further, the recommended execution time period 622 for additional maintenance is preferably longer than the recommended execution time period 621 for regular maintenance. As a result, the recommended execution time period 622 for additional maintenance is likely to overlap with the recommended execution time period 621 for regular maintenance. Accordingly, the user can perform the additional maintenance before or after the regular maintenance. Further, a point in time when the operator performs additional maintenance is determined so that production work using the image forming apparatus 103 does not hinder.

In the example of FIG. 14, the diagnosis date is March 7, and the maintenance deadline is one week. Accordingly, the maintenance schedule setting unit 14 sets a time period from March 8, which is next business day of the diagnosis date, to March 14, as the recommended execution time period 622 for additional maintenance. The regular maintenance is set in advance (independently from the additional maintenance) to March 10 and 11.

The recommended execution time period 622 for additional maintenance preferably overlaps with the recommended execution time period 621 for regular maintenance. Alternatively, the recommended execution time period 622 for additional maintenance may be immediately before the recommended execution time period 621 for regular maintenance or immediately after the recommended execution time period 621 for regular maintenance. In this case, in the example of FIG. 14, the recommended execution time period 622 for additional maintenance is set on March 9, which is the day before March 10, and on March 8, which is the beginning of the recommended execution time period, and/or on and after March 12, which is the day after March 11. The same applies to a display of the maintenance schedule screen illustrated in FIG. 17.

Figure 15:
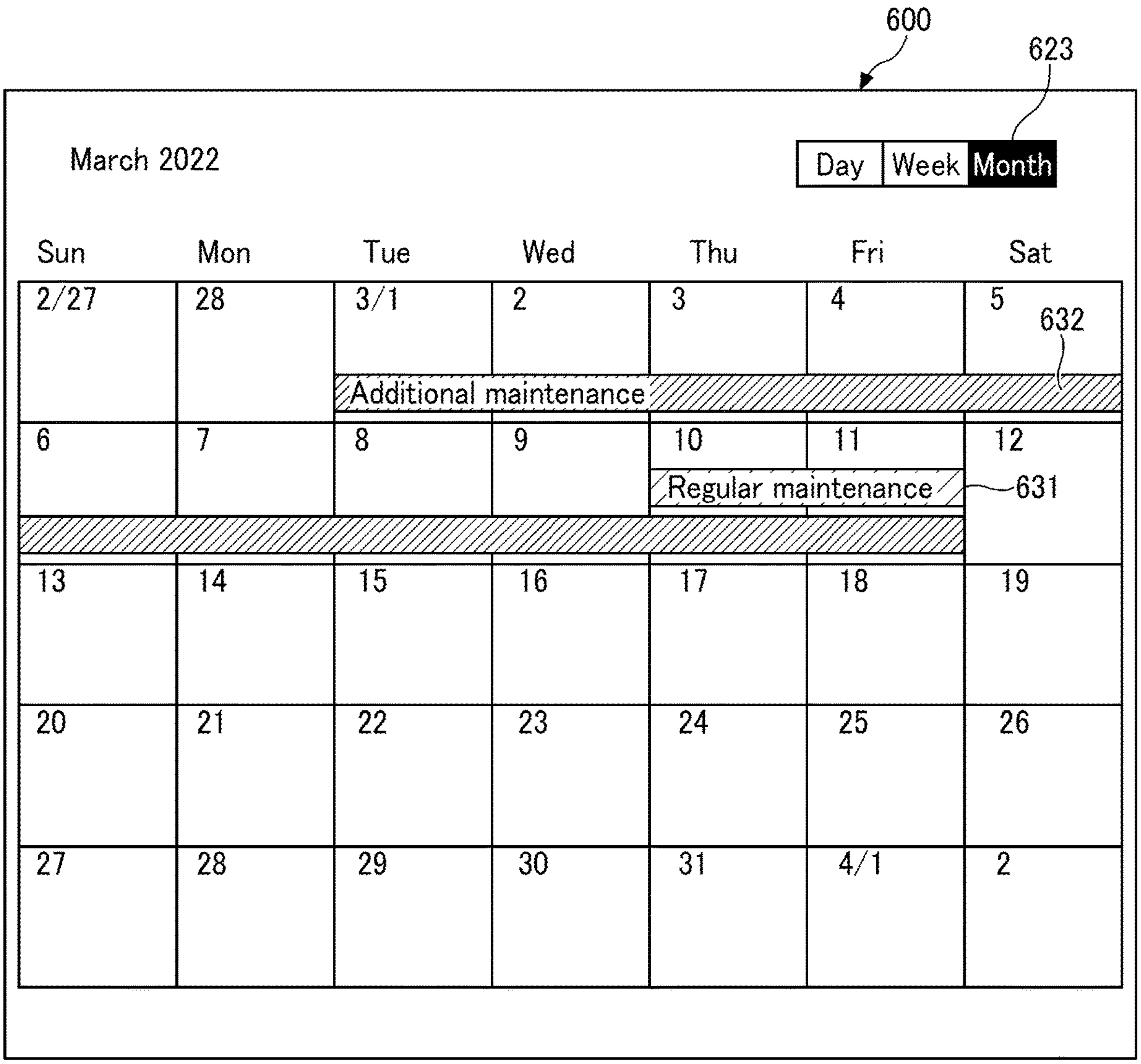
FIG. 15 is a diagram illustrating a recommended execution time period for additional maintenance that is determined to overlap with a recommended execution time period for regular maintenance, according to an embodiment of the present disclosure.

Further, as illustrated in FIG. 15, when regular maintenance is already registered, the maintenance schedule setting unit 14 may determine a recommended execution time period 632 for additional maintenance so as to overlap with a recommended execution time period 631 for regular maintenance, which is the earliest regular maintenance. FIG. 15 is a diagram illustrating a recommended execution time period for additional maintenance that is determined to overlap with a recommended execution time period of regular maintenance according to an embodiment of the present disclosure. It is assumed that the diagnosis date is February 28, and the maintenance deadline is one week. However, the regular maintenance is set in advance on March 10 and 11. In this case, the maintenance schedule setting unit 14 sets a time period from March 1 to March 7 as the recommended execution time period 632 for additional maintenance, and further extends the time period to determine the recommended execution time period 632 for additional maintenance that covers March 10 and 11. Such a configuration makes it easier for the user to perform additional maintenance before or after the regular maintenance. Even when a sign of failure is detected, failure rarely occurs immediately when the maintenance deadline expires. Accordingly, the processing as described with reference to FIG. 15 makes it easy for the operator to perform additional maintenance so that production work using the image forming apparatus 103 does not hinder.

Figure 16:
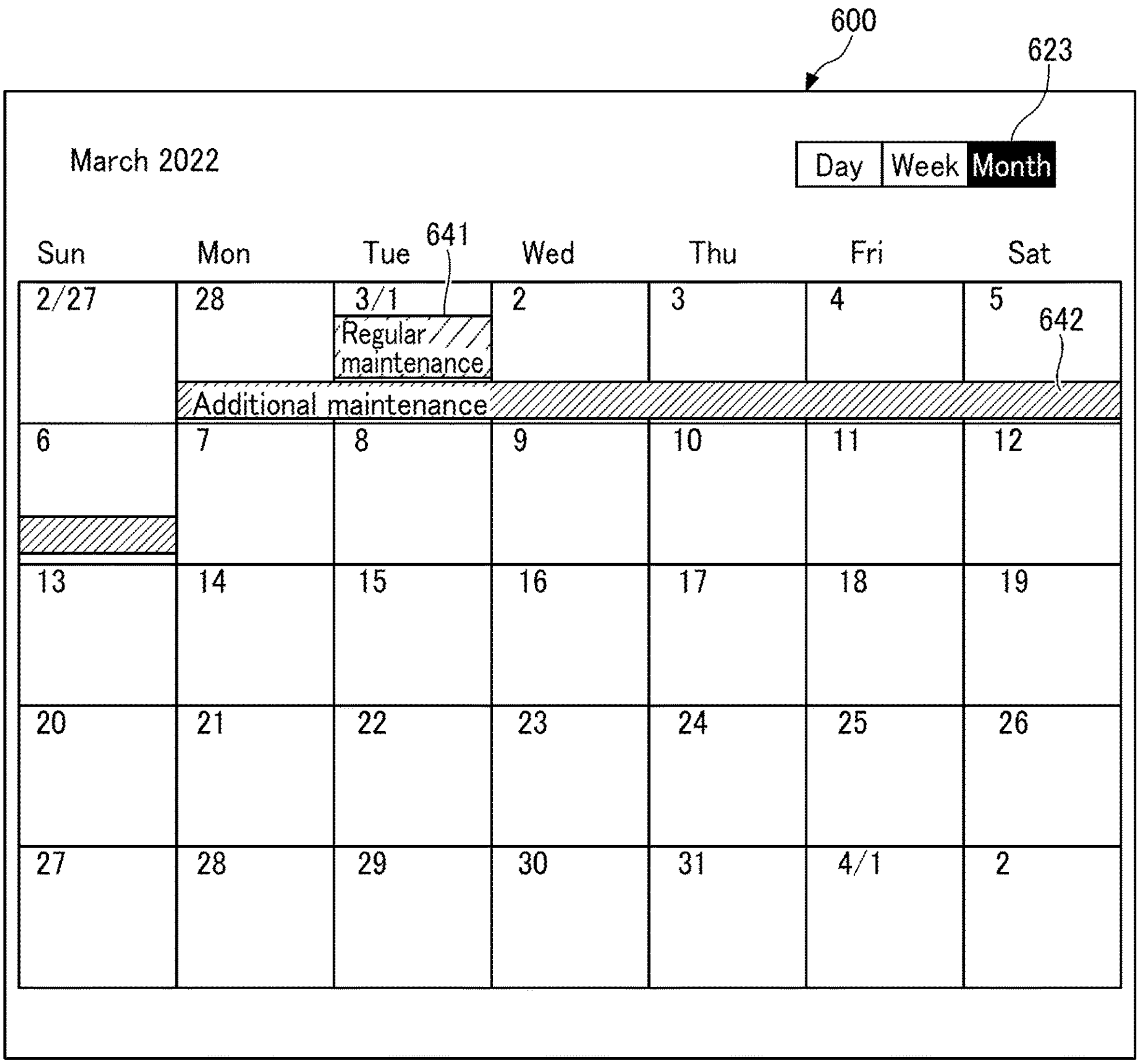
FIG. 16 is a diagram illustrating a maintenance schedule displayed by the image forming apparatus, according to an embodiment of the present disclosure.

FIG. 16 also illustrates a maintenance schedule displayed by the image forming apparatus 103 according to an embodiment of the present disclosure. In FIG. 16, although a recommended execution time period 641 for regular maintenance is one day, the recommended execution time period 642 for additional maintenance that is longer than the regular maintenance is set, in substantially the same manner as FIG. 14. For regular maintenance, a predetermined day is determined as a scheduled date of execution. By contrast, for additional maintenance, a predetermined time period including multiple days can be set as scheduled dates of execution.

In any of FIG. 14, FIG. 15, and FIG. 16, the start of the schedule of the additional maintenance is set one or more days before the start of the regular maintenance on the basis of the maintenance deadline. Such a day or days before the start of the regular maintenance is referred to as a "forward grace day(s)" in the following description. Further, the end of the schedule of additional maintenance is set one or more days after the end of the regular maintenance on the basis of the maintenance deadline. Such a day or days after the end of the regular maintenance is referred to as a "backward grace day(s)" in the following description. However, when the recommended execution time period for additional maintenance and the recommended execution time period for regular maintenance overlap each other (FIG. 14 and FIG. 16), the forward grace day and the backward grace day may one day at the shortest. In substantially the same manner, when the maintenance schedule setting unit 14 sets the recommended execution time period for additional maintenance to overlap with the recommended execution time period for regular maintenance (FIG. 15), the forward grace day and the backward grace day may be one day at the shortest. In this case, even when the maintenance deadline is one week, the maintenance schedule setting unit 14 may shorten the recommended execution time period for additional maintenance. The forward grace day and the backward grace day can be set in advance by the administrator, for example.

The recommended execution time period for regular maintenance is automatically postponed and displayed until the regular maintenance is executed. This is because regular maintenance is mandatory maintenance. When additional maintenance is not performed, the recommended execution time period is not postponed or is deleted. This is because additional maintenance is proposed again.

A case is described below in which a recommended execution time period for additional maintenance is displayed on a weekly basis or a daily basis. Typically, regular maintenance and additional maintenance take less than one day. In other words, when the additional maintenance is displayed on a daily basis or a weekly basis, it is enough that a scheduled time of additional maintenance is longer than a scheduled time of regular maintenance.

Figure 17:
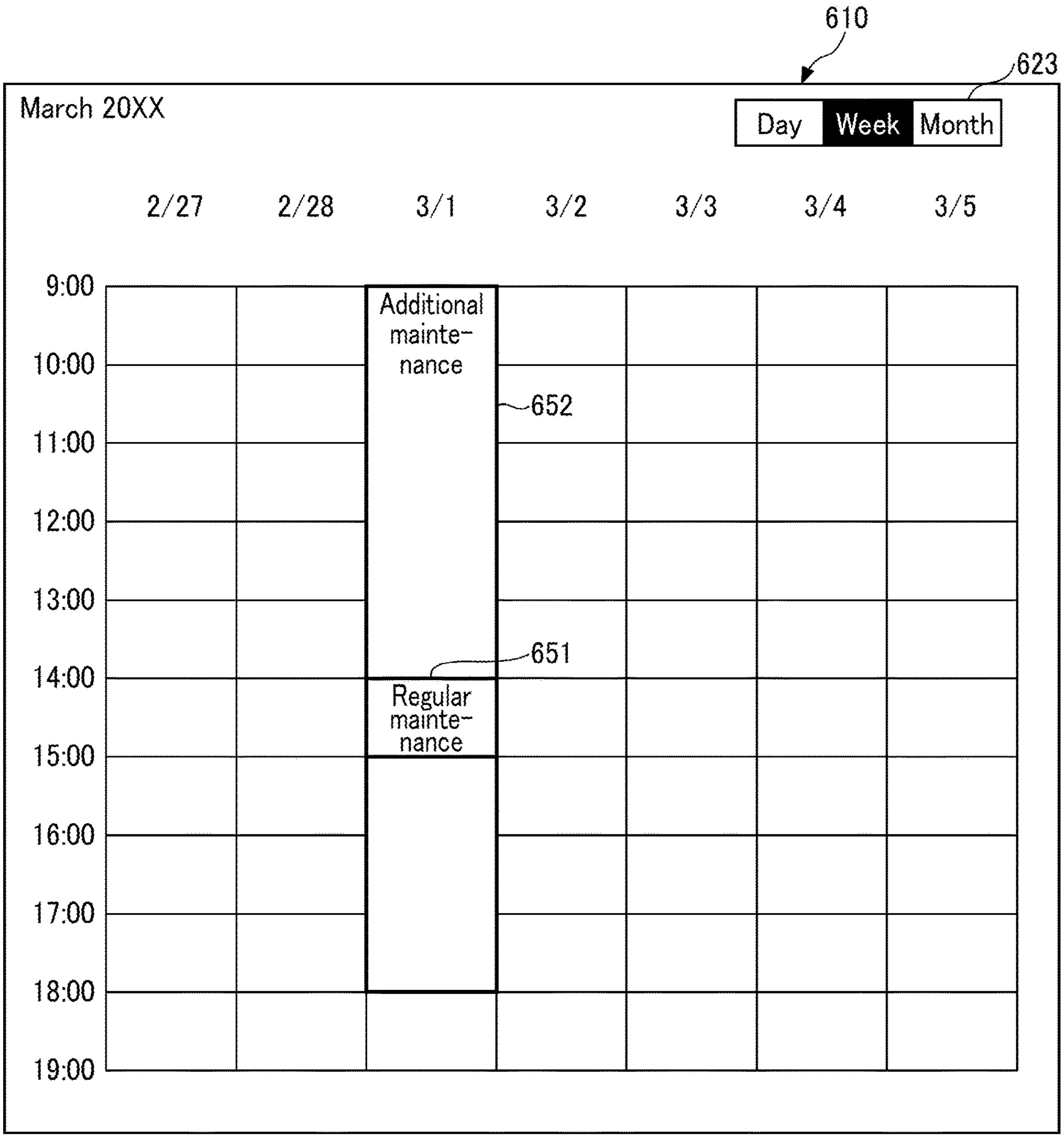
FIG. 17 is a diagram illustrating a weekly maintenance schedule screen, according to an embodiment of the present disclosure.

FIG. 17 illustrates a weekly maintenance schedule screen 610 according to an embodiment of the present disclosure. In FIG. 17, regular maintenance is set from 14:00 to 15:00 on March 1. A predetermined period including March 1 is a recommended execution time period for additional maintenance. With reference to FIG. 17, a description is given focusing on March 1. It is assumed that a scheduled time of additional maintenance overlaps with a scheduled time 651 of the regular maintenance as described above with reference to FIG. 14 and FIG. 16, or that the maintenance schedule setting unit 14 sets the scheduled time of additional maintenance to overlap with the scheduled time 651 of regular maintenance as described above with reference to FIG. 15.

In the weekly maintenance schedule screen 610, the scheduled time 651 of regular maintenance is set from 14:00 to 15:00. The maintenance schedule setting unit 14 determines the recommended execution time period 652 for additional maintenance that is longer than a time period required for additional maintenance or longer than the scheduled time 651 (14:00 to 15:00) of the regular maintenance. For example, when regular maintenance is to be performed in the morning or in the afternoon, the maintenance schedule setting unit 14 determines additional maintenance to be performed in the entire morning (9:00 to 12:00) or the entire afternoon (13:00 to 18:00). Alternatively, when regular maintenance is set in a partial time of the day, the maintenance schedule setting unit 14 determines additional maintenance to be performed on the entire day.

Also on a weekly basis or a daily basis, the recommended execution time period 652 for additional maintenance preferably overlaps with the scheduled time of 651 regular maintenance. Alternatively, the recommended execution time period 652 for additional maintenance may be immediately before the scheduled time 651 of regular maintenance or immediately after the scheduled time 651 of regular maintenance.

Although the weekly maintenance schedule is described with reference to FIG. 17, the same applies to a daily maintenance schedule.

In this way, the display control unit 42 can display a recommended execution time period (scheduled time) of additional maintenance in accordance with a display format such as a monthly or a weekly (daily) basis. When a user checks a maintenance schedule on a monthly basis, the user can recognize an execution date of additional maintenance on a daily basis. When a user checks a maintenance schedule on a weekly basis or on a daily basis, the user can recognize a point in time of execution of additional maintenance on an hourly basis.

Display of Recommended Execution Time Period for Additional Maintenance

Figure 18:
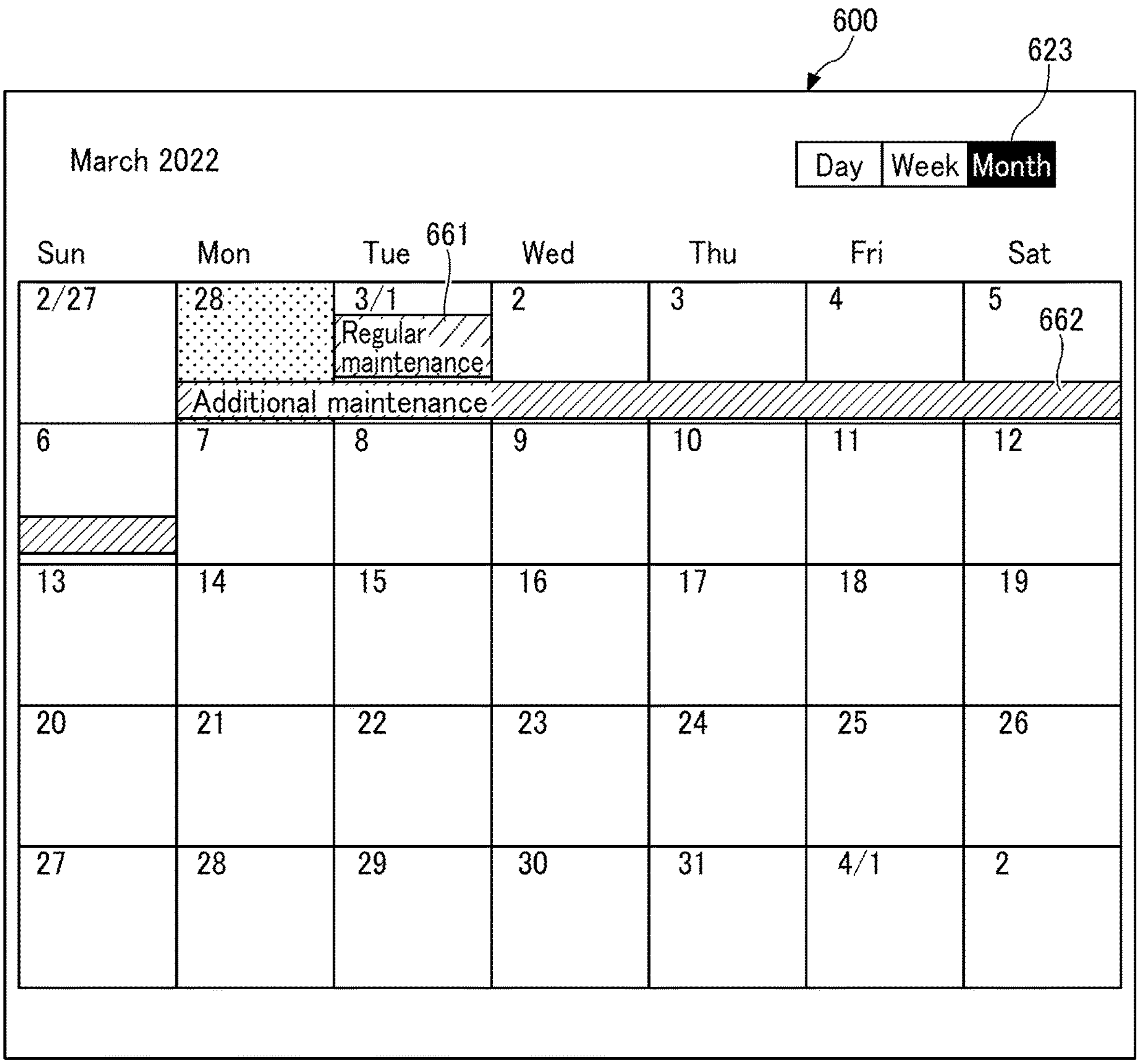
FIG. 18 is a diagram illustrating a display color of the recommended execution time period for additional maintenance that changes according to an elapse of the recommended execution time period for additional maintenance, according to an embodiment of the present disclosure.
Figure 19:
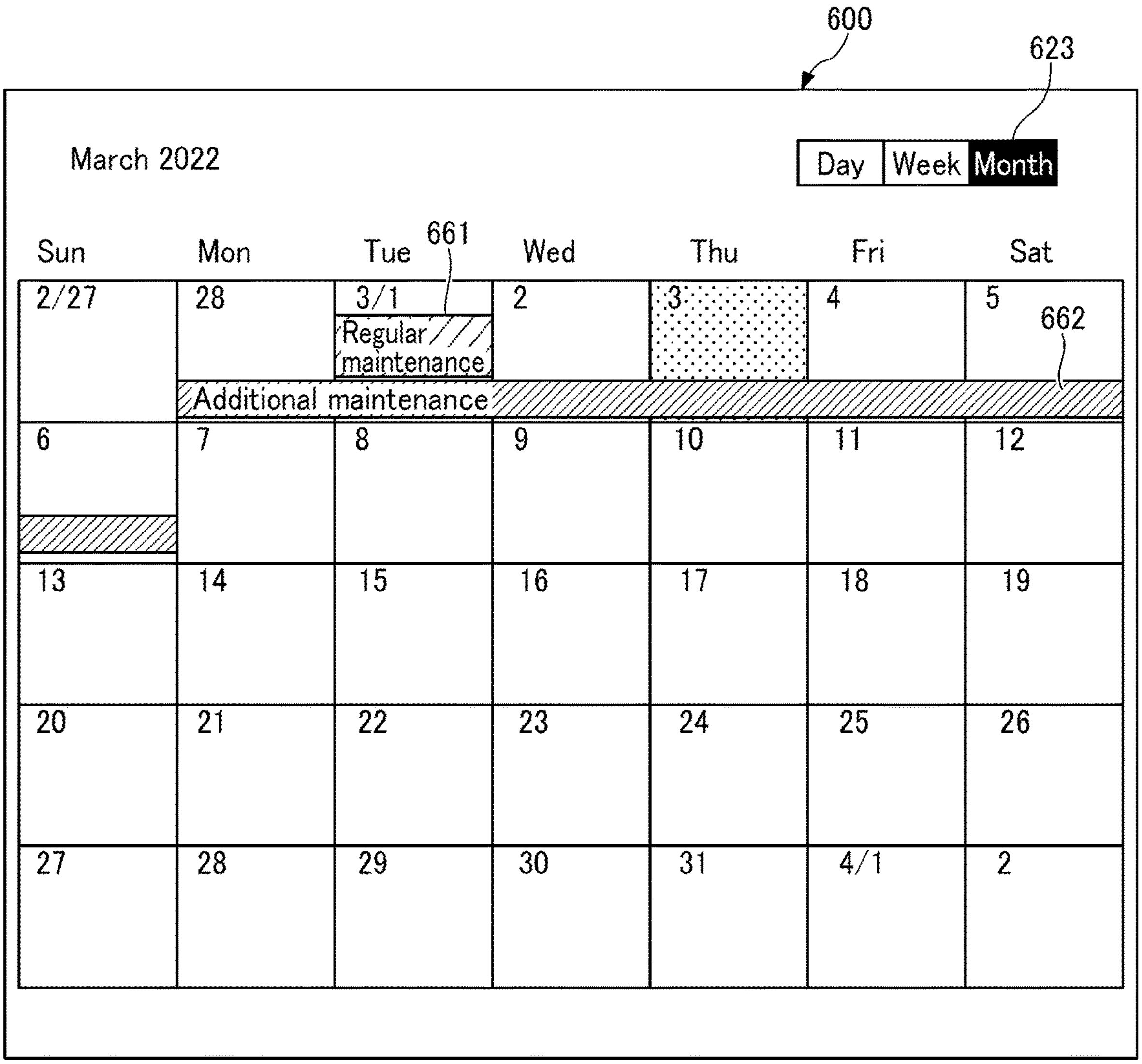
FIG. 19 is a diagram illustrating another display color of the recommended execution time period for additional maintenance that changes according to an elapse of the recommended execution time period for additional maintenance, according to an embodiment of the present disclosure.
Figure 20:
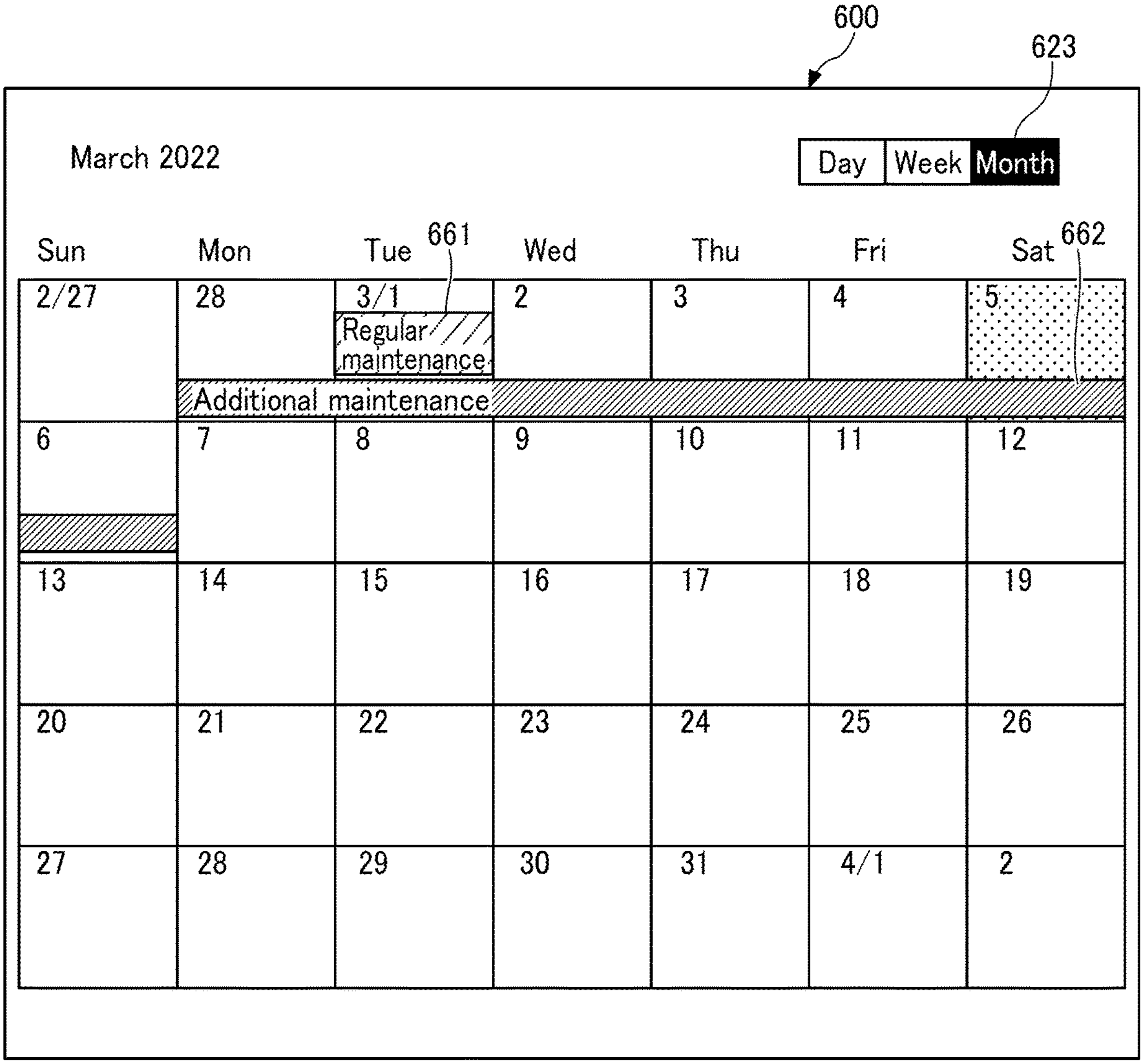
FIG. 20 is a diagram illustrating a still another display color of the recommended execution time period for additional maintenance that changes according to an elapse of the recommended execution time period for additional maintenance, according to an embodiment of the present disclosure.

As illustrated in FIG. 18 to FIG. 20, the image forming apparatus 103 preferably displays a recommended execution time period 662 for additional maintenance in an emphasized mode. FIG. 18 to FIG. 20 are diagrams each illustrating a display color of the recommended execution time period 662 for additional maintenance that changes according to an elapse of the recommended execution time period 662 for additional maintenance. It is assumed that the recommended execution time period 662 for additional maintenance is from February 28 to March 6. Further, the recommended execution time period 661 for regular maintenance is March 1.

When a user starts working and turns on the image forming apparatus 103, the display control unit 42 reads the maintenance information from the maintenance information storage unit 4001. The display control unit 42 changes a display mode of the recommended execution time period 662 for additional maintenance depending on how many days have passed since the start time of the recommended execution time period for additional maintenance today or how many days remain until the end time of the recommended execution time period for additional maintenance.

In FIG. 18, the current date is February 28. In FIG. 19, the current date is March 3. In FIG. 20, the current date is March 5. When the recommended execution time period 662 for additional maintenance elapses in this manner, the display control unit 42 changes the display mode of the recommended execution time period 662 for additional maintenance such as:

deepening the color;

changing the color from cool colors to warm colors such as yellow and red; and blinking (or increase the speed of the blinking).

This makes it easier for the user to notice that the current date is the recommended execution time period 662 for additional maintenance and the recommended execution time period 662 for additional maintenance gradually elapses.

The user does not always remember the display mode of the recommended execution time period 662 for additional maintenance on the previous day. For this reason, immediately after the user starts working and turns on the image forming apparatus 103, or immediately after the maintenance schedule screen 600 of FIG. 18 to FIG. 20 is displayed, the display control unit 42 preferably displays a change in the display mode from the start of the recommended execution time period for additional maintenance to today with a short-time animation. When the change in the display mode is large, the user can easily visually recognize that the recommended execution time period for additional maintenance is ending.

Further, when the current date is the final day of the recommended execution time period for additional maintenance, the display control unit 42 may display a pop-up message indicating that today is the final day of the recommended execution time period for additional maintenance on the maintenance schedule screen 600. The communication unit 11 may notify the administrator that today is the final day of the recommended execution time period for additional maintenance by, for example, e-mail or social networking service (SNS).

Notification of Recommended Time Period for Additional Maintenance

When a user recalls that the current day or time is the recommended time period for additional maintenance while performing regular maintenance, the user may perform additional maintenance before or after the regular maintenance, which may enhance work efficiency. For this reason, when the user performs a predetermined operation relating to regular maintenance on the image forming apparatus 103, the image forming apparatus 103 displays a notification indicating that the current day or time is the recommended execution time period for additional maintenance.

Figure 21:
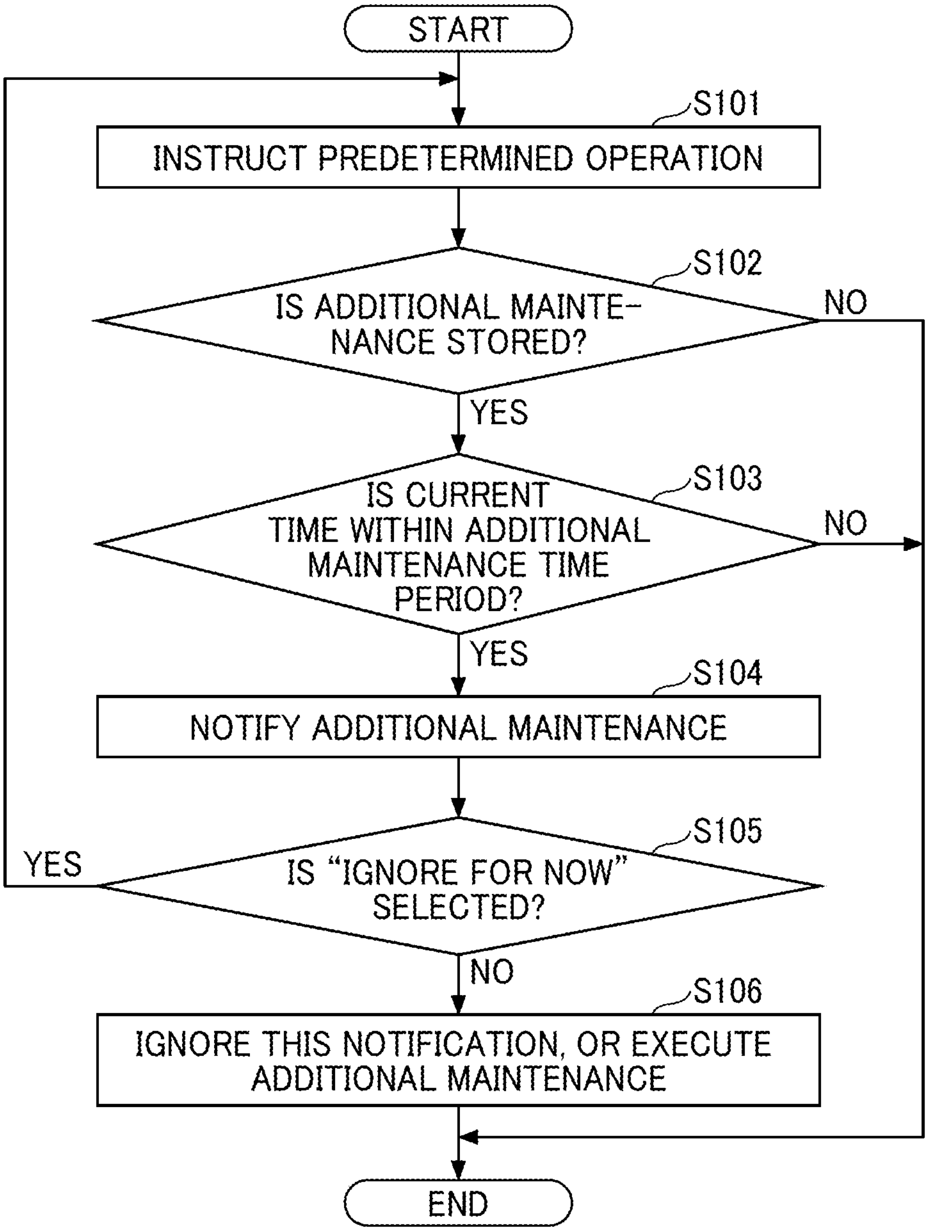
FIG. 21 is a flowchart of determining by a determination unit of the image forming apparatus whether to output information indicating that the current time is the recommended execution time period for additional maintenance, according to an embodiment of the present disclosure.

FIG. 21 is a flowchart of determining by the determination unit 45 of the image forming apparatus 103 whether to output information indicating that the current time is a recommended execution time period for additional maintenance.

A user instructs the image forming apparatus 103 to perform a predetermined operation for regular maintenance, for example (S101). Examples of the instruction of the predetermined operation include the followings:

(i) a high-volume printing instruction;

(ii) a proof printing instruction;

(iii) a (predetermined) image quality adjustment instruction; and (iv) a door open.

In any of the above three instructions (i) to (iii), it is preferable that the user performs additional maintenance before the user instructs the corresponding operation. This is because a status of the image forming apparatus 103 and a print result should be checked after additional maintenance. The proof printing refers to correcting errors and defects in appearance and color in advance before actual printing.

When the determination unit 45 detects at least one of these predetermined operations, the determination unit 45 determines whether additional maintenance that has not been performed is stored in the maintenance information storage unit 4001 (S102). When the result of the determination of step S102 is No, the operation of FIG. 21 ends.

When the result of the determination in step S102 is Yes, the determination unit 45 determines whether the current time is within a recommended execution time period for additional maintenance (S103). When the result of the determination of step S103 is No, the operation of FIG. 21 ends.

Figure 22:
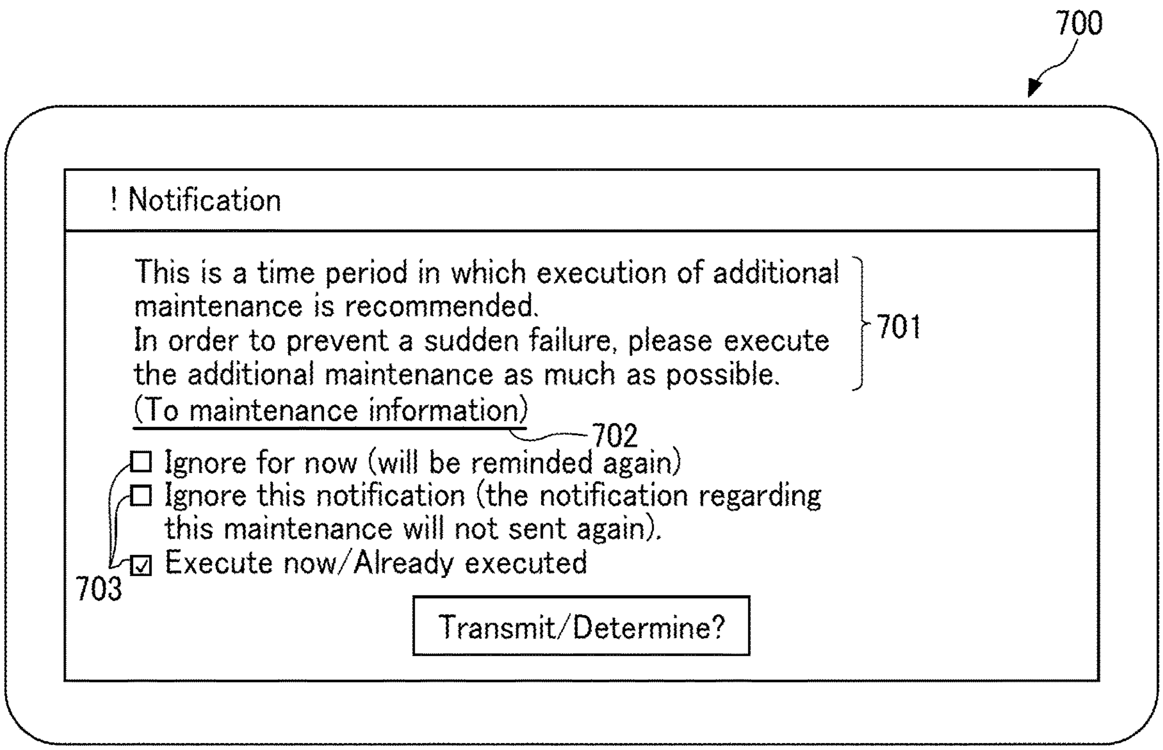
FIG. 22 is a diagram illustrating an additional maintenance notification screen displayed by the image forming apparatus, according to an embodiment of the present disclosure.

When the result of the determination in step S103 is Yes, the display control unit 42 displays on the display 440 information indicating that additional maintenance has been set (an additional maintenance notification screen 700) (S104). FIG. 22 illustrates the additional maintenance notification screen 700 according to an embodiment of the present disclosure.

The user inputs how to deal with the notification on the additional maintenance notification screen 700, the operation receiving unit 43 receives the input by the user. The determination unit 45 determines whether an option "Ignore for now" is selected (S105).

When the result of the determination in step S105 is Yes, the operation returns to step S101, and the same notification is performed again.

When the result of the determination in step S105 is No, the determination unit 45 determines that processing corresponding to the user's input as to how to deal with the notification is to be performed (S106). In other words, the determination unit 45 determines that a notification regarding the additional maintenance is not made again or accepts execution of the additional maintenance.

FIG. 22 illustrates the additional maintenance notification screen 700 displayed by the image forming apparatus 103 according to an embodiment of the present disclosure. The additional maintenance notification screen 700 includes a message 701 link embedded information 702, and check boxes 703. The message 701 states "This is a time period in which execution of additional maintenance is recommended. In order to prevent a sudden failure, please execute the additional maintenance as much as possible." The operator can recognize that additional maintenance is scheduled from the message 701.

Further, when the operator touches (selects) the link embedded information 702, i.e., "To maintenance information," the additional maintenance notification screen 700 transitions to, for example, the maintenance schedule screen 600. Thus, the operator can confirm, for example, a work procedure. The operator can recognize what to do as additional maintenance.

The check boxes 703 are respectively associated with character strings of "Ignore for now (will be reminded again)," "Ignore this notification (the notification regarding this maintenance will not sent again)," and "Execute now/Already executed."

When an option "Ignore now (will be reminded again)" is selected, the current predetermined operation is ignored and regular maintenance can be performed. When the option "Ignore now (will be reminded again)" is selected, the operation is performed again from step S101. Accordingly, the additional maintenance notification screen 700 is displayed again at the next predetermined operation.

When an option "Ignore this notification (the notification regarding this maintenance will not sent again)" is selected, a notification regarding the same additional maintenance is not made in the future.

"Execute now/Already executed" is an option that allows the user to start additional maintenance.

The user can determine which of the check boxes 703 should be marked depending on a status of regular maintenance.

The description given above with reference to FIG. 22 is of a case in which the image forming apparatus 103 displays the additional maintenance notification screen 700. Alternatively, for example, the terminal apparatus 101 or the DFE 102 may display the additional maintenance notification screen 700.

Display of Recommended Date of Additional Maintenance

The server apparatus 104 provides a date on which a usage amount of the image forming apparatus 103 is relatively small to the image forming apparatus 103 as a recommended date of additional maintenance on the basis of usage history information of the image forming apparatus 103.

Figure 23:
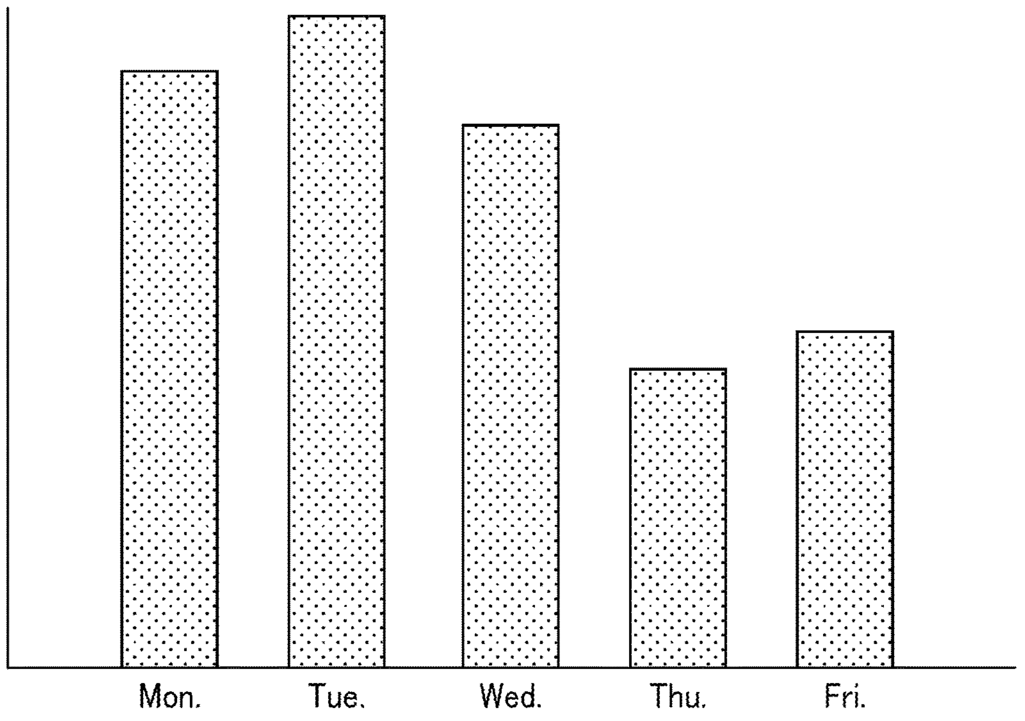
FIG. 23 is a schematic diagram illustrating the usage amount information stored in the usage amount information storage unit, according to an embodiment of the present disclosure.

FIG. 23 schematically illustrates the usage amount information stored in the usage amount information storage unit 1004 according to an embodiment of the present disclosure. In FIG. 23, the usage amount for every day of the week is indicated by a bar chart. The bar chart for days of the week is a bar chart of values obtained by totalizing the usage amount stored in the usage amount information storage unit 1004 for every day of the week. The bar chart in FIG. 23 is for description, and may or may not be displayed by, for example, the server apparatus 104 or the image forming apparatus 103.

The recommended date proposal unit 15 proposes, as recommended days, the top two days of the week (Thursday and Friday in FIG. 23) on which the print amount is relatively smaller than the other days of the week. The recommended date may be one day or three or more days. The degrees of recommendation for days of the week may be indicated by numbers. The recommended date proposal unit 15 transmits the recommended date to the image forming apparatus 103 via the communication unit 11. The recommended date is stored in the maintenance information storage unit 4001.

Further, when no clear (meaningful) difference is observed for every day of the week, the recommended date proposal unit 15 does not display the recommended date. In other words, only when the meaningful difference is observed, the recommended date proposal unit 15 displays the recommended date. Further, the user may manually switch on/off a display function of the recommended date. Furthermore, the user can configure settings as to whether the determination of the recommended date is to be performed for every day of the week. For example, when Saturdays, Sundays, and holidays are not work days, the user excludes Saturdays, Sundays, and holidays from a target for which the determination of the recommended date is to be performed.

Figure 24:
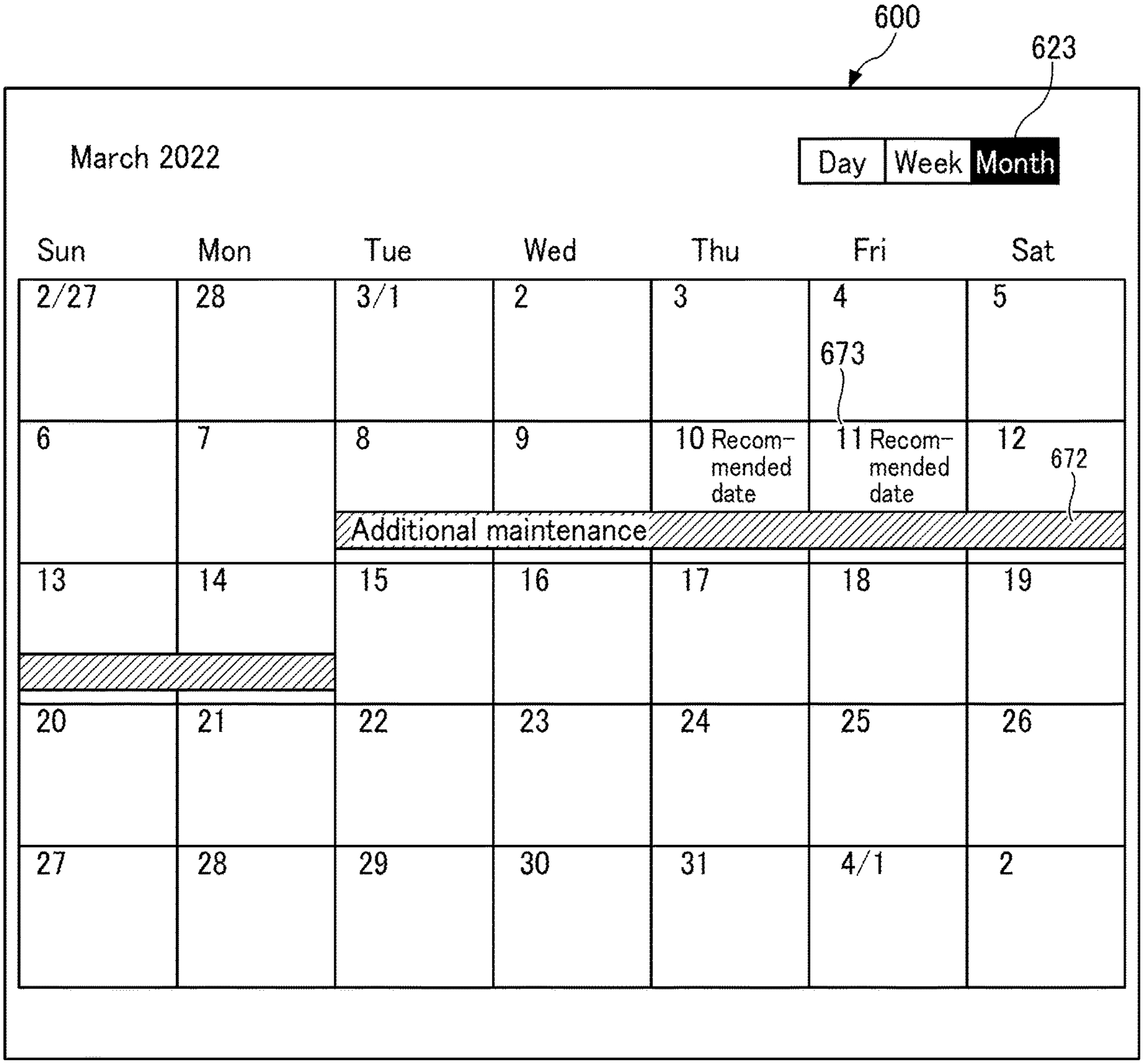
FIG. 24 is a diagram illustrating a calendar of the maintenance schedule screen on which recommended dates are displayed, according to an embodiment of the present disclosure.

FIG. 24 illustrates a calendar of the maintenance schedule screen 600 on which recommended dates are displayed according to an embodiment of the present disclosure. In FIG. 24, a time period from March 8 to 14 is the recommended execution time period 672 for additional maintenance, and recommended date indications 673 are displayed on Thursday and Friday, which have relatively smaller print amounts than the other days of the week. The recommended date indications 673 makes it easier for a user to determine a date on which additional maintenance is to be performed during the recommended execution time period 672 for additional maintenance, which is relatively a long time period.

In a case where a user does not perform additional maintenance by the recommended date, the recommended date proposal unit 15 may postpone the recommended date regardless of the printing amount for every day of the week. For example, when the current day is March 14, the recommended date proposal unit 15 deletes the recommended date indications 673 on March 10 and 11, and displays the recommended date indication 673 on March 14. By so doing, the user performs additional maintenance on the postponed recommended date, and from the next time, it can be expected that the user will perform additional maintenance on an originally recommended date.

Maintenance Schedule Screen after Execution of Maintenance

After maintenance is completed, the completion of the maintenance can be recognized by deleting a schedule of regular maintenance or changing the display mode of the schedule of additional maintenance according to the difference between regular maintenance and additional maintenance.

Figure 25:
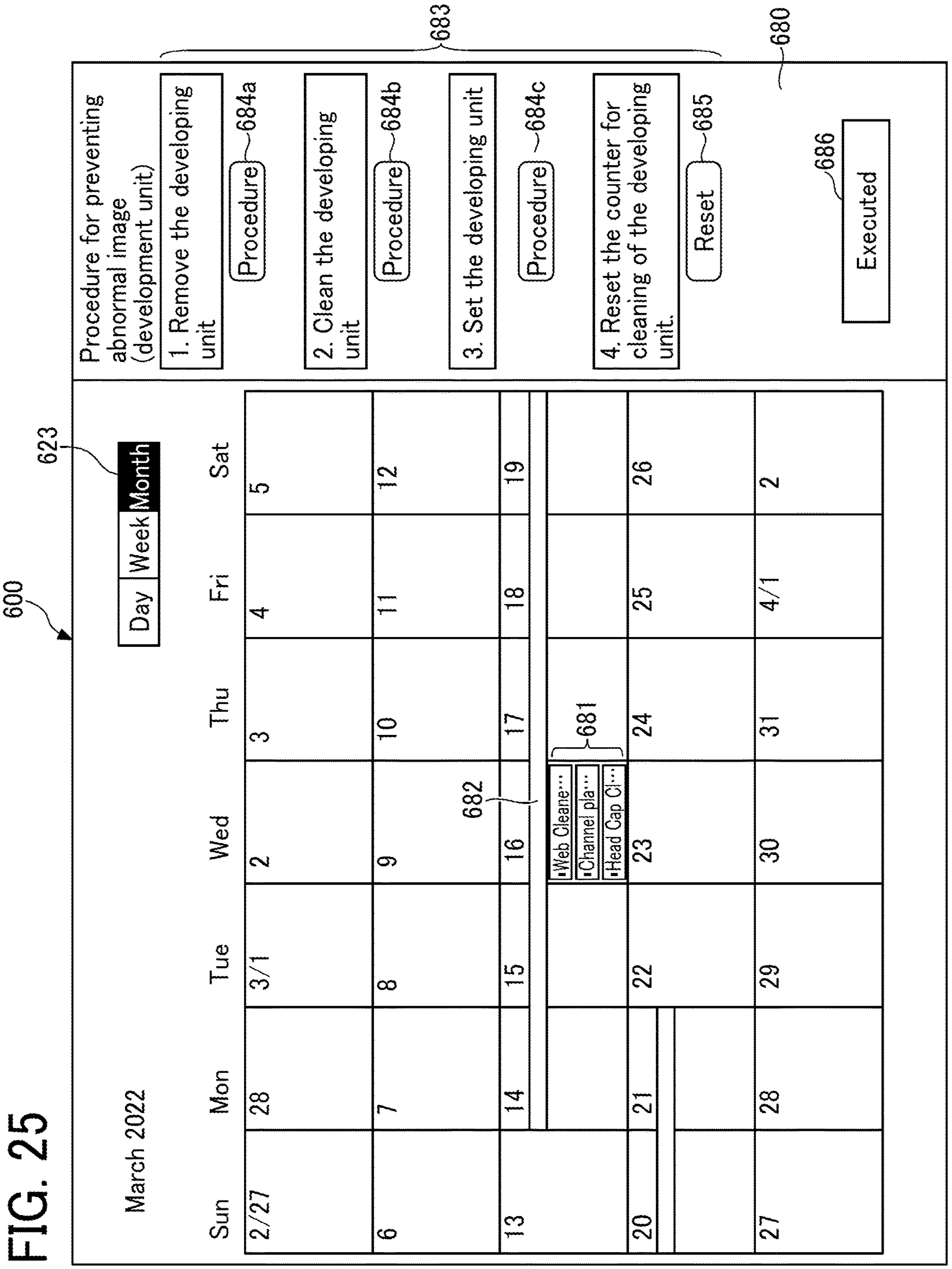
FIG. 25 is a diagram illustrating how a recommended execution time period for regular maintenance and the recommended execution time period for additional maintenance after maintenance are displayed, according to an embodiment of the present disclosure.

With reference to FIG. 25 to FIG. 28, how a recommended execution time period for regular maintenance and a recommended execution time period for additional maintenance after maintenance are displayed is described. First, as illustrated in FIG. 25, a recommended execution time period 681 for regular maintenance is displayed in March 16, and a recommended execution time period 682 for additional maintenance is displayed from March 14 to 21.

When a user touches (selects) the recommended execution time period 681 for regular maintenance or the recommended execution time period 682 for additional maintenance, a work procedure field 680 is displayed in the right part of the maintenance schedule screen 600. In the work procedure field 680, work procedure information 683 indicating an order of work by characters or images is displayed. Although in FIG. 25, the work procedure information 683 of four steps is displayed, the number of steps may vary depending on the type of maintenance. Procedure buttons

684*a* to 684*c* are displayed in association with first to third steps, respectively. When the user touches (selects) the procedure buttons 684*a* to 684*c*, the procedures of the work of the steps are output in combination with, for example, text, an image, sound, and animation. The procedure buttons 684*a* to 684*c* may be displayed only in the order of the steps. Such a display can prevent the user from skipping any one or more of the steps by mistake. As in the fourth step, touching (selecting) a button or key may serve as maintenance.

The fourth step involves a reset button 685, and a cleaning counter is reset as the user touches or select the reset button 685. In this manner, the user checks the work procedure information 683 and touches (selects) the buttons to perform an operation required for maintenance. When the user completes all the operations of the work procedure information 683, the user touches (selects) an "Executed" button 686. As a result, an execution date is registered in the maintenance information storage unit 4001.

Figure 26B:
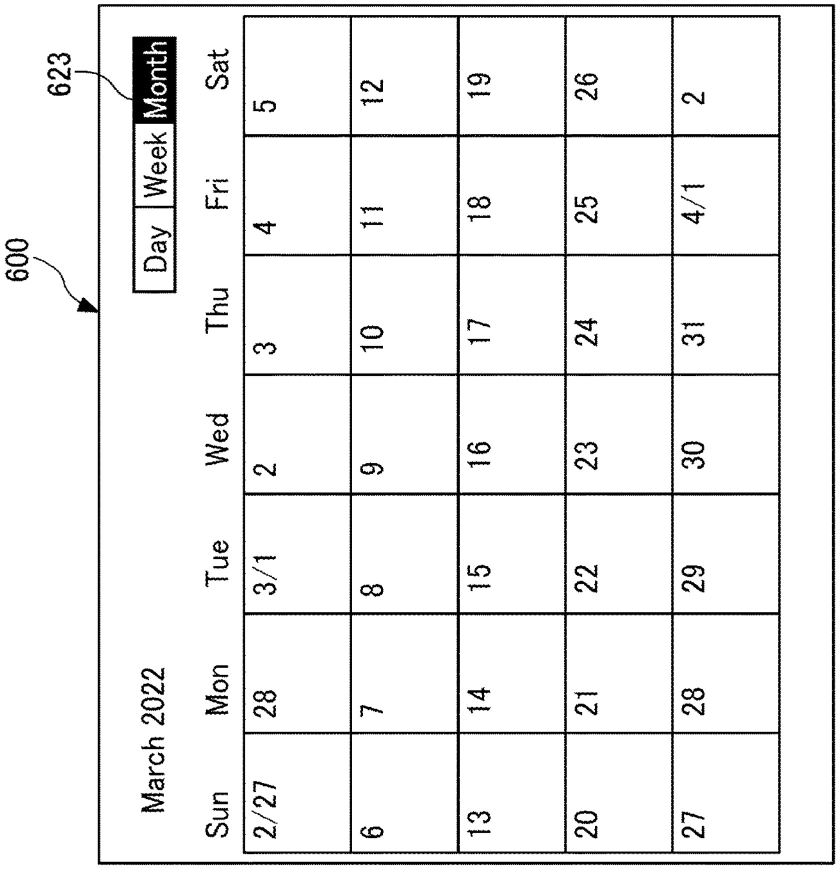
FIG. 26A and FIG. 26B are diagrams illustrating how the recommended execution time period for regular maintenance is displayed before and after execution of regular maintenance, according to an embodiment of the present disclosure.
Figure 26A:
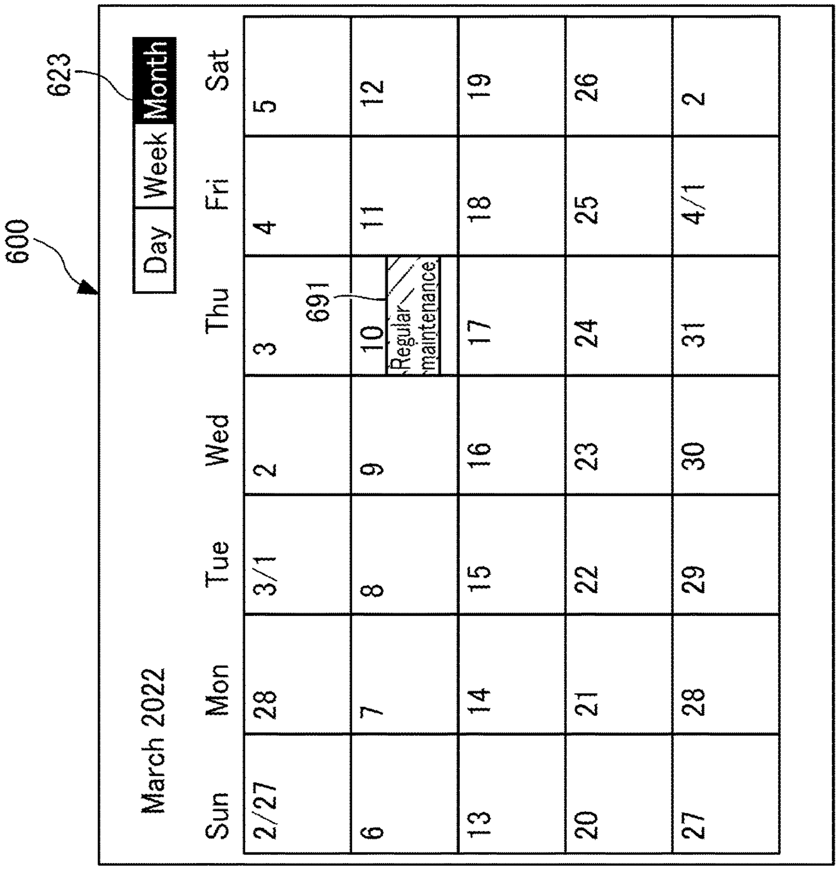

FIG. 26A and FIG. 26B are diagrams illustrating how a recommended execution time period for regular maintenance is displayed before and after execution of regular maintenance according to an embodiment of the present disclosure. FIG. 26A illustrates the maintenance schedule screen 600 displayed before execution of regular maintenance. FIG. 26B illustrates the maintenance schedule screen 600 displayed after execution of regular maintenance. As illustrated in the figures, after regular maintenance is performed, the recommended execution time period 691 for regular maintenance is deleted from the maintenance schedule screen 600.

Figure 27A:
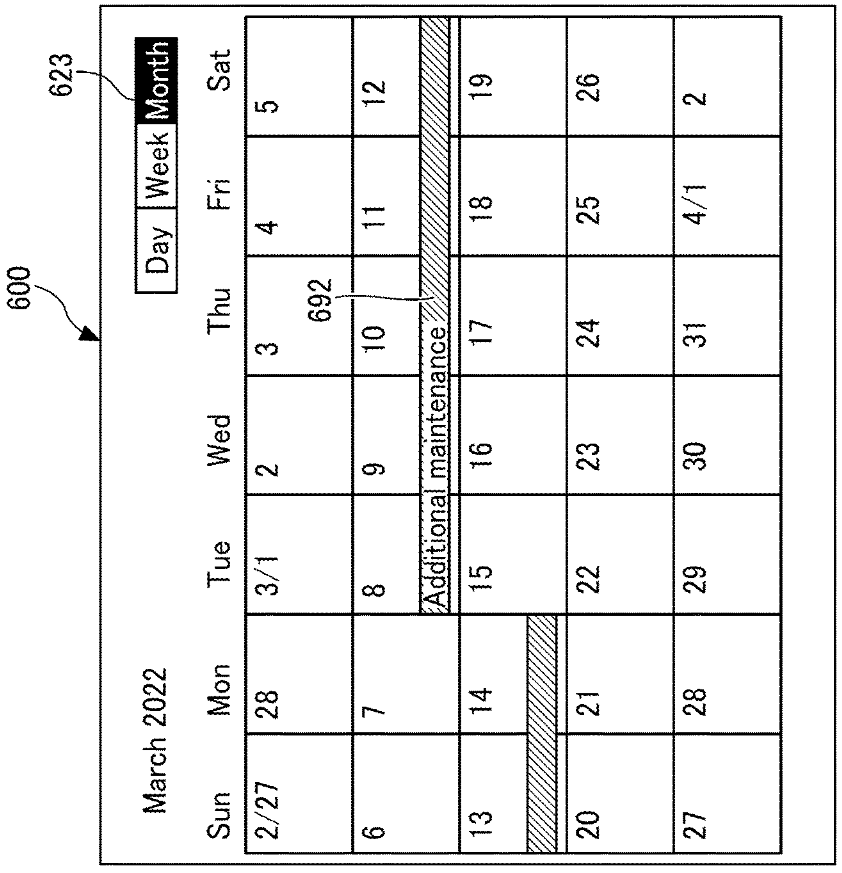
FIG. 27A and FIG. 27B are diagrams illustrating a change of a display mode of additional maintenance before and after execution of the additional maintenance, according to an embodiment of the present disclosure.
Figure 27B:
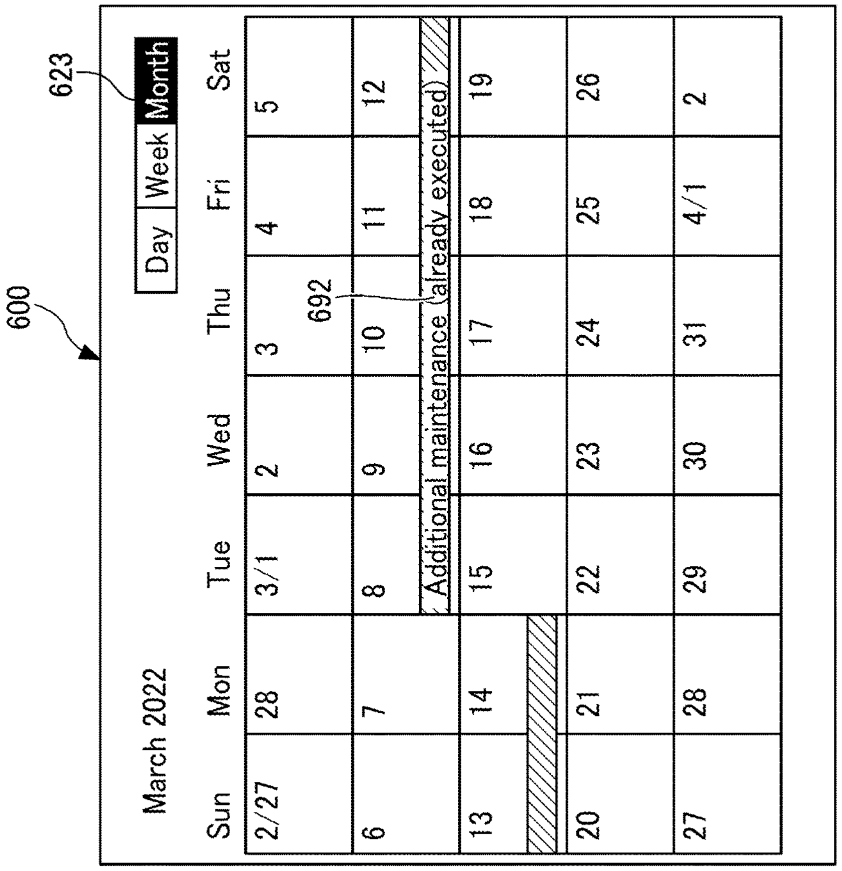

FIG. 27A and FIG. 27B are diagrams illustrating how a display mode of additional maintenance changes before and after execution of additional maintenance according to an embodiment of the present disclosure. FIG. 27A illustrates a recommended execution time period 692 for additional maintenance displayed before execution of additional maintenance. FIG. 27B illustrates the recommended execution time period 692 for additional maintenance displayed after execution of additional maintenance. After additional maintenance is performed, although the recommended execution time period 692 for additional maintenance is not deleted from the maintenance schedule screen 600, the display mode changes. For example, the color of the recommended execution time period 692 for additional maintenance is changed, and a message indicating that additional maintenance has been executed is displayed.

Such a difference is made so that a user can check the recommended execution time period for additional maintenance performed in the past because regular maintenance is typically executed periodically while an execution date of additional maintenance is irregular.

Figure 28B:
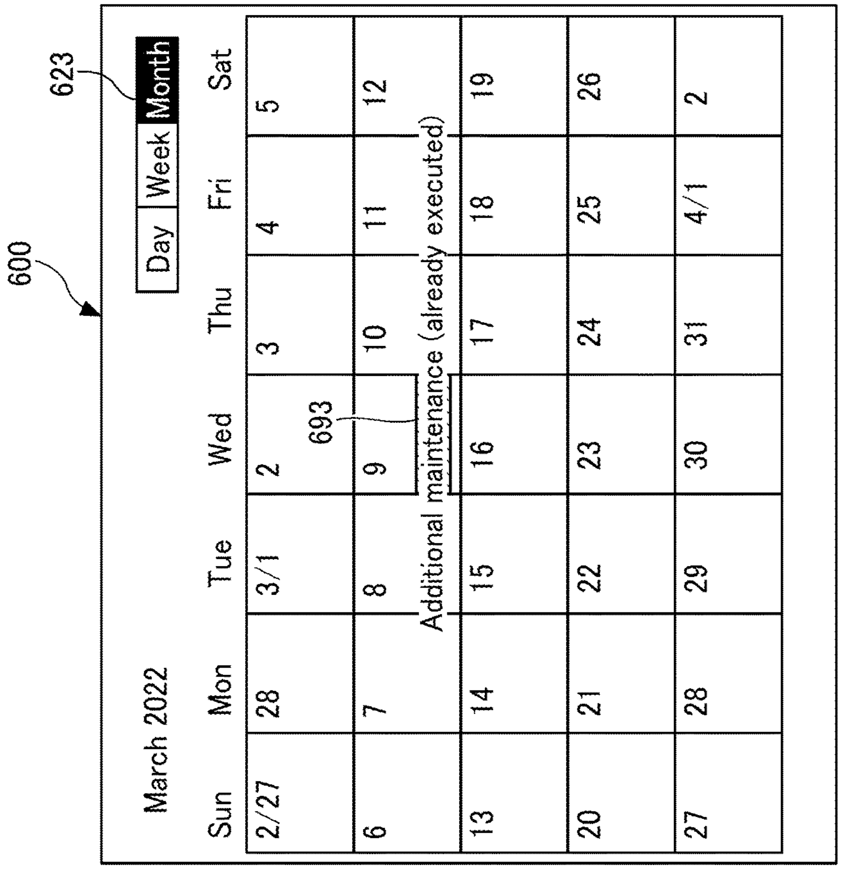
FIG. 28A and FIG. 28B are diagrams illustrating another change of the display mode of additional maintenance before and after execution of the additional maintenance, according to an embodiment of the present disclosure.
Figure 28A:
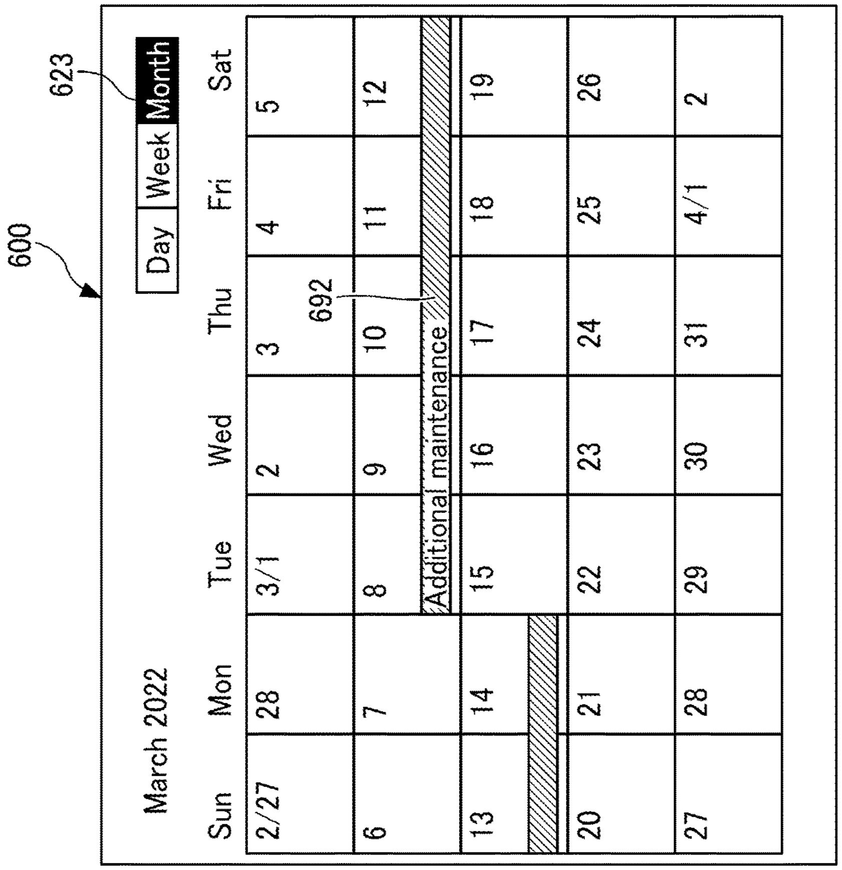

Alternatively, as illustrated in FIG. 28A and FIG. 28B, the image forming apparatus 103 may display that additional maintenance has been performed only on a date of the maintenance schedule screen 600 on which additional maintenance has been performed. The maintenance schedule screen 600 illustrated in FIG. 28A is the same as the maintenance schedule screen 600 illustrated in FIG. 27B. In FIG. 28B, only on March 9 (with only March 9 left) of the maintenance schedule screen 600, a message 693 indicating that additional maintenance has been performed is displayed. The color of the message 693 indicating that additional maintenance has been performed is also changed from that of the recommended execution time period 692 for additional maintenance in FIG. 28A, to display an indication that additional maintenance has been performed.

Although an execution date of additional maintenance is irregular, the user can check a date of additional maintenance performed in the past.

Overall Operation or Processes

Figure 29:
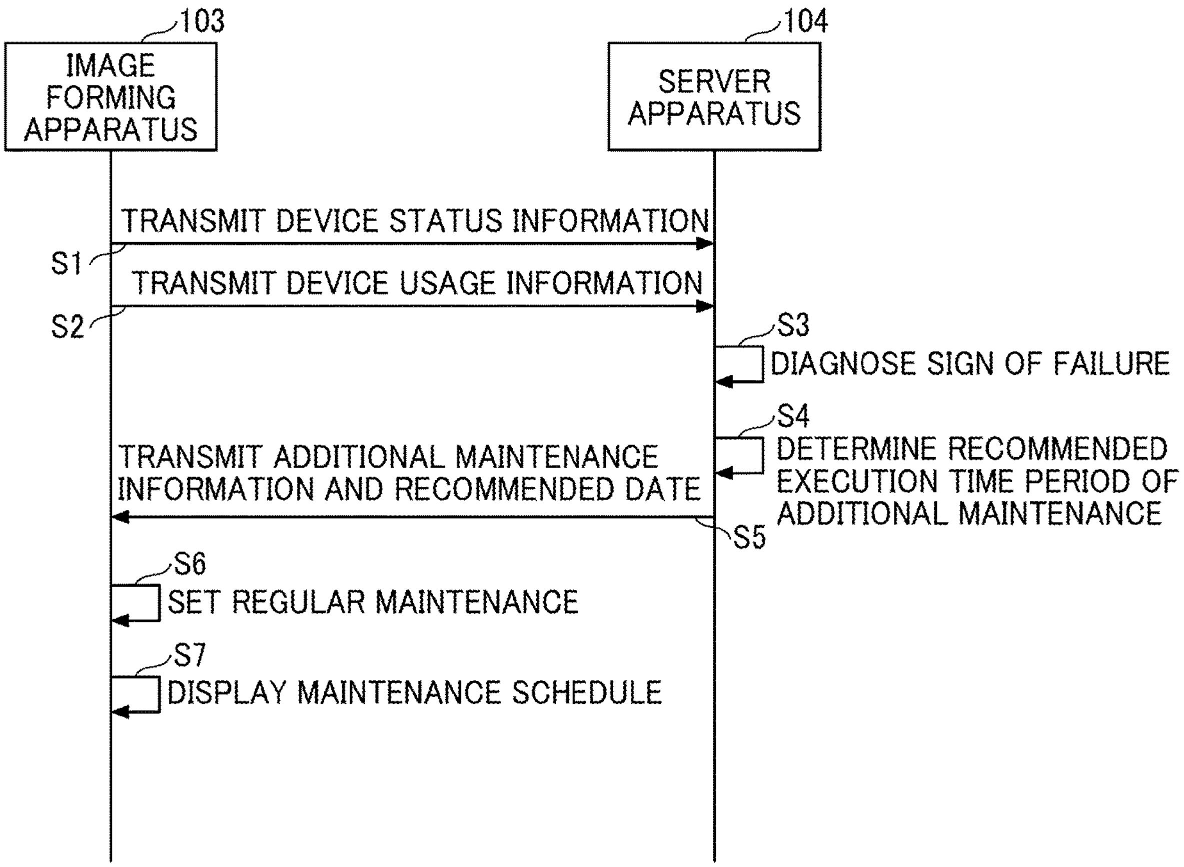
FIG. 29 is a sequence diagram illustrating an operation in which the image forming apparatus and the server apparatus communicate with each other and the image forming apparatus displays the maintenance schedule screen, according to an embodiment of the present disclosure.

A flow of an operation performed by the image forming apparatus 103 and the server apparatus 104 is described below with reference to FIG. 29. FIG. 29 is a sequence diagram illustrating an operation in which the image forming apparatus 103 and the server apparatus 104 communicate with each other and the image forming apparatus 103 displays the maintenance schedule screen 600.

S1: The communication unit 41 of the image forming apparatus 103 transmits the device status information to the server apparatus 104 at a predetermined date and time every predetermined time period such as one day or one week. The communication unit 41 may irregularly transmit the device status information to the server apparatus 104.

S2: The communication unit 41 of the image forming apparatus 103 transmits device usage information to the server apparatus 104 at a predetermined date and time every predetermined time period such as one day or one week. The communication unit 41 may irregularly transmit the device usage information to the server apparatus 104.

S3: The communication unit 11 of the server apparatus 104 receives the device status information and the device usage information, and stores the received device status information and the received device usage information in the device status information storage unit 1001 and the usage amount information storage unit 1004, respectively.

S4: The maintenance determination unit 12 diagnoses whether there is a sign of failure at a point in time when the device status information is received or, for example at a predetermined date and time in one day or one week. The following description is given on the assumption that the sign of failure is detected. The maintenance schedule setting unit 14 of the server apparatus 104 refers to the failure maintenance information storage unit 1005 to determine, for example, a content of additional maintenance, a maintenance deadline (a recommended execution time period for additional maintenance and an operator according to a type of the failure of which sign is detected. Details of this operation are described below with reference to FIG. 30.

Further, when the maintenance schedule setting unit 14 determines the recommended execution time period for additional maintenance, the recommended date proposal unit 15 determines a recommended date.

S5: The communication unit 11 of the server apparatus 104 transmits, to the image forming apparatus 103, additional maintenance information including the content of the additional maintenance, the maintenance deadline (the recommended execution time period for additional maintenance) and the operator, and the recommended date. The communication unit 41 of the image forming apparatus 103 receives the additional maintenance information and the recommended date, and stores the received information in the maintenance information storage unit 4001.

S6: The regular maintenance generation unit 44 of the image forming apparatus 103 determines whether regular maintenance on a predetermined date and time in one day or one week, for example, is to be generated. On the basis of the result of the determination indicating that the regular maintenance is to be generated, the regular maintenance generation unit 44 generates regular maintenance and stores the generated regular maintenance in the maintenance information storage unit 4001.

S7: The display control unit 42 of the image forming apparatus 103 displays the maintenance schedule at a predetermined point in time. The predetermined point in time is typically when the user inputs an operation for displaying the maintenance schedule. Alternatively, the display control unit 42 may automatically display the maintenance schedule when a new recommended execution time period for regular maintenance or a recommended execution time period for additional maintenance is registered.

Figure 30:
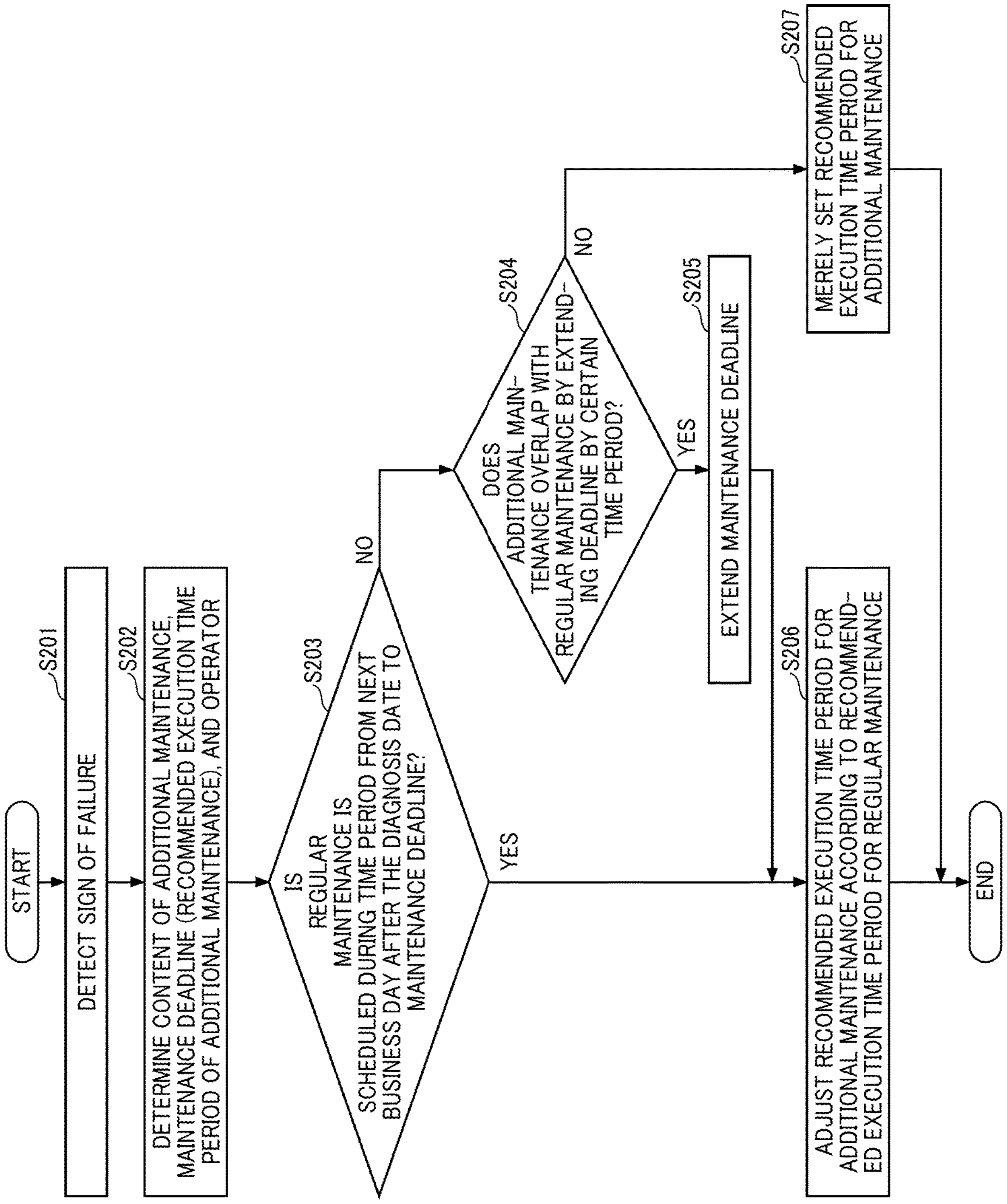
FIG. 30 is a flowchart of an operation in which a maintenance schedule setting unit determines the recommended execution time period for additional maintenance, according to an embodiment of the present disclosure.

FIG. 30 is a flowchart of an operation in which the maintenance schedule setting unit 14 determines a recommended execution time period for additional maintenance according to an embodiment of the present disclosure.

When the maintenance determination unit 12 detects a sign of a failure (S201), the maintenance schedule setting unit 14 refers to the failure maintenance information storage unit 1005 to determine, for example, a content of additional maintenance, a maintenance deadline (a recommended execution time period for additional maintenance), and an operator corresponding to the failure of which sign is detected (S202).

Subsequently, the maintenance schedule setting unit 14 determines whether there is a regular maintenance from the business day next to the diagnosis date until the maintenance deadline (S203). For example, when the maintenance deadline is one week, the result of the determination is likely to be that there is no regular maintenance. When the maintenance deadline is one month, the result of the determination is likely to be that there is regular maintenance.

When the result of the determination in step S203 is No, the maintenance schedule setting unit 14 determines whether the recommended execution time period for additional maintenance overlaps with regular maintenance by extending the maintenance deadline by a given time period (S204). The given time period is, for example, about twice the maintenance deadline. As a result, the maintenance schedule setting unit 14 can set the recommended execution time period for additional maintenance before the failure actually occurs.

When the result of the determination in step S204 is Yes, the maintenance schedule setting unit 14 extends the maintenance deadline by the given time period (S205).

When the result of the determination in step S204 is No, the maintenance schedule setting unit 14 simply determines the recommended execution time period for additional maintenance (S207). In this case, the recommended execution time period for additional maintenance that does not overlap with the regular maintenance is determined.

When the result of the determination in step S203 is Yes, or, after step S205, the maintenance schedule setting unit 14 adjusts the recommended execution time period for additional maintenance according to the recommended execution time period for regular maintenance (S206). In this case, since the regular maintenance and the recommended execution time period for additional maintenance overlap, the maintenance schedule setting unit 14 determines the recommended execution time period for additional maintenance by adding the forward grace day and the backward grace day to the recommended execution time period for regular maintenance. The maintenance deadline may be determined as the recommended execution time period for additional maintenance without performing the adjustment.

Execution of Maintenance

Figure 31A:
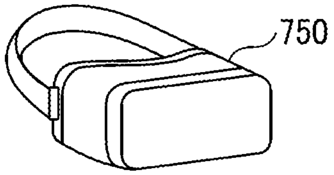
FIG. 31A, FIG. 31B, FIG. 31C, and FIG. 31D are schematic diagrams each illustrating maintenance carried out an augmented reality headset, according to an embodiment of the present disclosure.

As illustrated in FIG. 31A to FIG. 31D, maintenance using an augmented reality headset may be performed. FIG. 31A to FIG. 31D are schematic diagrams each illustrating the maintenance performed using an augmented reality headset. FIG. 31A is an external view of the augmented reality headset. The augmented reality headset is a type of a display apparatus that uses a head-mounted display to display computer-generated images and sounds superimposed on elements of the real world.

A user selects maintenance to be executed, for example, on the maintenance schedule screen 600. The maintenance schedule screen 600 may also be displayed on the augmented reality headset. The selection may be made by voice input, pressing keys or buttons of a controller, or gesture operation.

Figure 31B:
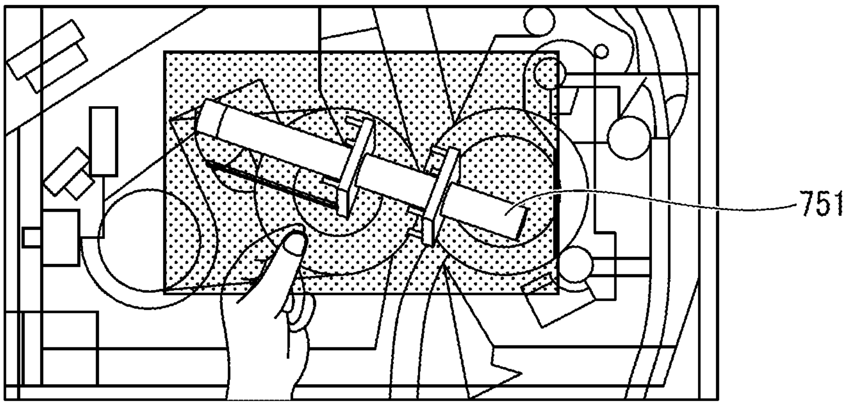

To the user wearing the augmented reality headset, a series of information that assists additional maintenance is displayed. As illustrated in FIG. 31B, when the augmented reality headset detects with a camera that the user has opened the door of the image forming apparatus 103, an image of a component 751 to be replaced is displayed as being superimposed on the view of various components arranged inside the door. The user looks for a component to be replaced inside the door while viewing the image of the component 751 to be replaced. Since the component 751 to be replaced is a maintenance target component registered in the schedule, the component 751 to be replaced is known to the image forming apparatus 103. A component for which maintenance is to be performed is not necessarily be replaced. A component for which maintenance is to be performed may be cleaned or repaired.

Figure 31C:
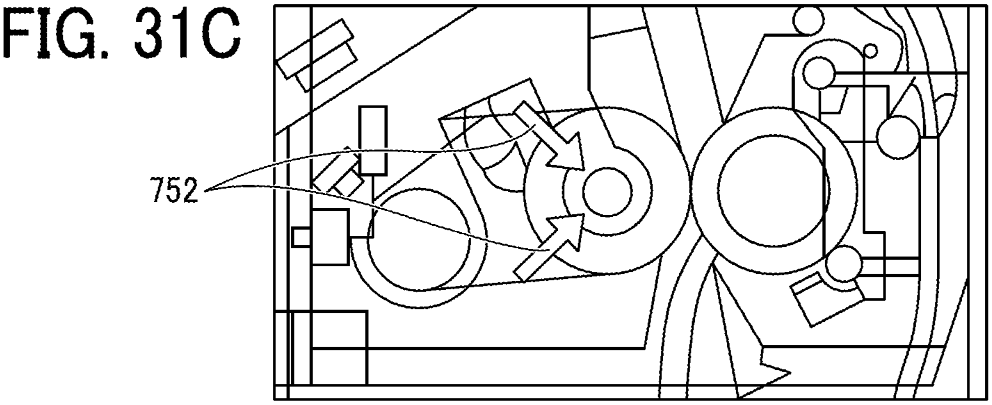
Figure 31D:
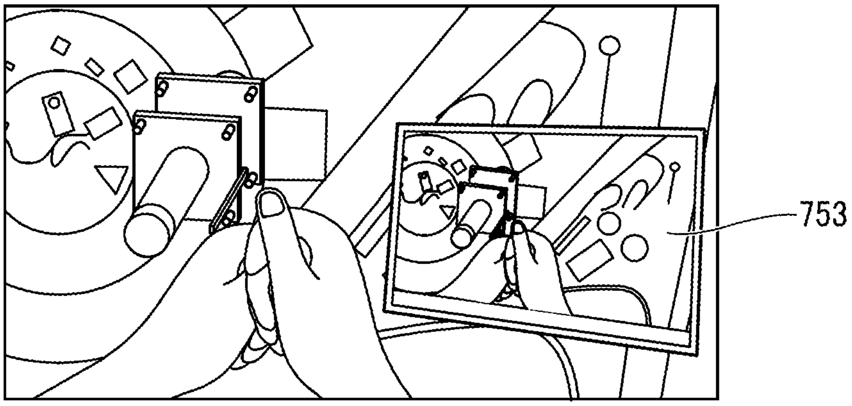

In parallel with the search by the user (the augmented reality headset may find the component earlier), the augmented reality headset monitors a scene inside the door with the camera and detects the component to be replaced by image processing. As illustrated in FIG. 31C, when the component to be replaced is detected, the augmented reality headset displays, for example, arrows 752 pointing to the component to be replaced of the real device. When the augmented reality headset detects with the camera that the user has taken out the component to be replaced from the real device, the augmented reality headset displays a work procedure of additional maintenance as a moving image 753, as illustrated in FIG. 31D. The user can perform maintenance of the component to be replaced that the user has taken out while viewing the moving image 753.

Thus, using the augmented reality headset makes it easier for the user to perform regular maintenance.

Proposal of Recommended Date for Executing Additional Maintenance According to Print Schedule of Printed Matter For example, in a case where a print schedule or an order of printed matter is registered in a schedule, the recommended date proposal unit 15 may set a schedule of additional maintenance at a recommended execution point in time such as a day on which there is no print schedule or print order or few print orders during the recommended execution time period for additional maintenance described in the present embodiment. Further, in a case where there multiple recommended execution points in time during the recommended execution time period, the terminal apparatus 101 may present a priority order of the recommended execution points in time according to a print volume or a print order volume, or according to a length of an available time period in which there is no scheduled date and time for executing a printing job.

Figures 32A, 32B:
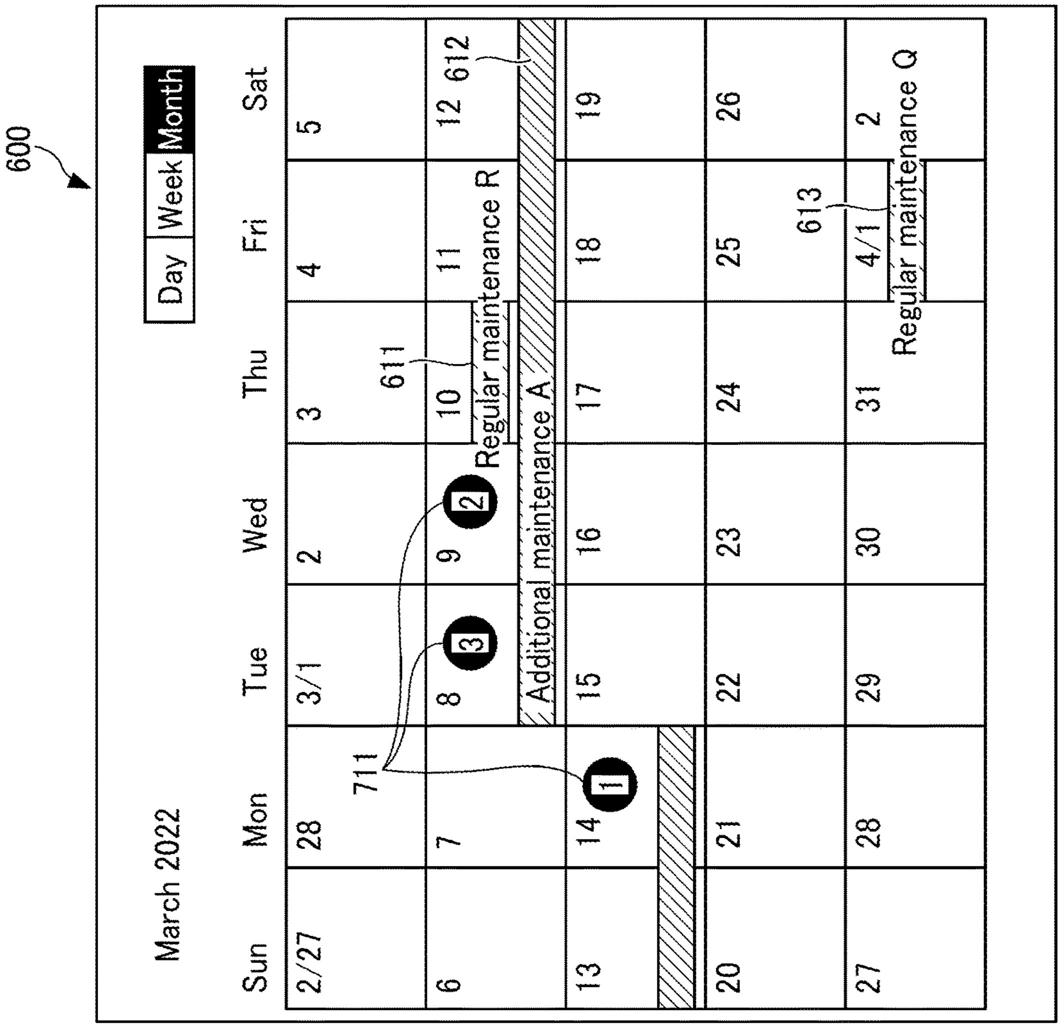
FIG. 32A is a diagram illustrating the maintenance schedule screen on which a recommended execution point in time of additional maintenance is displayed according to a print schedule and a print order, according to an embodiment of the present disclosure.
FIG. 32B is a table of a print schedule of the image forming apparatus and a continuous available time registered in the printing job information storage unit, according to an embodiment of the present disclosure.

FIG. 32A illustrates the maintenance schedule screen 600 on which the recommended execution point in time of the additional maintenance is displayed according to the print schedule and the print order. In FIG. 32A, a recommended execution time period for additional maintenance A is from March 8 to 14. FIG. 32B illustrates the print schedule of the image forming apparatus 103 and the continuous available time registered in the printing job information storage unit 1006. The print schedule includes a print schedule based on an order placed via the Internet. A length of a continuous available time during which the image forming apparatus 103 is available (no printing job is executed) within the print schedule of March 8 to 14 is known. March 12 and 13 are holidays.

The recommended date proposal unit 15 determines the priority order of the recommended dates according to a rule as follows:

1. a day on which no printing is scheduled (in a case where there are multiple days on which no printing is scheduled, the priority order is determined in an ascending order of date); and
2. a day on which printing is scheduled but including an available time (in a case where there are multiple days on which printing is scheduled but including an available time, the priority order is determined in a descending order of the length of a continuous available time).

In FIG. 32B, since there is no print schedule on March 14 and an available time on March 9 is longer than an available time on March 8, the recommended date proposal unit 15 determines the priority order of "(1) March 14, (2) March 9, (3) March 8." The image forming apparatus 103 displays a priority order 711 of the recommended dates for additional maintenance in association with the dates, as illustrated in FIG. 32A. Such a configuration makes it easy for the user to narrow down the date on which the user determines to perform additional maintenance.

When there are two or more continuous available times on the same day, the recommended date proposal unit 15 may add information indicating that there are two or more continuous available times on the same day to the priority order. The terminal apparatus 101 may display the information indicating that there are two or more continuous available times on the same day. For example, the terminal apparatus 101 displays that there are two or more continuous available times by changing the color of the number indicating the priority order or changing the shape of a figure (circle in the figure) surrounding the number for a day having two or more continuous available times.

Registration of Printing Job on Sharing Platform In a case where the image forming apparatus 103 is shared by multiple persons, such as a printing sharing platform, a printing job is registered in a time when the image forming apparatus 103 is available. However, in the present embodiment, a scheduled date of regular maintenance or a recommended execution time period for additional maintenance may be recognized as a quasi available time. In this case, the server apparatus 104 can transmit a confirmation message to a user who has set a printing job, the confirmation message inquiring whether to register the printing job even in a recommended time period for maintenance. Conversely, the server apparatus 104 may cause the terminal apparatus 101 to display a scheduled date of regular maintenance or a recommended execution time period for additional maintenance as a use prohibited period so that registration of a printing job is not accepted. The server apparatus 104 may allow an authorized administrator to set how the terminal apparatus 101 displays the scheduled date of regular maintenance or the recommended execution time period for additional maintenance.

Further, the server apparatus 104 may display a recommendation for settings that are machine-learned from frequently used user settings.

Figure 33:
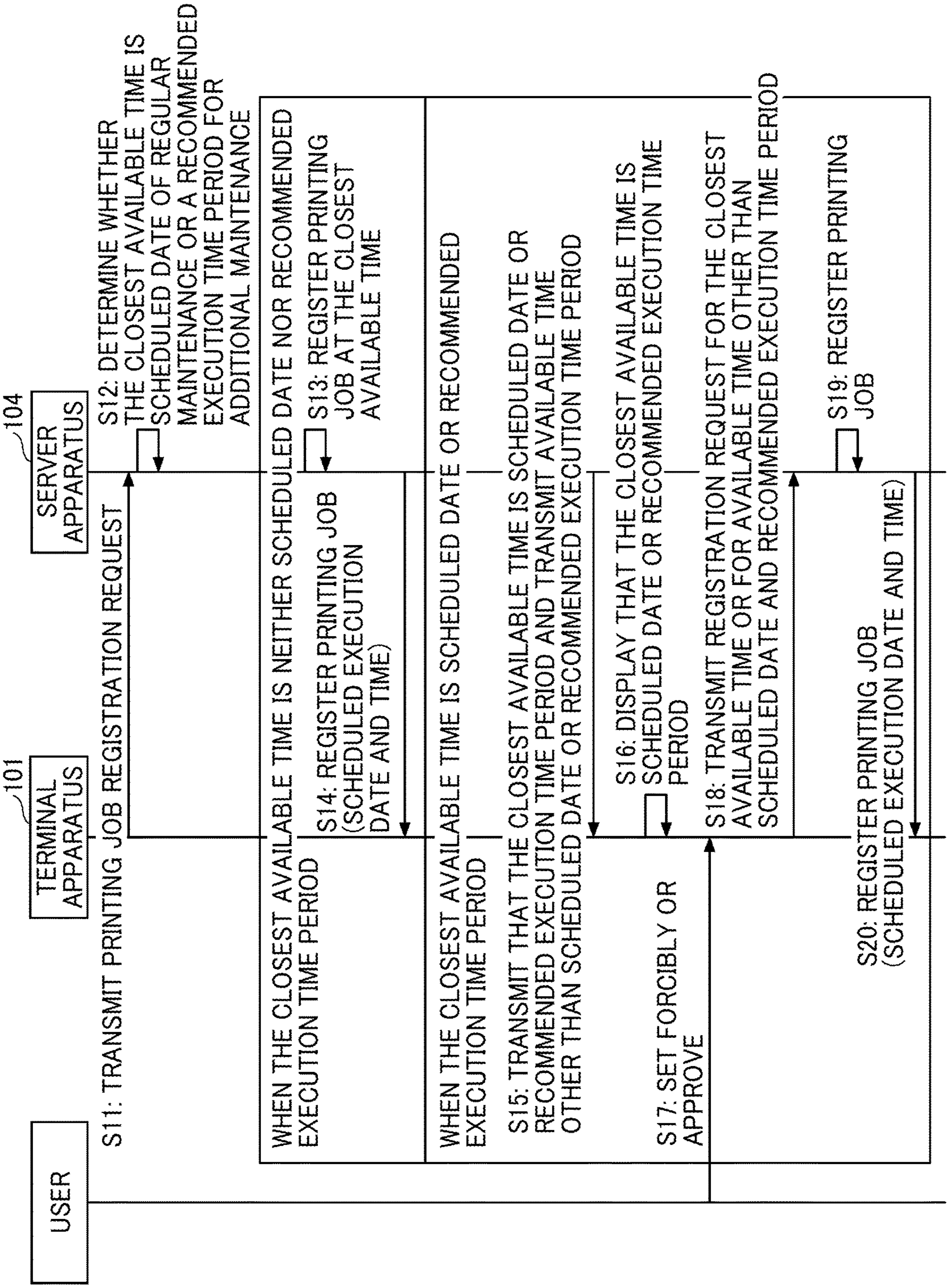
FIG. 33 is a sequence diagram illustrating an operation of setting a printing job in the image forming apparatus that is a sharing platform, according to an embodiment of the present disclosure.

FIG. 33 is a sequence diagram illustrating an operation of setting a printing job in the image forming apparatus 103 that is a sharing platform according to an embodiment of the present disclosure.

S11: The communication unit 31 of the terminal apparatus 101 transmits a request for registering a printing job instructed by a user to the server apparatus 104. The request for registering the printing job may be referred to as a "printing job registration request" in the following description.

S12: The communication unit 11 of the server apparatus 104 receives the printing jog registration request, and the printing job registration unit 16 calculates a time required to complete the printing job. Further, the printing job registration unit 16 determines whether an available time that is longer than the calculated time required to complete the printing job and that is closest to the current time is a scheduled date of regular maintenance or a recommended execution time period for additional maintenance. Specifically, the printing job registration unit 16 determines the closest available time on the basis of the information stored in the printing job information storage unit 1006, and determines whether the closest available time is the scheduled date of regular maintenance or the recommended execution time period for additional maintenance.

S13: When the closest available time is neither the scheduled date of regular maintenance nor the recommended execution time period for additional maintenance, the printing job registration unit 16 registers the printing job at the closest available time.

S14: The communication unit 11 of the server apparatus 104 transmits the scheduled execution date and time and information indicating that the printing job has been registered to the terminal apparatus 101. The display control unit 32 of the terminal apparatus 101 displays the scheduled execution date and time and the information indicating that the printing job has been registered.

S15: When the closest available time is the scheduled date of regular maintenance or the recommended execution time period for additional maintenance, the printing job registration unit 16 transmits information indicating that the closest available time is the scheduled date or the recommended execution time period for additional maintenance and transmits the closest available time that is not the scheduled date or the recommended execution time period for additional maintenance to the terminal apparatus 101.

Figure 34:
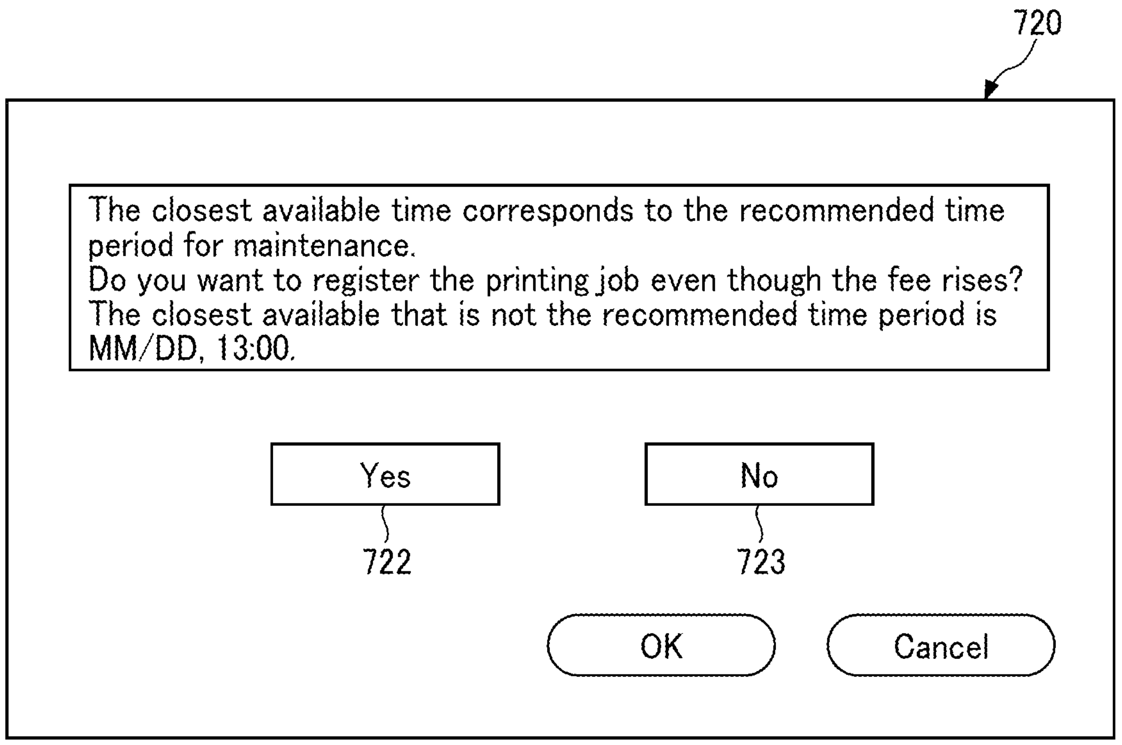
FIG. 34 is a diagram illustrating a confirmation screen displayed by the terminal apparatus, according to an embodiment of the present disclosure.

S16: The communication unit 31 of the terminal apparatus 101 receives the information and the closest available time, and the display control unit 32 displays on a confirmation screen 720 described below the information that the closest available time is the scheduled date of regular maintenance or the recommended execution time period for additional maintenance. FIG. 34 illustrates a display example of the confirmation screen 720.

S17: The user views the confirmation screen and inputs forced setting ("Yes" button) or approval ("No" button). The "forced setting" means to schedule the printing job on the scheduled date of regular maintenance or a date during the recommended execution time period for additional maintenance. The "approval" means to schedule the printing job at the closest available time that is not the scheduled date or the recommended execution time period. An extra fee may be added for the forced setting.

S18: The operation receiving unit 33 of the terminal apparatus 101 receives the input, and the communication unit 11 transmits, to the server apparatus 104, the printing job registration request that requests to register the printing job at the closest available time or the closest available time that is not the scheduled date and the recommended execution time period according to the input by the user.

S19: The communication unit 11 of the server apparatus 104 receives the printing job registration request, and the printing job registration unit 16 registers the printing job at the closest available time or the available time that is not the scheduled date and the recommended execution time period.

S20: The communication unit 11 of the server apparatus 104 transmits the scheduled execution date and time and information indicating that the printing job has been registered to the terminal apparatus 101. The display control unit 32 of the terminal apparatus 101 displays the scheduled execution date and time and the information indicating that the printing job has been registered.

FIG. 34 illustrates the confirmation screen 720 displayed by the terminal apparatus 101 according to an embodiment of the present disclosure. The confirmation screen 720 includes a message 721, a "Yes" button 722, and a "No" button 723. The message 721 is "The closest available time corresponds to the recommended time period for maintenance. Do you want to register the printing job even though the fee rises? The closest available time that is not the recommended time period for maintenance is MM/DD, 13:00." The "Yes" button 722 corresponds to the forced setting, and the "No" button 723 corresponds to the approval. The user can select the "Yes" button 722 or the "No" button 723 in consideration of the extra fee and the closest available time that is not the recommended time period. The extra fee is either known to the user or displayed on the confirmation screen 720.

The printing job registration unit 16 may register a printing job at the closest available time or at an available time that is not the scheduled date and the recommended execution time period according to a pre-registered attribute of a user. For example, in a case where the user is a premium member, the printing job registration unit 16 can set a printing job at the closest available time that overlaps with the recommended time period for maintenance. In a case where the user is a general user, the printing job registration unit 16 causes the display control unit 32 of the terminal apparatus 101 to display the confirmation screen 720 of FIG. 34.

Further, when a scheduled date of regular maintenance or a recommended execution time period for additional maintenance is defined as a use prohibited period to prohibit any printing job from being registered, the printing job registration unit 16 registers a printing job at the closest available time excluding the scheduled date of regular maintenance or the recommended execution time period of additional maintenance. In this case, the server apparatus 104 may notify the user that a scheduled execution date and time is delayed due to a scheduled date of regular maintenance or a recommended execution time period for additional maintenance.

Display of Use Prohibited Period

When the system allows a user to select a desired scheduled execution date of a printing job and to register the printing job on the selected date, the server apparatus 104 notifies the terminal apparatus 101 of a scheduled date of regular maintenance or a recommended execution time period for additional maintenance as a use prohibited period, and does not accept registration of the printing job from the user during the use prohibited period.

Figure 35:
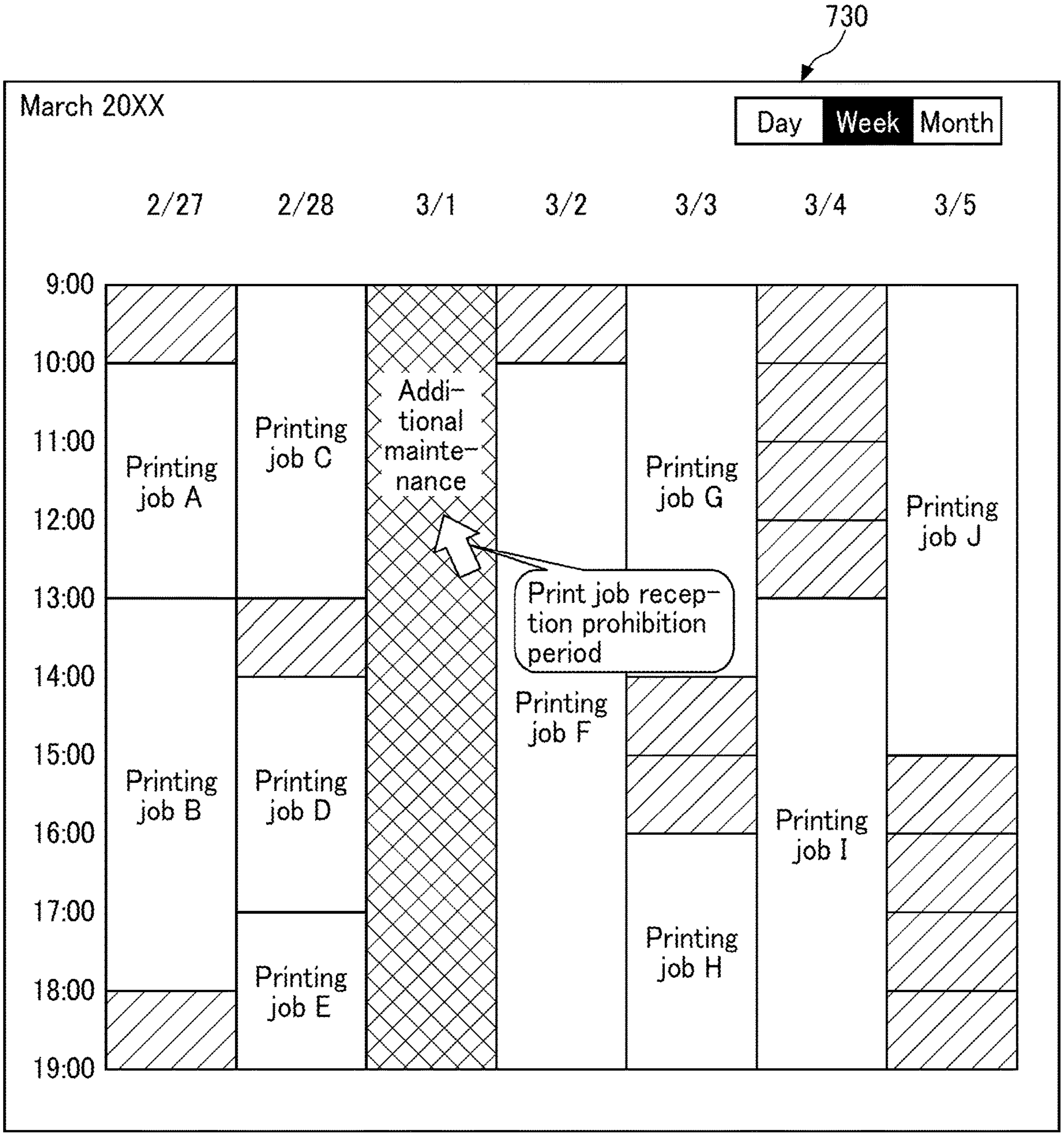
FIG. 35 is a diagram illustrating a printing job registration screen displayed by the terminal apparatus, according to an embodiment of the present disclosure.

FIG. 35 illustrates a printing job registration screen 730 displayed by the terminal apparatus 101. The printing job registration screen 730 displays a schedule of registered printing jobs. The printing job registration screen 730 displays time periods of the registered printing jobs, available times, and a recommended execution time period for additional maintenance (including a scheduled date of regular maintenance) in different colors. The user can designate a desired time for executing a printing job by clicking any one of the available times with a mouse.

Further, it is preferable that the same time period as the time period of additional maintenance is distinguished not only by color but also by half-luminance display. Even when the user clicks the same time period as the time period of additional maintenance, the operation receiving unit 33 does not receive the click. In other words, the user is not allowed to designate a time at which a printing job is to be executed in the same time period as the time period of additional maintenance. When the user clicks or hover a mouse over the same time period as the time period of additional maintenance, it is preferable that information indicating a printing job reception prohibition period is displayed. Accordingly, the user can register the printing job while avoiding the printing job reception prohibited period. Further, the printing job registration screen 730 may display information indicating that a printing job can be registered by payment of an extra fee when the user clicks or hovers a mouse over the same time period as the time period of additional maintenance.

Use of Machine Learning

In the operation of the sequence diagram of FIG. 33, when the closest available time is a scheduled date of regular maintenance or a recommended execution time period for additional maintenance, a model may be created by machine-learning the correspondence between a scheduled execution date and time (training data) when the user actually registered a printing job and a time interval (input data) until the closest available time that is not the recommended execution time period. When an actual time interval is input to the model, the model outputs a scheduled execution date and time that is likely to be set by a user. The printing job registration unit 16 inputs a time interval until the closest available time that is not the recommended execution time period to the model, and proposes to a user a scheduled execution date and time at which the user is likely to actually register a printing job. In this case, the model can suggest a scheduled execution date and time that the user is likely to set even with payment of the extra fee.

Supplementary Description on Devices Other than Image Forming Apparatus

Figure 36:
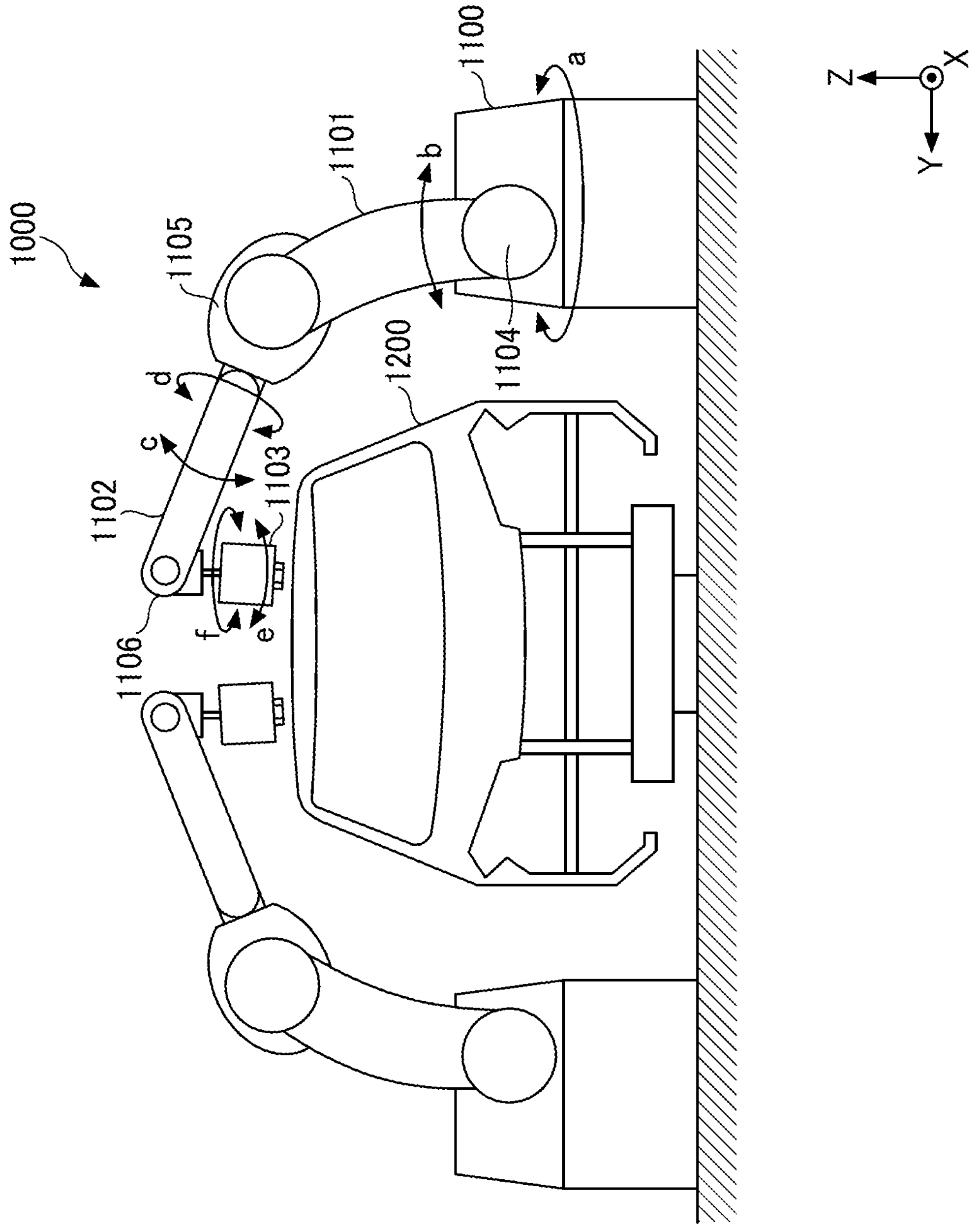
FIG. 36 is an entire schematic view of a liquid discharge apparatus, according to an embodiment of the present disclosure.
Figure 37:
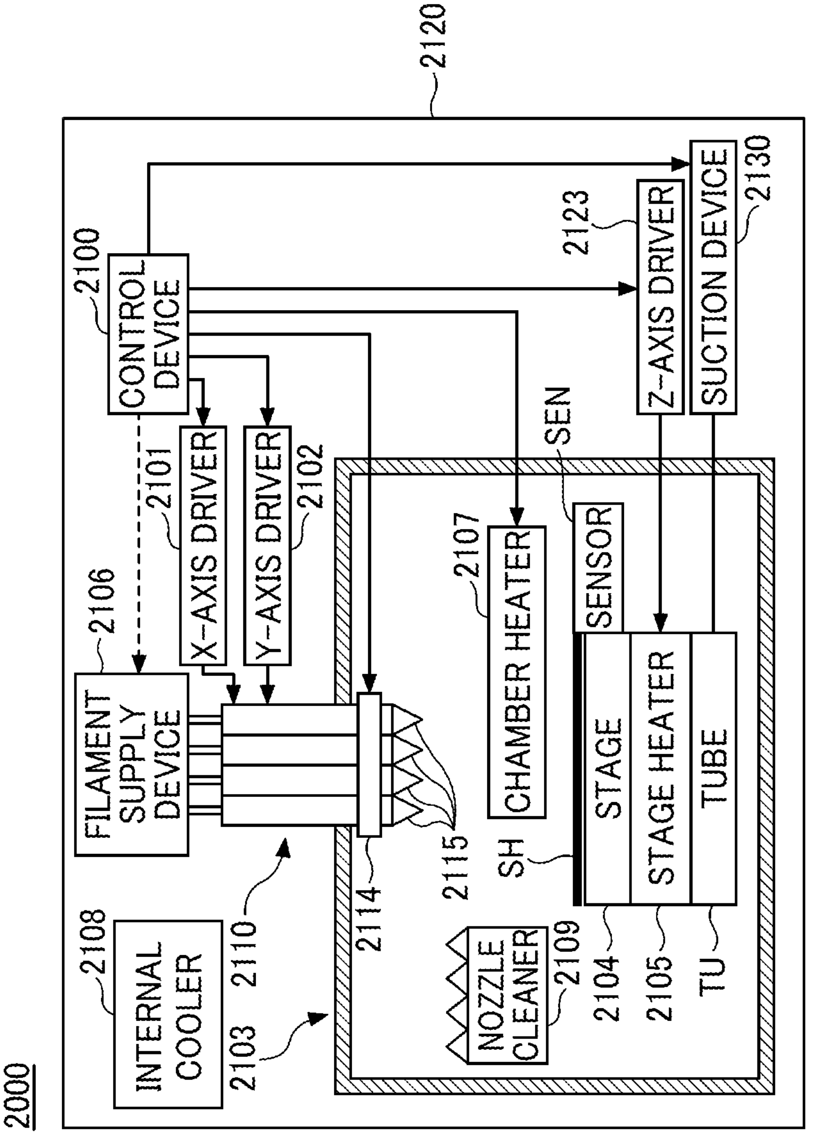
FIG. 37 is a schematic diagram illustrating a hardware configuration of a three-dimensional (3D) printer, according to an embodiment of the present disclosure.
Figure 38:
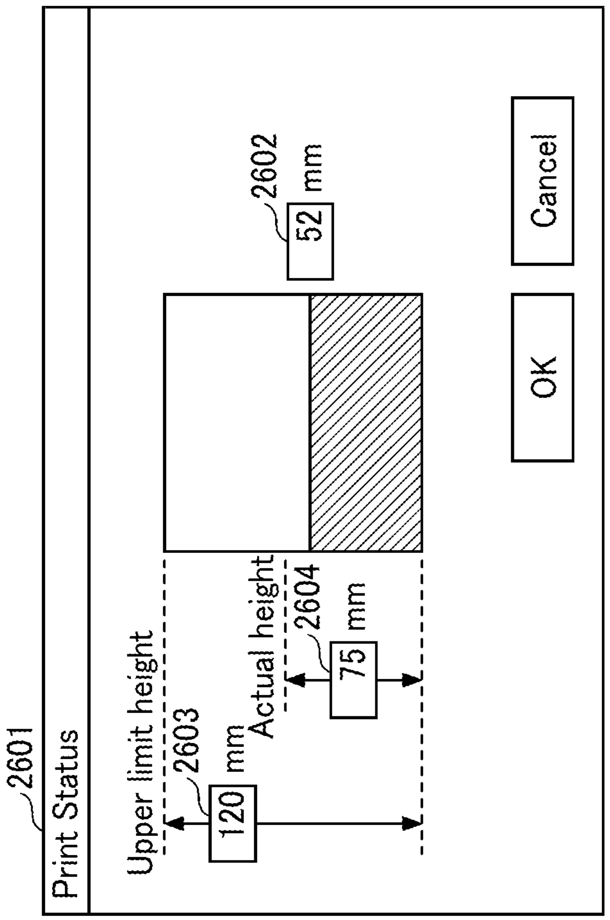
FIG. 38 is a diagram illustrating a progress status screen displayed on a display that a control device includes, according to an embodiment of the present disclosure.

With reference to FIG. 36 to FIG. 38, configurations of some devices are supplementarily described below. In the following description, as the devices, a liquid discharge apparatus and a 3D printer that paints, for example, an automobile are described.

Liquid Discharge Apparatus

FIG. 36 is an entire schematic view of a liquid discharge apparatus. The liquid discharge apparatus illustrated in FIG. 36 is a coating robot 1000 that coats, for example, a body of an automobile. An X-axis direction, a Y-axis direction, and a Z-axis direction are indicated by arrows in the drawings, which are three directions intersecting with each other. The X-axis direction is, for example, a front-back direction of the body of the automobile which is an object to be coated. The Y-axis direction is a width direction of the body of the automobile. The Z-axis direction is the up-down direction in FIG. 36.

As illustrated in FIG. 36, the coating robot 1000 is installed so as to face an object 1200 such as a surface of the body of the automobile. The coating robot 1000 includes a base 1100, a first arm 1101, a second arm 1102, and a head unit 1103. The first arm 1101 is coupled to the base 1100. The second arm 1102 is coupled to the first arm 1101. The head unit 1103 is coupled to the second arm 1102.

The coating robot 1000 includes a first joint 1104, a second joint 1105, and a third joint 1106. The first joint 1104 couples the base 1100 and the first arm 1101. The second joint 1105 couples the first arm 1101 and the second arm 1102. The third joint 1106 couples the second arm 1102 and the head unit 1103.

The coating robot 1000 is, for example, a multi-articulated robot. The base 1100 is rotatable in the direction indicated by arrow a about a rotation shaft extending in the Z-axis direction. The base 1100 supports one end of the first arm 1101 via the first joint 1104.

The first arm 1101 is swingable in the direction indicated by arrow b about a rotation shaft parallel to an X-Y plane. The other end of the first arm 1101 supports one end of the second arm 1102 via the second joint 1105. The second arm 1102 is swingable in the direction indicated by arrow c about a rotation shaft parallel to the X-Y plane. Further, the second arm 1102 is rotatable in the direction indicated by arrow d about a rotation shaft extending in the longitudinal direction of the second arm 1102.

The other end of the second arm 1102 supports the head unit 1103 via the third joint 1106. The head unit 1103 is swingable in the direction indicated by arrow e about a rotation shaft extending in the direction intersecting the longitudinal direction of the second arm 1102. Further, the head unit 1103 is rotatable in the direction indicated by arrow f about a rotation shaft extending in the direction from the third joint 1106 toward the head unit 1103.

The coating robot 1000 freely moves the head unit 1103 relative to the object 1200. The coating robot 1000 accurately positions the head unit 1103 relative to the object 1200. The coating robot 1000 accurately positions the head unit 1103 at a coating position for coating the object 1200. The coating robot 1000 discharges paint toward the object 1200 to coat the object 1200 with the paint.

In the present embodiment, the system configuration in which one coating robot 1000 is disposed on each side of the object 1200 is illustrated, but the coating robot 1000 is not limited to being disposed on each side of the object 1200. The number of coating robots 1000 installed may be one, or three or more with respect to the object 1200.

3D Printer

A 3D printer is a device that can produce a three-dimensional object on the basis of three-dimensional shape data. The 3D printer is also called a lamination fabrication apparatus, an additive manufacturing (AM) apparatus, and an AM machine. A fabrication method by the 3D printer typically includes, for example, an inkjet method, a fused deposition modeling (FDM) method, and a powder adhering method. Any other suitable fabrication methods may be used. In the inkjet method, a liquid resin is applied and then irradiated with, for example, ultraviolet light to harden the liquid resin little by little. In the FDM method, resin that is melt by heat is gradually piled up. In the powder adhering method, adhesive is sprayed onto powdered resin. In the following description, the 3D printer using the FDM method is described according to an embodiment of the present disclosure.

FIG. 37 is a schematic diagram illustrating a hardware configuration of a 3D printer 2000 according to an embodiment of the present disclosure. For example, as illustrated in FIG. 37, the 3D printer 2000 includes a chamber 2103 inside a frame 2120. The interior of the chamber 2103 is a processing space to fabricate an object three-dimensionally. A stage 2104 is provided as a placement table in the processing space, i.e., in the chamber 2103. In the present embodiment, a fabrication object is manufactured on the stage 2104.

A fabrication head 2110 as fabricating means is disposed above the stage 2104 in the chamber 2103. Further, the fabrication head 2110 includes discharging nozzles 2115 that discharge filaments at the bottom. Although in the present embodiment, the fabrication head 2110 includes the four discharging nozzles 2115, the number of the discharging nozzles 2115 is any number. The fabrication head 2110 further includes a head heating device 2114 to heat the filaments supplied to the discharging nozzles 2115. As described above, the 3D printer manufactures the fabrication object using the filaments held in advance.

Further, the temperature inside the frame 2120 is adjusted by an internal cooler 2108.

The filament is, for example, a material such as acrylonitrile butadiene styrene (ABS) resin or polylactic acid (PLA) resin.

Further, the filament is thermoplastic. Accordingly, the filament is heated and hot when discharged from the 3D printer. After being discharged, the filaments are cooled by, for example, air cooling to be cured. Using such a property, the 3D printer discharges the filament to manufacture the fabrication object.

The filament has an elongated wire shape, for example. The filament is positioned in the 3D printer 2000 as being wound, for example. Further, a filament supply device 2106 supplies the filament to the discharging nozzles 2115 of the fabrication head 2110.

An X-axis driver 2101 drives the fabrication head 2110 to move in the X-axis direction. The X-axis driver 2101 includes, for example, an actuator, a mechanism, a power supply, and an electronic circuit.

In substantially the same manner, a Y-axis driver 2102 drives the fabrication head 2110 to move in the Y-axis direction. The Y-axis driver 2102 includes, for example, an actuator, a mechanism, a power supply, and an electronic circuit. Further a Z-axis driver 2123 drives the fabrication head 2110 to move in the Z-axis direction.

The Z-axis driver 2123 includes, for example, an actuator, a mechanism, a power supply, and an electronic circuit.

In the illustrated example, the control device 2100 issues a position command to the X-axis driver 2101, the Y-axis driver 2102, and the Z-axis driver 2123. The X-axis driver 2101, the Y-axis driver 2102, and the Z-axis driver 2123 move the stage 2104 to the commanded position on the basis of the command from the control device 2100. The control device 2100 controls the devices.

As illustrated in FIG. 37, the 3D printer 2000 preferably further includes a stage heater 2105 that can heat the stage 2104 and the fabrication object on the stage 2104. The stage heater 2105 is, for example, a heater.

A chamber heater 2107 as a heating means for heating the interior of the chamber 2103 is disposed in the chamber 2103 (the processing space). The 3D printer 2000 preferably performs manufacturing with the temperature in the chamber 2103 maintained at a target temperature by the chamber heater 2107.

The discharging nozzles 2115 discharge the filaments of different types. Alternatively, the discharging nozzles 2115 discharge the filaments of the same type. Further, in the present embodiment, the 3D printer 2000 heats and melts the filament supplied by the filament supply device 2106 by the head heating device 2114.

Subsequently, the 3D printer 2000 extrudes the molten filament from the discharging nozzles 2115, to discharge the filament. Further, the 3D printer 2000 laminates multiple layers formed by the filaments on the stage 2104 by the discharge, to manufacture the fabrication object.

The 3D printer 2000 may use a support material. In other words, the support material may be supplied to the discharging nozzles 2115. The support material may be made of a different material of the filament. The support material is removed from the fabrication object made of the filament after the fabrication object is manufactured. For example, the support material is first heated and melted by the head heating device 2114 in substantially the same manner as the filament. Subsequently, the molten support material is extruded and discharged from the discharging nozzles 2115, and is laminated in substantially the same manner as the filament.

Further, as illustrated in FIG. 37, the 3D printer 2000 preferably has a configuration that can suck a sheet SH placed on the stage 2104. For example, as illustrated in FIG. 37, a tube TU and a suction device 2130 suck the sheet SH on the basis of a status detected by a sensor SEN.

Further, as illustrated in FIG. 37, the 3D printer 2000 preferably includes a nozzle cleaner 2109. The nozzle cleaner 2109 cleans the discharge nozzles 2115 so that, for example, impurities are not mixed with the discharged filament.

Accordingly, in the present embodiment, the 3D printer 2000 performs a preheating process of raising the temperature in the chamber 2103 to a target temperature before starting manufacturing. For example, during the preheating process, the chamber heater 2107 heats the interior of the chamber 2103 to raise the temperature of the interior of the chamber 2103 to around the target temperature. On the other hand, during manufacturing, the chamber heater 2107 heats the interior of the chamber 2103 to maintain the temperature of the interior of the chamber 2103 near the target temperature. The operation of the chamber heater 2107 is controlled by the control device 2100.

The hardware configuration illustrate in FIG. 37 is merely one example, and the 3D printer 2000 can have any other suitable hardware configuration. For example, the 3D printer 2000 may include multiple control devices 2100. On the other hand, for example, the suction device 2130 may be omitted from the 3D printer 2000.

FIG. 38 is a diagram illustrating a progress status screen 2601 displayed on a display that the control device 2100 includes according to an embodiment of the present disclosure. On the progress status screen 2601 of FIG. 38, an actual height hx indicated by a reference numeral 2604 and an upper limit height information Mh indicated by a reference numeral 2603 are displayed.

A user can compare the actual height hx of a 3D model with the current height H of the fabrication object to recognize the progress of printing. Further, in a case where the orientation of the 3D model displayed by a 3D application and the orientation of the 3D model disposed in a virtual space of the 3D printer 2000 change, the user does not have to recognize the actual height of the 3D model.

As described above, in the maintenance management system 1 according to the present embodiment, a time period during which additional maintenance that is added when a sign of failure is detected is to be performed is longer than at least one of a time period required for the additional maintenance and the recommended execution time period 601 for regular maintenance. As a result, a point in time when a user performs maintenance is determined so that production work using a device does not hinder.

Applied Case

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Although in the present embodiment, the description given is of a case in which the image forming apparatus 103 determines a recommended execution time period for regular maintenance, this is merely one example. In another example, the server apparatus 104 determines the recommended execution time period for regular maintenance. Although in the present embodiment, the description given is of a case in which the server apparatus 104 determines a recommended execution time period for additional maintenance, this is merely one example. In another example, the image forming apparatus 103 determines the recommended execution time period for additional maintenance.

Although in the present embodiment, the description given is of a case in which the image forming apparatus 103 executes a native application and displays the maintenance schedule, this is merely one example. In another example, the image forming apparatus 103 displays the maintenance schedule using a general-purpose web browser. In this case, the server apparatus 104 creates a screen of the maintenance schedule.

The examples of configuration illustrated in, for example, FIG. 7 are divided according to main functions in order to facilitate understanding of processing by the server apparatus 104 and the image forming apparatus 103. The scope of the present invention is not limited by how the process units are divided or by the names of the process units. The processing of the server apparatus 104 and the image forming apparatus 103 is divided into more segmentalized processing units according to the processing content. Further, one process may be divided to include the larger number of processes.

The apparatuses or devices described in the above-described embodiments are merely one example of multiple computing environments that implement the embodiments disclosed herein. In some embodiments, the DFE 102 includes multiple computing devices, such as a server cluster. The multiple computing devices are configured to communicate with one another through any type of communication link, including a network, a shared memory, etc., and perform the processes disclosed herein.

Further, the server apparatus 104 can be configured to share the disclosed processing steps, for example, the processing of FIG. 29 and FIG. 30, in various combinations. For example, a process executed by a predetermined unit may be executed by a plurality of information processing apparatuses included in the server apparatus 104.

Further, the server apparatus 104 may be integrated into one server apparatus or may be divided into a plurality of apparatuses.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The system according to the related art has a drawback that there is little room for a user to decide when to perform a temporarily added maintenance. For example, as in the related art, the efficiency of the maintenance itself can be enhanced by updating the maintenance schedule so that the temporary maintenance is performed at a point in time of regular maintenance. However, since the devices are originally to be used for production work such as printing of printed matter, users of the apparatuses want to perform maintenance at a point in time when the maintenance is less likely to interfere with the production work. Accordingly, when additional maintenance other than regular maintenance whose work content and execution schedule are determined in advance is added to a maintenance schedule without considering the production work, the production work by the user may be delayed.

According to one or more embodiments of the present disclosure, a user can be provided with a recommended time period for performing additional maintenance.

According to an embodiment, a maintenance management system includes circuitry. In a case that, in addition to a first maintenance, a second maintenance is to be performed, the second maintenance being a maintenance that is extraordinarily added differently from the first maintenance, the circuitry sets a recommended time period for executing the second maintenance to be longer than a time required for the second maintenance, and displays a maintenance schedule including a recommended time period for executing the first maintenance and the recommended time period for executing the second maintenance.

In the maintenance management system, the circuitry may set the recommended time period for executing the second maintenance to be longer than the recommended time period for executing the first maintenance.

In the maintenance management system, the circuitry may set the recommended time period for executing the second maintenance so as to overlap with the recommended time period for executing the first maintenance.

In the maintenance management system, the circuitry may set the recommended time period for executing the second maintenance so as to continue before or after the recommended time period for performing the first maintenance.

In the maintenance management system, the circuitry may set, as the recommended time period for executing the second maintenance, a plurality of days that is longer than a day on which the first maintenance is displayed in a monthly calendar.

In the maintenance management system, the circuitry may extend the recommended time period for executing the second maintenance, when the recommended time period for executing the first maintenance does not exist before a maintenance deadline associated with a type of the second maintenance.

In the maintenance management system, the circuitry may set, as the recommended time period for executing the second maintenance, a time period longer than a time period in which the first maintenance is displayed in a weekly maintenance schedule or a daily maintenance schedule.

In the maintenance management system, the circuitry may change a display color of the recommended time period for executing the second maintenance on the monthly calendar according to an elapse of the recommended time period for executing the second maintenance.

In the maintenance management system, the circuitry may display information indicating that the recommended time period for executing the second maintenance is set, in a case that a predetermined operation for the first maintenance on a device is detected during the recommended time period for executing the second maintenance.

In the maintenance management system, the circuitry may display a link for displaying a work procedure of the second maintenance, in addition to the information indicating that the recommended time period for executing the second maintenance is set.

In the maintenance management system, the circuitry may determine a recommended date on which a usage amount of a device to be maintained during the recommended time period for executing the second maintenance is relatively small by using usage amount information of the device for every day of a week. The circuitry may display the recommended date in addition to the recommended time period for executing the second maintenance.

In the maintenance management system, the circuitry may receive completion of execution of the first maintenance or the second maintenance for which the recommended time period for executing is displayed. In a case that the circuitry receives the completion of the first maintenance, the circuitry may delete the recommended time period for executing the first maintenance from the maintenance schedule. In a case that the circuitry receives the completion of execution of the second maintenance, the circuitry may change a display mode of the recommended time period for executing the second maintenance from a display mode before the completion of the second maintenance.

In the maintenance management system, the circuitry may receive completion of execution of the first maintenance or the second maintenance for which the recommended time period for executing is displayed. In a case that the circuitry receives the completion of the first maintenance, the circuitry may delete the recommended time period for executing the first maintenance from the maintenance schedule. In a case that the circuitry receives the completion of execution of the second maintenance, the circuitry may delete the recommended time period for executing the second maintenance from the maintenance schedule except for a date on which the second maintenance is executed.

In the maintenance management system, the circuitry may determine an operator who can perform the second maintenance based on information on the operator associated with a type of the second maintenance. The circuitry may prevent displaying the recommended time period for executing the second maintenance on the maintenance schedule, in a case that the operator is an external person.

In the maintenance management system, the first maintenance may be regular maintenance that is set based on a counter value of a device.

In the maintenance management system, the second maintenance may be additional maintenance for dealing with a sign of failure that is detected based on device status information of a device input to a failure prediction model.

In the maintenance management system, a device subjected to maintenance may be an image forming apparatus that forms an image on a sheet, a device that can create a three-dimensional object based on three-dimensional shape data, or a liquid discharging device.

In the maintenance management system, the circuitry may determine a priority order of multiple recommended dates including the recommended date, based on a day on which no printing is scheduled and a length of an available time period in a day on which printing is scheduled during the recommended time period for executing the second maintenance. The circuitry may display the priority order of the multiple recommended dates in addition to the recommended time period for executing the second maintenance.

In the maintenance management system, the circuitry may receive registration of a printing job from a terminal apparatus operated by a user. In a case that a closest available time among available times in which no printing job is registered is the recommended time period for executing the second maintenance, the circuitry may inquire of the terminal apparatus whether to register the printing job in the closest available time or a closest available time that is not the recommended time period for executing the second maintenance.

According to an embodiment, a maintenance schedule display method includes determining to perform, in addition to a first maintenance, a second maintenance that is extraordinarily added differently from the first maintenance. The maintenance schedule display method includes setting a recommended time period for executing the second maintenance to be longer than a time required for the second maintenance. The maintenance schedule display method includes controlling a display to display a maintenance schedule including a recommended time period for executing the first maintenance and the recommended time period for executing the second maintenance.

According to an embodiment, an information processing system incudes circuitry. In a case that, in addition to a first maintenance, a second maintenance is to be performed, the second maintenance being a maintenance that is extraordinarily added differently from the first maintenance, the circuitry sets set a recommended time period for executing the second maintenance to be longer than a time required for the second maintenance, and transmits, to a device, data indicating a maintenance schedule including the recommended time period for executing the first maintenance and the recommended time period for executing the second maintenance.

According to an embodiment, a maintenance schedule display method for transmitting, from an information processing apparatus to a device, data indicating a recommended time period for executing a first maintenance and a recommended time period for executing a second maintenance that is extraordinarily added differently from the first maintenance is provided. The method includes setting the recommended time period for executing the second maintenance to be longer than a time required for the second maintenance. The method includes transmitting data indicating a maintenance schedule including the recommended time period for executing the first maintenance and the recommended time period for executing the second maintenance.

According to an embodiment, a non-transitory computer-executable medium is provided that stores a plurality of instructions, which, when executed by a processor of an information processing apparatus, causes the processor to perform a method. The method includes, in a case that, in addition to a first maintenance, a second maintenance is to be performed, the second maintenance being a maintenance that is extraordinarily added differently from the first maintenance, setting a recommended time period for executing the second maintenance to be longer than a time required for the second maintenance, and transmitting, to a device, data indicating a maintenance schedule including the recommended time period for executing the first maintenance and the recommended time period for executing the second maintenance.

ASPECTS

Aspect 1

According to Aspect 1, a maintenance management system displays a recommended time period for executing a first maintenance and a recommended time period for executing a second maintenance having a maintenance execution priority lower than the maintenance execution priority of the first maintenance.

The maintenance management system includes a maintenance schedule setting unit configured to set the recommended time period for executing the second maintenance to be longer than a time required for the second maintenance.

The maintenance management system includes a display control unit configured to display a maintenance schedule including the recommended time period for executing the first maintenance and the recommended time period for executing the second maintenance.

Aspect 2

According to Aspect 2, in the maintenance management system of Aspect 1, the maintenance schedule setting unit sets the recommended time period for executing the second maintenance to be longer than the recommended time period for executing the first maintenance.

Aspect 3

According to Aspect 3, in the maintenance management system of Aspect 2, the maintenance schedule setting unit sets the recommended time period for executing the second maintenance so as to overlap with the recommended time period for executing the first maintenance.

Aspect 4

According to Aspect 4, in the maintenance management system of Aspect 1, the maintenance schedule setting unit sets the recommended time period for executing the second maintenance continuously before or after the recommended time period for performing the first maintenance.

Aspect 5

According to Aspect 5, in the maintenance management system of any one of Aspects 2 to 4, the maintenance schedule setting unit sets, as the recommended time period for executing the second maintenance, a plurality of days that is longer than a day on which the first maintenance is displayed in a monthly calendar.

Aspect 6

According to Aspect 6, in the maintenance management system of Aspect 3, the maintenance schedule setting unit extends the recommended time period for executing the second maintenance, when the recommended time for executing the first maintenance does not exist before a maintenance deadline associated with a type of the second maintenance.

Aspect 7

According to Aspect 7, in the maintenance management system of any one of Aspects 1 to 4, the maintenance schedule setting unit sets, as the recommended time period for executing the second maintenance, a time period longer than a time period in which the first maintenance is displayed in a weekly maintenance schedule or a daily maintenance schedule.

Aspect 8

According to Aspect 8, in the maintenance management system of Aspect 5, the display control unit changes a display color of the recommended time period for executing the second maintenance on the monthly calendar according to an elapse of the recommended time period for executing the second maintenance.

Aspect 9

According to Aspect 9, in the maintenance management system of any one of Aspects 1 to 8, the display control unit displays information indicating that the recommended time period for executing the second maintenance is set, when a predetermined operation for the first maintenance on a device is detected during the recommended time period for executing the second maintenance.

Aspect 10

According to Aspect 10, in the maintenance management system of Aspect 9, the display control unit displays a link for displaying a work procedure of the second maintenance, in addition to the information indicating that the recommended time period for executing the second maintenance is set.

Aspect 11

According to Aspect 11, the maintenance management system of any one of Aspects 1 to 10 further includes a recommended date proposal unit configured to determine a recommended date on which a usage amount of a device to be maintained during the recommended time period for executing the second maintenance is relatively small by using usage amount information for every day of a week of the device.

The display control unit displays the recommended date proposed by the recommended date proposal unit in addition to the recommended time period for executing the second maintenance.

Aspect 12

According to Aspect 12, the maintenance management system of any one of Aspects 1 to 11 further includes an operation receiving unit configured to receive completion of execution of the first maintenance or the second maintenance for which the recommended time period for executing is displayed by the display control unit.

The display control unit deletes the recommended time period for executing the first maintenance from the maintenance schedule, when the completion of execution of the first maintenance is received.

When the completion of execution of the second maintenance is received, the display control unit changes a display mode of the recommended time period for executing the second maintenance from a display mode before the completion of the second maintenance.

Aspect 13

According to Aspect 13, the maintenance management system of any one of Aspects 1 to 11 further includes an operation receiving unit configured to receive completion of execution of the first maintenance or the second maintenance for which the recommended time period for executing is displayed by the display control unit.

The display control unit deletes the recommended time period for executing the first maintenance from the maintenance schedule, when the completion of the first maintenance is received.

When the completion of execution of the second maintenance is received, the display control unit deletes the recommended time period for executing the second maintenance from the maintenance schedule except for a date on which the second maintenance is executed.

Aspect 14

According to Aspect 14, in the maintenance management system of any one of Aspects 1 to 13, the maintenance schedule setting unit determines an operator who can perform the second maintenance based on the operator associated with a type of the second maintenance.

The display control unit does not display the recommended time period for executing the second maintenance on the maintenance schedule, when the operator is an external person.

Aspect 15

According to Aspect 15, in the maintenance management system of any one of Aspects 1 to 14, the first maintenance is regular maintenance that is set based on a counter value of a device.

Aspect 16

According to Aspect 16, in the maintenance management system of any one of Aspects 1 to 15, the second maintenance is additional maintenance for dealing with a sign of a failure that is detected by inputting device status information of a device to a failure prediction model.

Aspect 17

According to Aspect 17, in the maintenance management system of any one of Aspects 1 to 16, a device is an image forming apparatus that forms an image on a sheet, a device that can create a three-dimensional object based on three-dimensional shape data, or a liquid discharging device.

Aspect 18

According to Aspect 18, in the maintenance management system of Aspect 11, the recommended date proposal unit determines a priority order of multiple recommended dates, based on a day on which no printing is scheduled and a length of an available time period in a day on which printing is scheduled during the recommended time period for executing the second maintenance.

The display control unit displays the priority order of the multiple recommended dates proposed by the recommended date proposal unit in addition to the recommended time period for executing the second maintenance.

Aspect 19

According to Aspect 19, the maintenance management system of Aspect 11 includes a printing job registration unit configured to receive registration of a printing job from a terminal apparatus operated by a user.

When a closest available time among available times in which no printing job is registered is the recommended time period for executing the second maintenance, the printing job registration unit inquires of the terminal apparatus whether to register the printing job in the closest available time or a closest available time that is not the recommended time period for executing the second maintenance.

The invention claimed is:

1. A maintenance management system comprising:

a server apparatus including circuitry and a memory;

an image forming apparatus, subjected to maintenance, including a plurality of sensors configured to measure at least current, voltage and temperature of components of the image forming apparatus, and a counter configured to count a number of sheets printed, the image forming apparatus connected to the server apparatus through a network; and an augmented reality device connected to the server apparatus through the network, the circuitry of the server apparatus configured to:

periodically acquire sensor measurement data and counter data from the image forming apparatus;

input the sensor measurement data and the counter data into a trained failure prediction model stored in the memory;

perform failure prediction using the failure prediction model to detect a sign of failure of the image forming apparatus by identifying a failure type from among a plurality of failure types based on modeling patterns in the sensor measurement data using the failure prediction model, the failure prediction model associating measurement values of the current, the voltage and the temperature, acquired from the image forming apparatus, with a probability of occurrence of failure and a time period until the failure occurs;

in response to a detection of the sign of failure by the failure prediction model, automatically determine that, in addition to a first maintenance which is scheduled by the image forming apparatus according to the counter data of the image forming apparatus, a second maintenance is required for a specific component among the components of the image forming apparatus based on the failure prediction, the second maintenance being a maintenance that is extraordinarily added differently from the first maintenance in order to deal with the sign of failure;

set a recommended time period for executing the second maintenance to be longer than a time required for the second maintenance;

store information on the second maintenance with the recommended time period for executing the second maintenance;

transmit, to the image forming apparatus, a maintenance schedule including a recommended time period for executing the first maintenance and the recommended time period for executing the second maintenance; and cause the image forming apparatus to automatically display the maintenance schedule in response to a new recommended time period for executing the first maintenance or the second maintenance being added to the maintenance schedule, and to notify a user of the image forming apparatus, wherein the circuitry of the server apparatus is further configured to:

determine whether the recommended time period for executing the first maintenance exists during a predetermined period from a next business day of the failure prediction until the recommended time period for executing the second maintenance; and in response to determining that the recommended time period for executing the first maintenance exists during the predetermined period, extend the stored recommended time period for executing the second maintenance to overlap with the recommended time period for executing the first maintenance, such that both of the first maintenance and the second maintenance are executed during an overlapping execution period, and wherein the circuitry of the server apparatus is further configured to:

identify the specific component of the image forming apparatus for which the failure prediction model determines that the second maintenance is required; and cause the augmented reality device to display a physical location of the specific component of the image forming apparatus, by superimposing information of the specific component onto a view of the image forming apparatus captured by the augmented reality device.

2. The maintenance management system of claim 1, wherein the circuitry of the server apparatus is further configured to set the recommended time period for executing the second maintenance to be longer than the recommended time period for executing the first maintenance.

3. The maintenance management system of claim 1, wherein the circuitry of the server apparatus is further configured to set the recommended time period for executing the second maintenance so as to continue before or after the recommended time period for performing the first maintenance.

4. The maintenance management system of claim 3, wherein the circuitry of the server apparatus is further configured to set, as the recommended time period for executing the second maintenance, a time period longer than a time period in which the first maintenance is displayed in a weekly maintenance schedule or a daily maintenance schedule.

5. The maintenance management system of claim 1, wherein the circuitry of the server apparatus is further configured to set, as the recommended time period for executing the second maintenance, a plurality of days that is longer than a day on which the first maintenance is displayed in a monthly calendar.

6. The maintenance management system of claim 1, wherein the circuitry of the server apparatus is further configured to:

determine a recommended date on which a usage amount of the image forming apparatus during the recommended time period for executing the second maintenance is relatively small by using usage amount information of the image forming apparatus for every day of a week; and display the recommended date in addition to the recommended time period for executing the second maintenance.

7. The maintenance management system of claim 6, wherein the circuitry of the server apparatus is further configured to:

determine a priority order of multiple recommended dates including the recommended date, based on a day on which no printing is scheduled and a length of an available time period in a day on which printing is scheduled during the recommended time period for executing the second maintenance; and display the priority order of the multiple recommended dates in addition to the recommended time period for executing the second maintenance.

8. The maintenance management system of claim 6, wherein the circuitry of the server apparatus is further configured to:

receive registration of a printing job from a terminal apparatus operated by a user; and in a case in which a closest available time among available times in which no printing job is registered is the recommended time period for executing the second maintenance, inquire of the terminal apparatus whether to register the printing job in the closest available time or a closest available time that is not the recommended time period for executing the second maintenance.

9. The maintenance management system of claim 1, wherein the circuitry of the server apparatus is further configured to:

receive completion of execution of the first maintenance or the second maintenance for which the recommended time period for executing is displayed;

in a case in which the circuitry of the server apparatus receives the completion of the first maintenance, delete the recommended time period for executing the first maintenance from the maintenance schedule; and in a case in which the circuitry of the server apparatus receives the completion of execution of the second maintenance, change a display mode of the recommended time period for executing the second maintenance from a display mode before the completion of the second maintenance.

10. The maintenance management system of claim 1, wherein the circuitry of the server apparatus is further configured to:

receive completion of execution of the first maintenance or the second maintenance for which the recommended time period for executing is displayed;

in a case in which the circuitry of the server apparatus receives the completion of the first maintenance, delete the recommended time period for executing the first maintenance from the maintenance schedule; and in a case in which the circuitry of the server apparatus receives the completion of execution of the second maintenance, delete the recommended time period for executing the second maintenance from the maintenance schedule except for a date on which the second maintenance is executed.

11. The maintenance management system of claim 1, wherein the first maintenance is regular maintenance that is set based on the counter data of the image forming apparatus.

12. The maintenance management system of claim 1, wherein the image forming apparatus is configured to form an image on a sheet or create a three-dimensional object based on three-dimensional shape data.

* * * * *